(12) United States Patent
Brown, Jr.

(10) Patent No.: US 6,182,563 B1
(45) Date of Patent: Feb. 6, 2001

(54) HAY BALE STACKING APPARATUS

(76) Inventor: Owen J. Brown, Jr., R.R. #2, Box 136, Pittsfield, IL (US) 62363

( * ) Notice: Under 35 U.S.C. 154(b), the term of this patent shall be extended for 0 days.

(21) Appl. No.: 09/203,707

(22) Filed: Dec. 2, 1998

Related U.S. Application Data

(60) Provisional application No. 60/067,510, filed on Dec. 4, 1997.

(51) Int. Cl.$^7$ .............................. B65B 13/02; B30B 9/30; A01F 15/00
(52) U.S. Cl. .................................. 100/7; 100/18; 100/29; 100/50; 100/100
(58) Field of Search .................................. 100/3, 4, 7, 17, 100/18, 29, 50, 100; 414/789.7

(56) References Cited

U.S. PATENT DOCUMENTS

| | | | |
|---|---|---|---|
| 3,563,162 | * 2/1971 | Monroe | 100/7 |
| 3,726,210 | * 4/1973 | Hawkins | 100/7 |
| 3,938,432 | 2/1976 | Jones . | |
| 4,206,698 | 6/1980 | Nicholson . | |
| 4,541,332 | * 9/1985 | Horansky et al. | 100/3 |
| 4,548,131 | * 10/1985 | Williams | 100/3 |
| 4,601,238 | * 7/1986 | Davis, Jr. et al. | 100/3 |
| 4,676,153 | 6/1987 | Ast . | |
| 4,936,206 | 6/1990 | Miles et al. . | |
| 5,129,215 | 7/1992 | Gratton . | |
| 5,547,334 | * 8/1996 | Baril | 414/789.7 |
| 5,695,311 | * 12/1997 | Miguel et al. | 414/789.7 |

* cited by examiner

Primary Examiner—Stephen F. Gerrity
(74) Attorney, Agent, or Firm—Emrich & Dithmar

(57) ABSTRACT

Apparatus for stacking bales of hay into large bundles such as, for example, three bales high and seven bales wide, positions bands about the stacked array to provide a tightly bound, compressed stack of bales. The stacking apparatus compresses the stacked bales during banding with a greater force applied to the same facing portions of the bales as applied during formation of the bales to form a solid, rigid, self-supporting large bundle made up of small bales. Parallel spaced compression zones extending inwardly are formed in the upper and lower rows of bales in the least compressed portion of the bales for receiving the bands which are applied without high tension so as not to damage the hay in holding the bundle of hay bales together. This arrangement prevents the bands from cutting into the hay bales as well as severing the binding of the individual bales, allows the hay bundle to be easily moved by pallet forks, and maintains the banding out of contact with the ground to avoid band damage and deterioration from the elements as well as from rodents. The apparatus is computer controlled and fully automated from the input of individual bales to the discharge of a tightly banded and compressed bundle of hay bales and can be used in "on the go" as the apparatus traverses a field containing the individual hay bales.

68 Claims, 52 Drawing Sheets

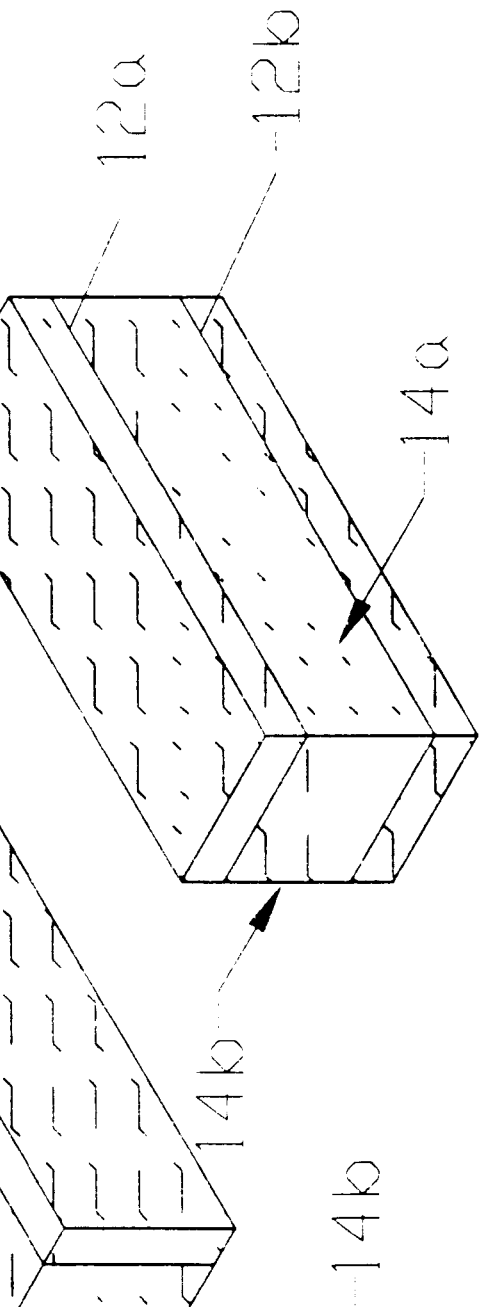

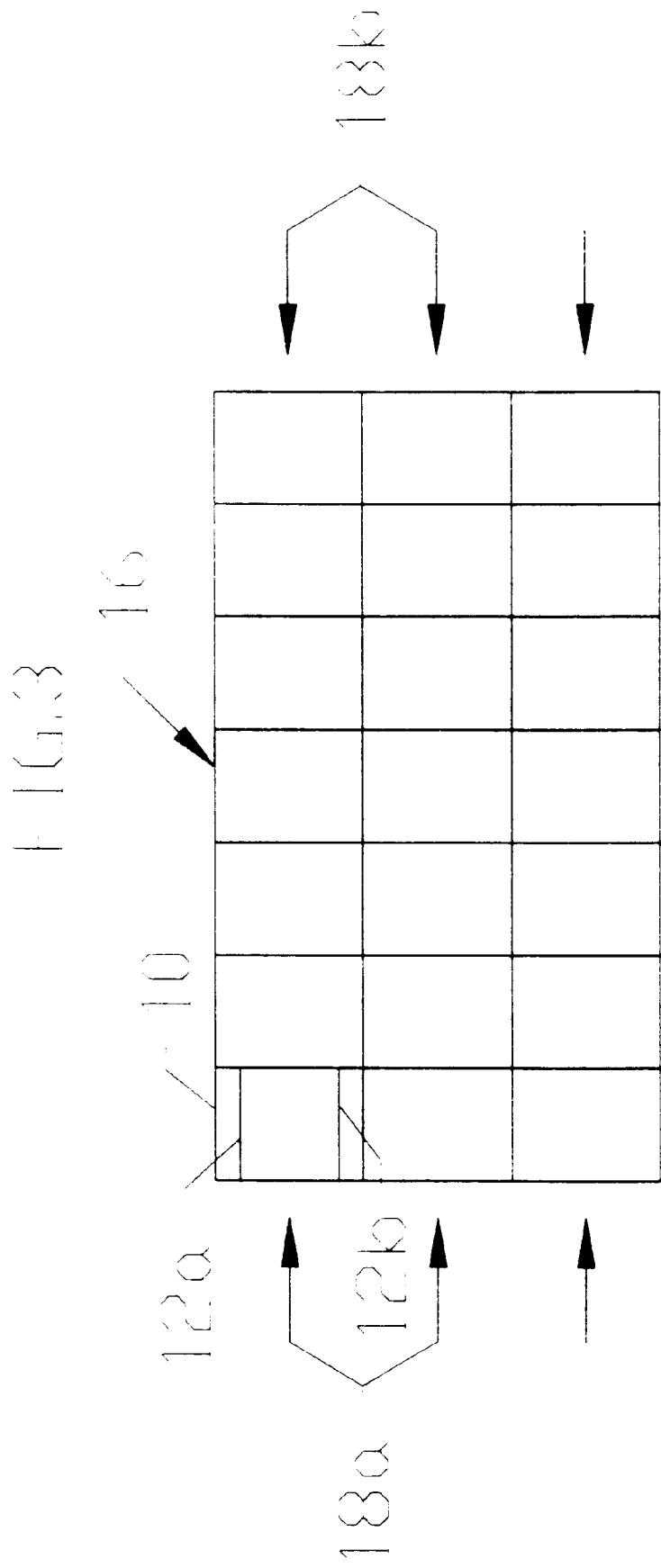

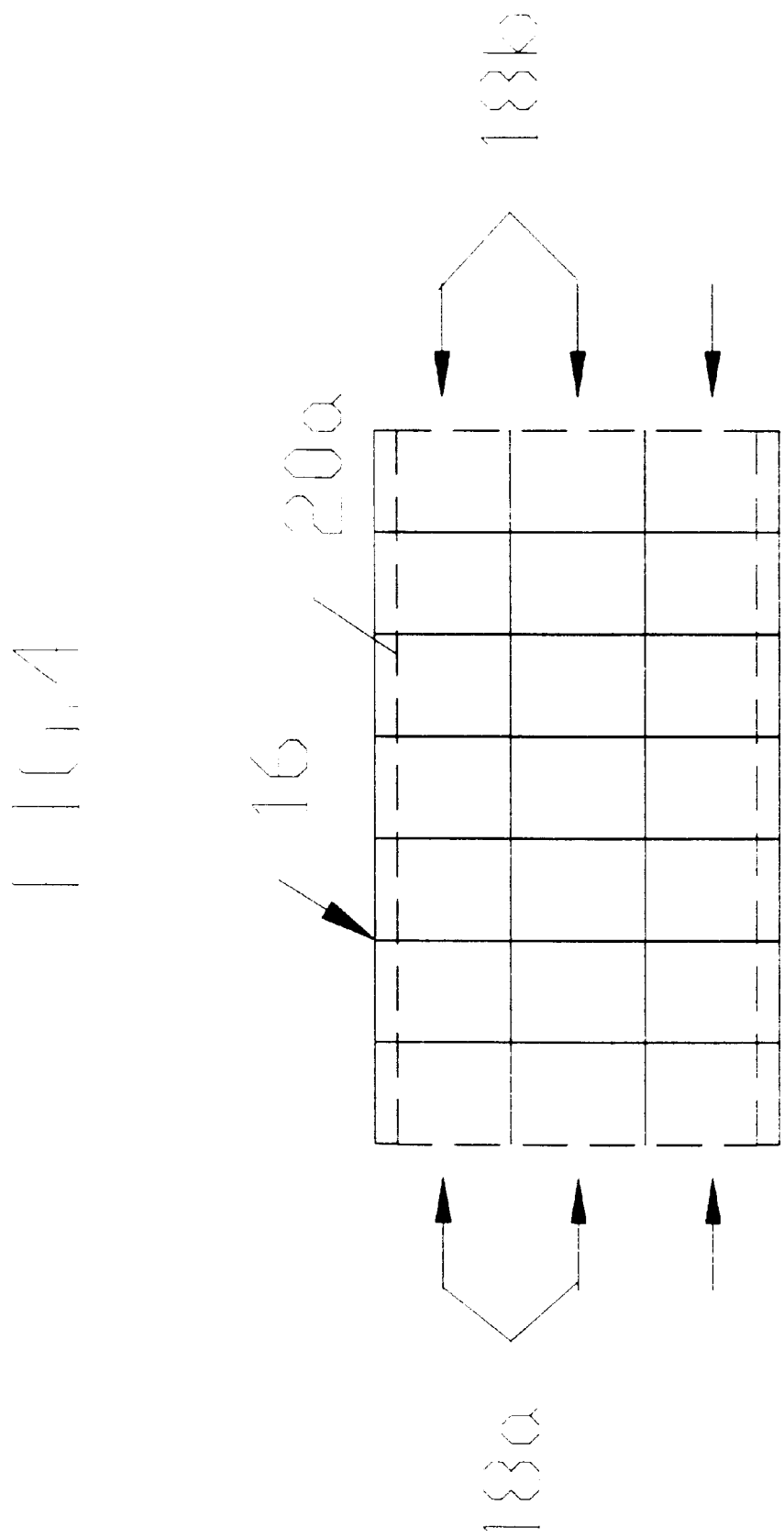

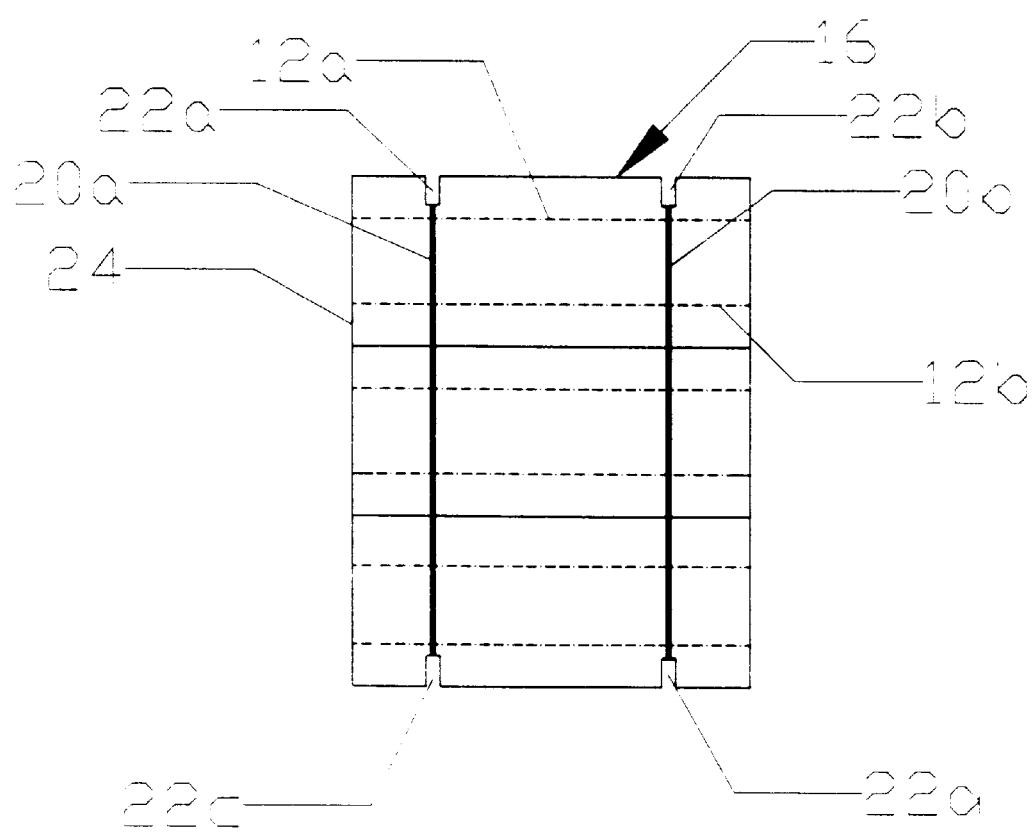

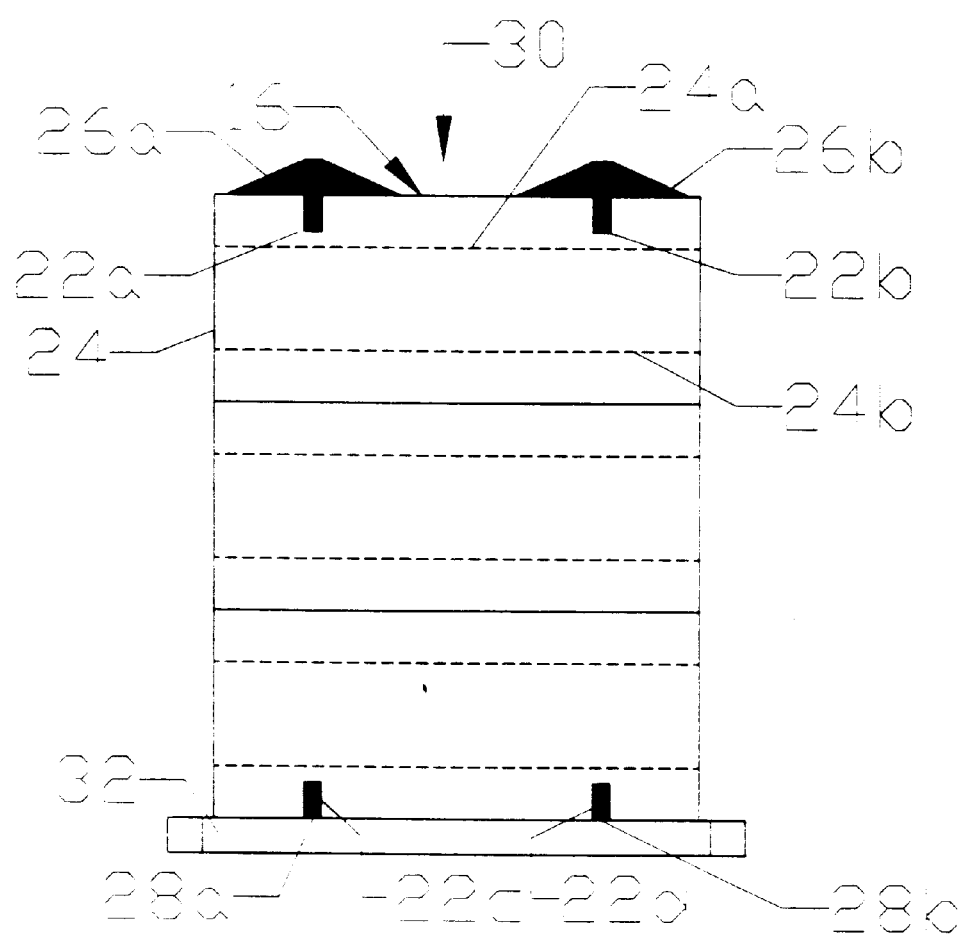

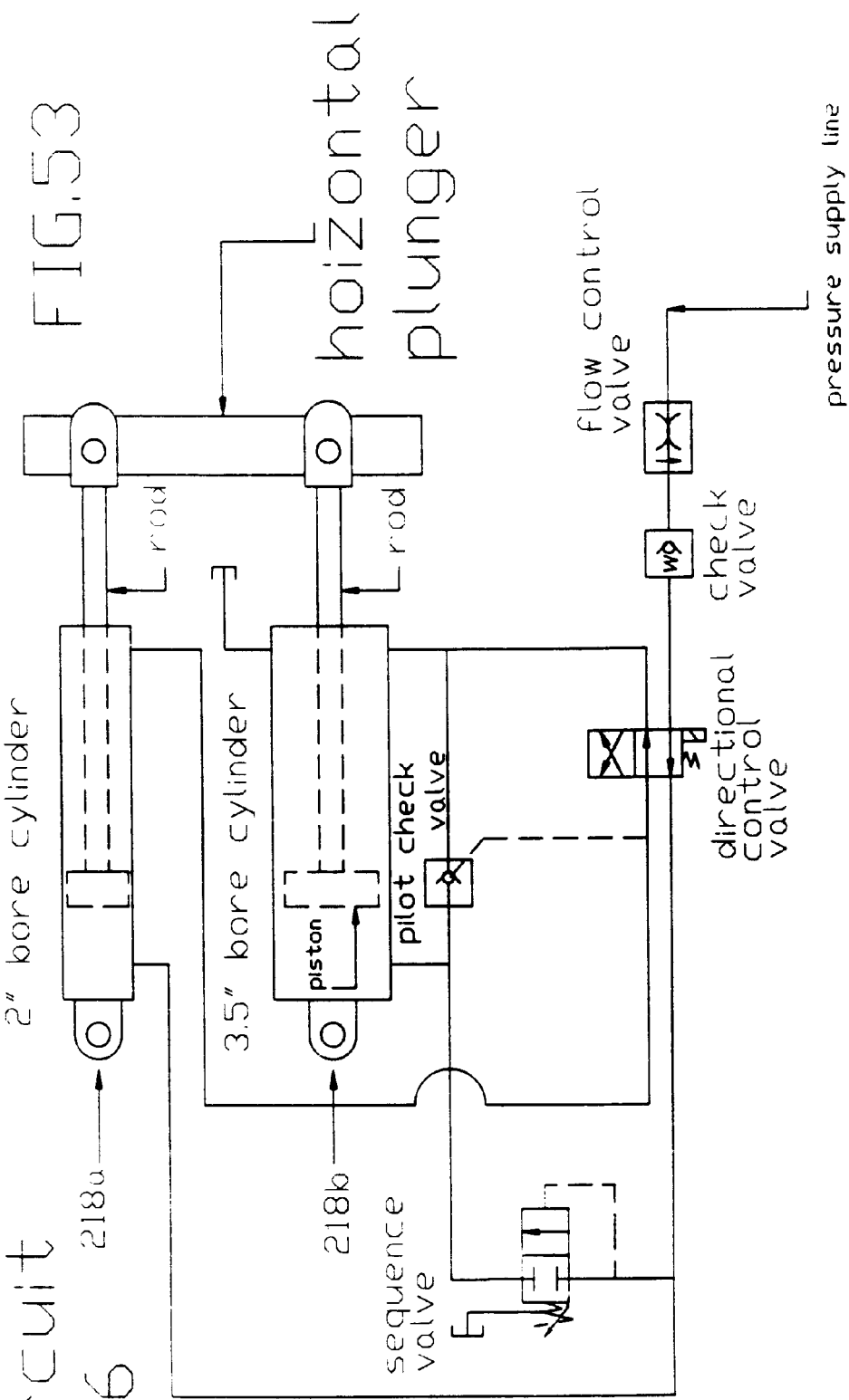

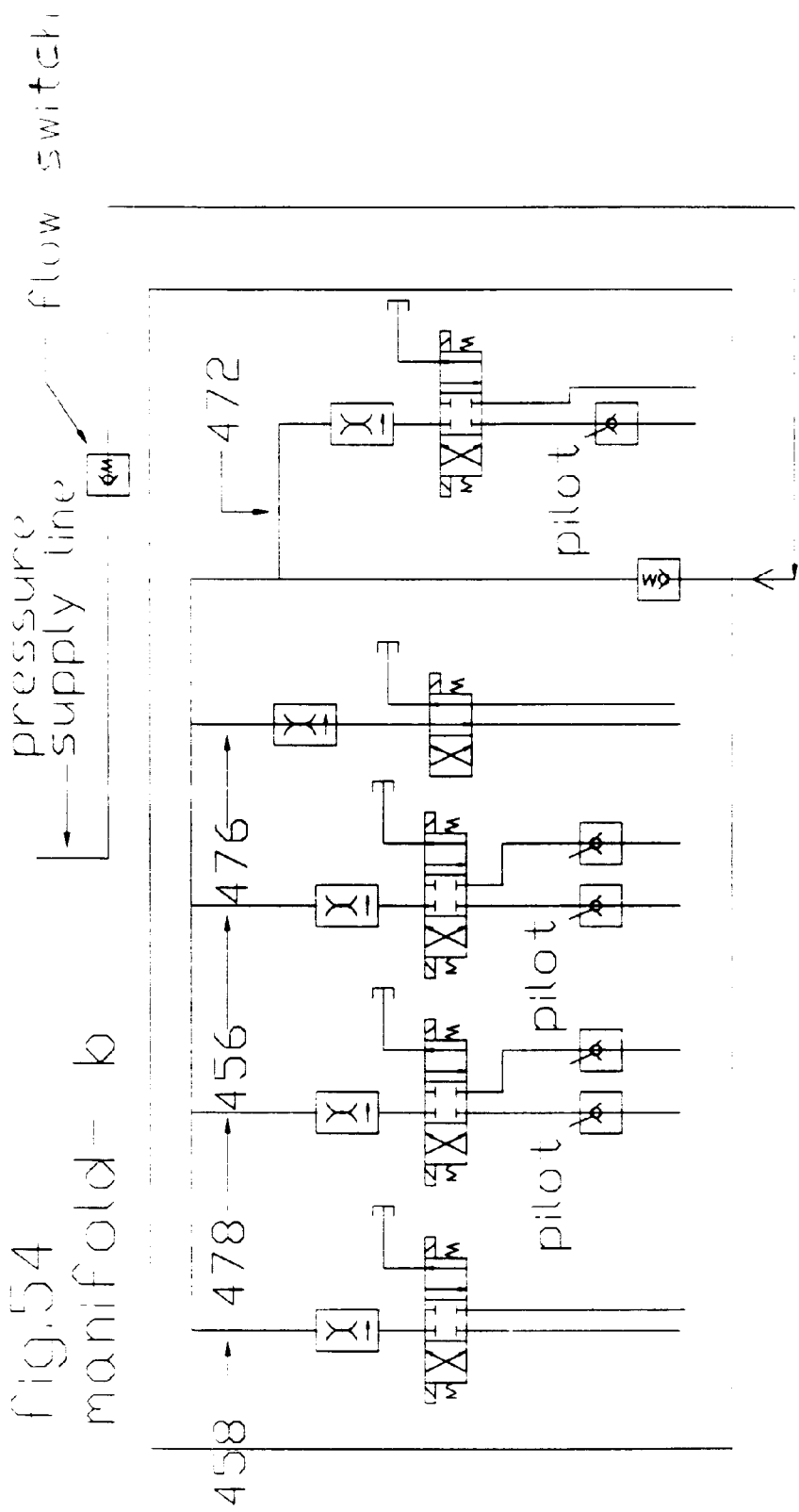

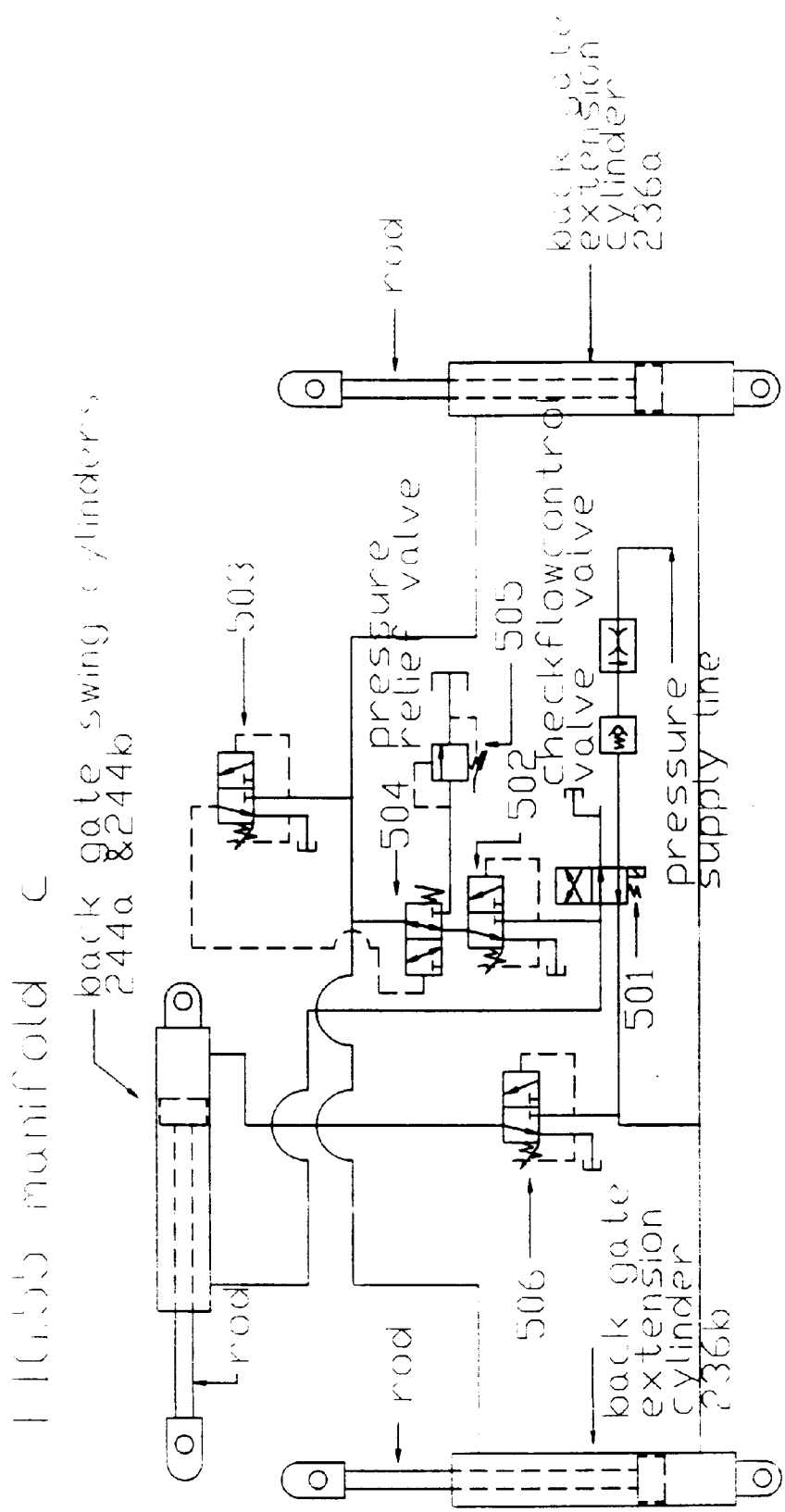

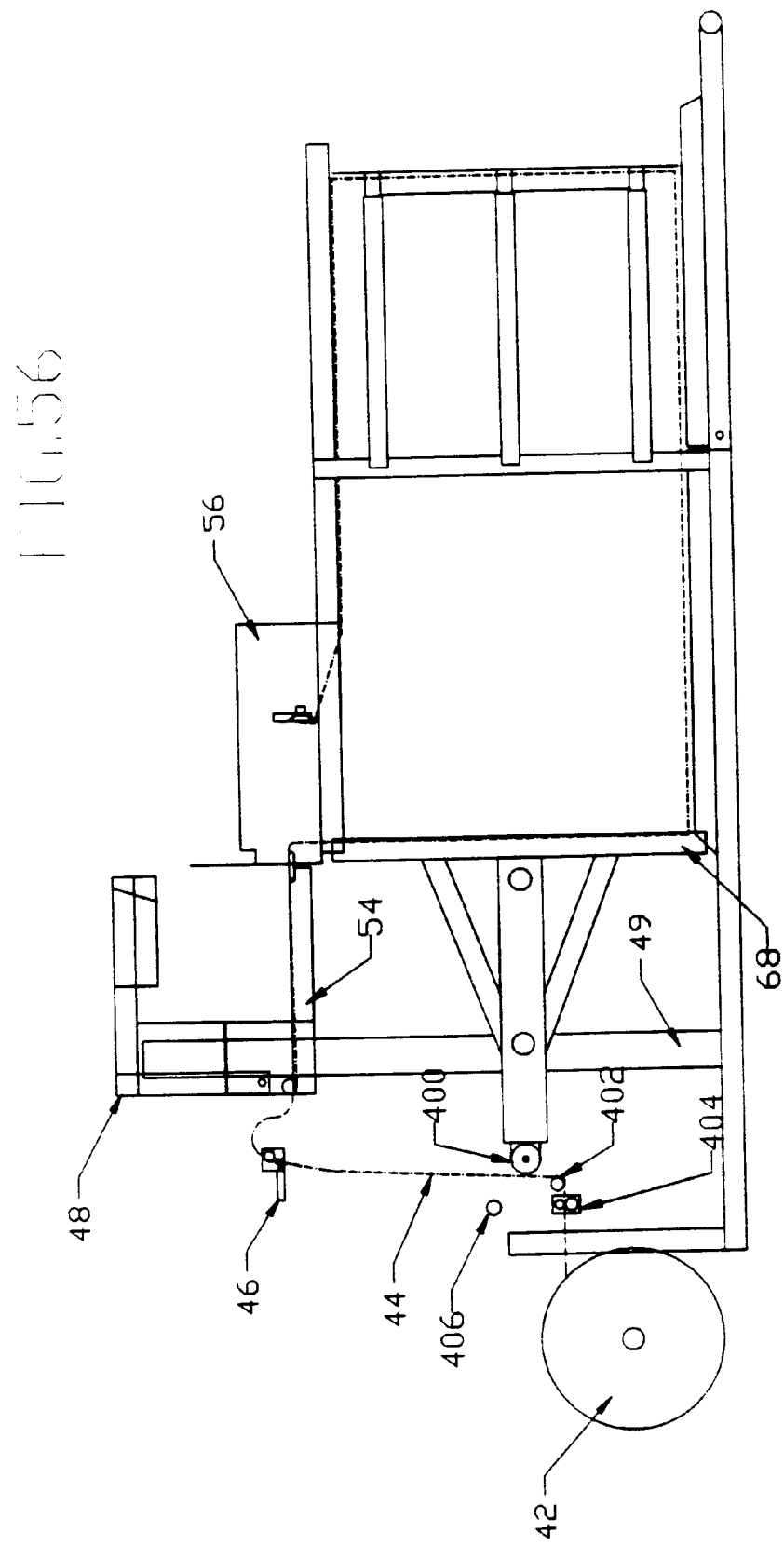

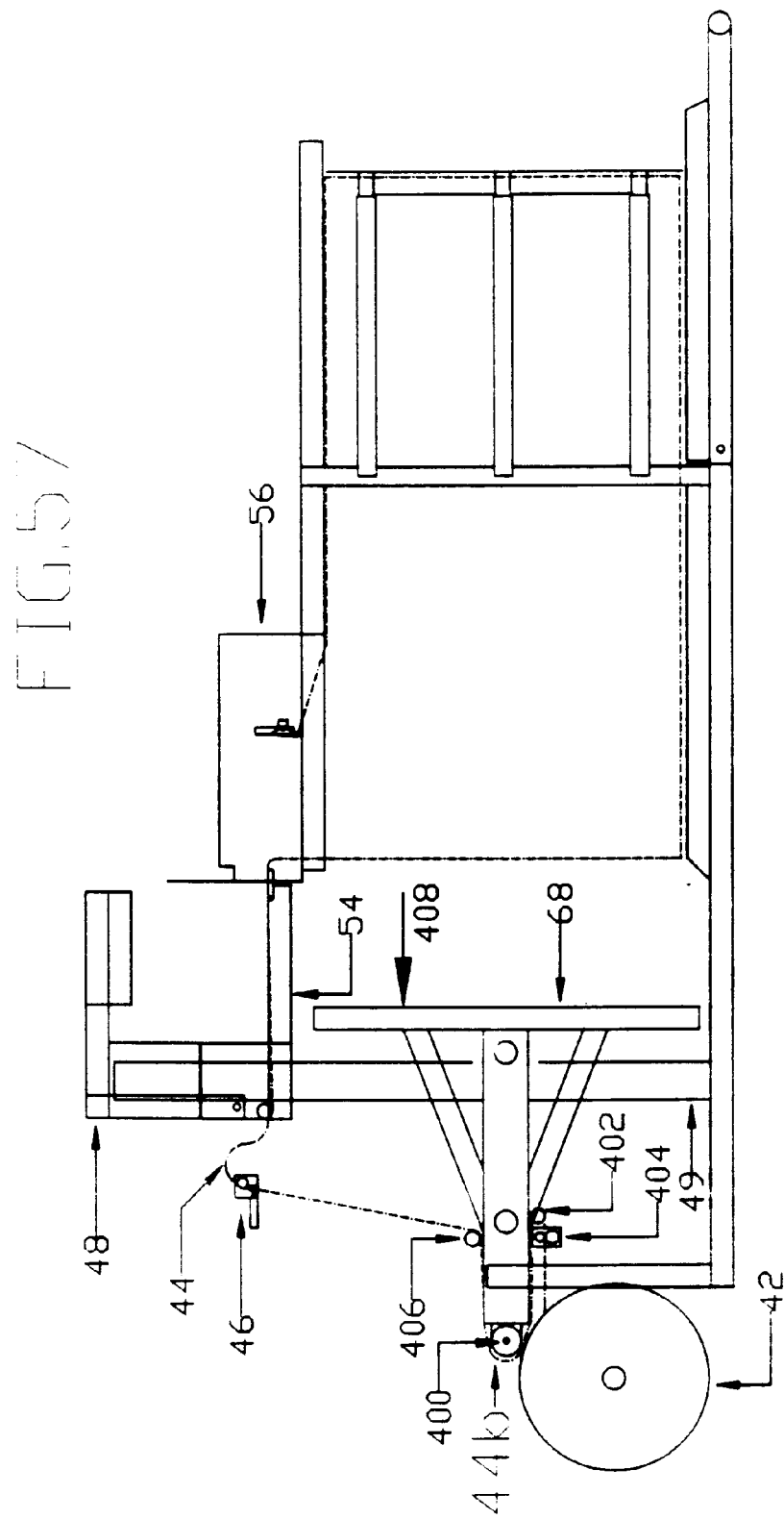

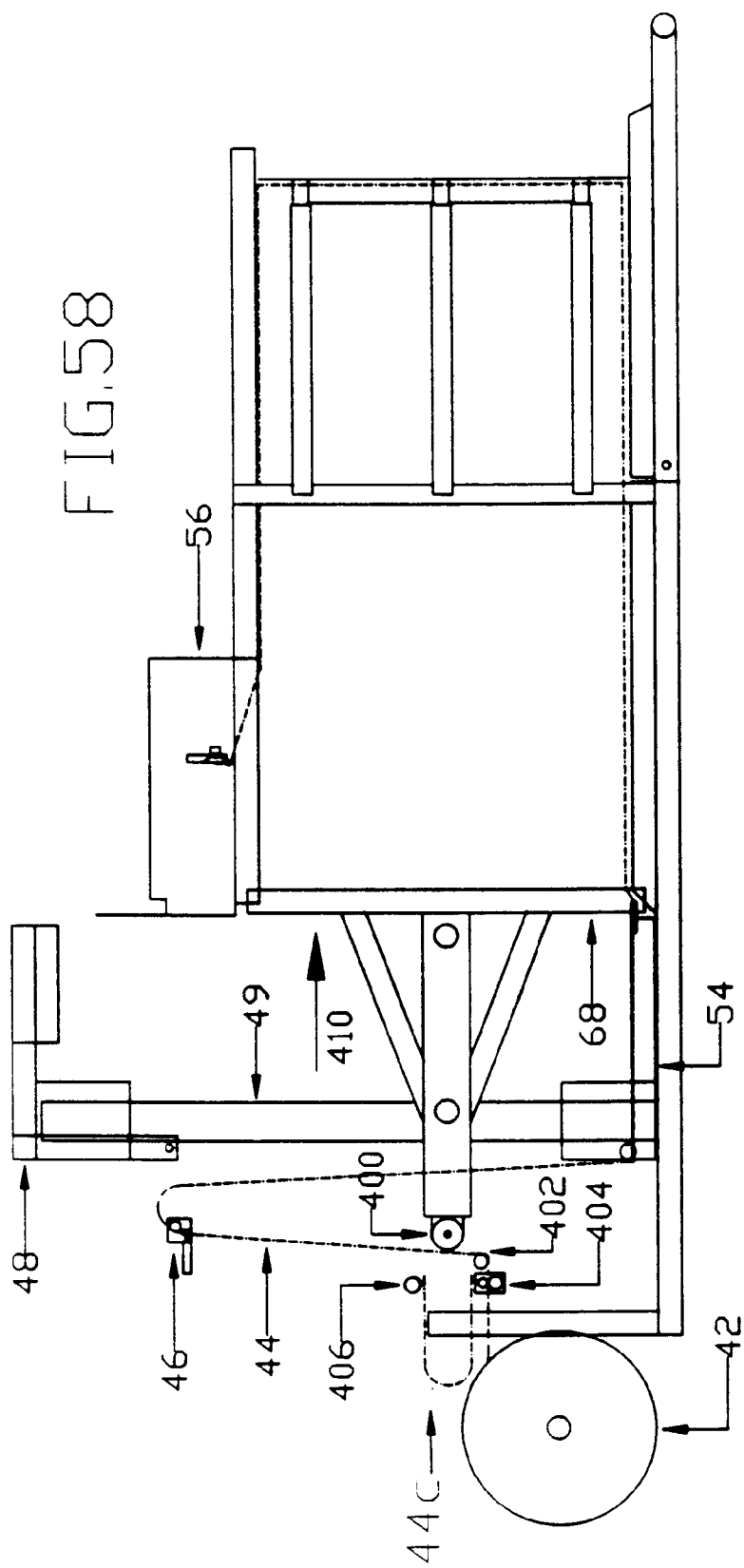

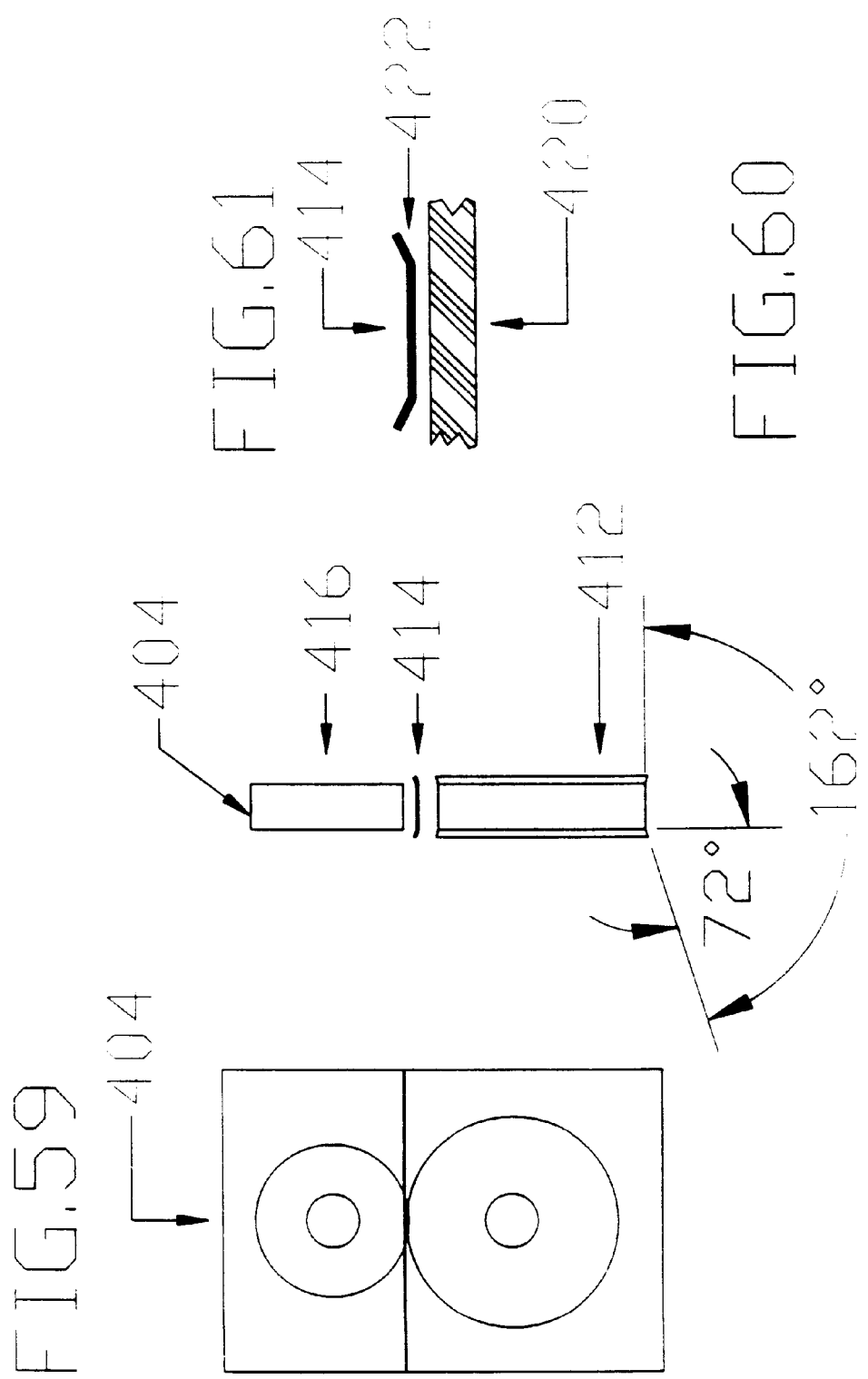

HAY BALE STACKING APPARATUS

RELATED APPLICATION

This application claims the benefit of copending U.S. Provisional Application No. 60/067,510, filed Dec. 4, 1997.

FIELD OF THE INVENTION

This invention relates generally to the handling of bales of hay and is particularly directed to apparatus for stacking bales of hay into a large, matrix-like bundle to form a solid, rigid, self-supporting package which is easily handled and stored without cutting or otherwise damaging the hay bales.

BACKGROUND OF THE INVENTION

Cut hay is collected in the form of bales which are typically 14 inches by 18 inches by three and one half feet and are bound by twine or wire. The hay baler compresses the bale prior to applying the twine. The twine is of limited strength, limiting the extent to which the hay can be compressed and the density of the hay bale. This generally results in a rather loose bale.

Attempts have been made to stack hay bales to form a large bundle of hay without success. A bundle of hay weighing many hundreds of pounds is more easily stored and affords economic advantages in handling, shipping and in feeding livestock over individual bales. However, these large bundles cannot be moved by hand and thus require mechanical means for moving and storing the bundles. If the individual bales are rather loosely bound such as by twine or are damaged by cutting or shredding, the resultant large bundle of bales is even more loosely constrained rendering handling of the bundle difficult even by a machine and frequently resulting in loss and waste of hay.

The present invention addresses the aforementioned problems encountered in the prior art by providing a hay bale stacking apparatus which under the control of a computer receives individual hay bales, stacks the bales in a large bundle, tightly bounds the bundle, and discharges the banded bundle from the aft of the apparatus as it traverses a field. The bundles are configured to facilitate handling such as by pallet forks, the individual bales are positioned and oriented in the bundle in a manner which enhances hay storage, and the bundle itself is a solid, rigid and self-supporting package with minimum damage to the hay.

OBJECTS AND SUMMARY OF THE INVENTION

Accordingly, it is an object of the present invention to stack a plurality of small hay bales into a large bundle which is securely banded in a manner which avoids severing the binding of the individual bales as well as cutting or shredding the hay during banding or during subsequent handling of the bundle.

It is another object of the present invention to provide for the automatic stacking of individual bales of hay into large banded bundles in a computer controlled apparatus capable of operating in "on the go" as it traverses a field.

Yet another object of the present invention is to provide apparatus for the stacking of hay bales into a large matrix-like bundle of hay bales which is solid, rigid and self-supporting.

A further object of the present invention is to stack bales of hay in a large securely banded bundle which can be lifted and moved by means of pallet forks without damaging or severing the bundle's banding or the binding of the individual bales.

A still further object of the present invention is to bundle and store a plurality of hay bales in a manner which avoids contact of the bundle banding or the individual bale's binding with the ground and eliminates the damage and deterioration of the banding/binding associated therewith.

Another object of the present invention is to incorporate banding zones extending inwardly into the bales in a large bundle of hay to permit a restraining band to be wrapped around the bundle without application of great tension to the band to avoid damage to the hay by the restraining band during banding or during subsequent handling of the bundle.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 1 and 2 are perspective views of a hay bale showing the manner in which it is bound such as by wire or twine;

FIG. 3 is a side elevation view of a bundle or stack of hay bales formed in accordance with the present invention;

FIGS. 4 and 5 are side elevation views of a bundle of hay bales containing a plurality of banding zones in accordance with one aspect of the present invention;

FIG. 6 is a simplified schematic diagram showing the manner in which the banding zones are formed in the bundle of hay bales;

FIGS. 52–55 are simplified schematic diagrams showing hydraulic circuitry of manifolds and complex hydraulic circuits;

FIGS. 56–61 are a series of side elevation views in simplified schematic diagram form illustrating the manner in which strapping is mechanically pulled from the banding dispenser for forming a curved edge on the strapping sides.

DETAILED DESCRIPTION OF THE PREFERRED EMBODIMENTS

Figure 7:
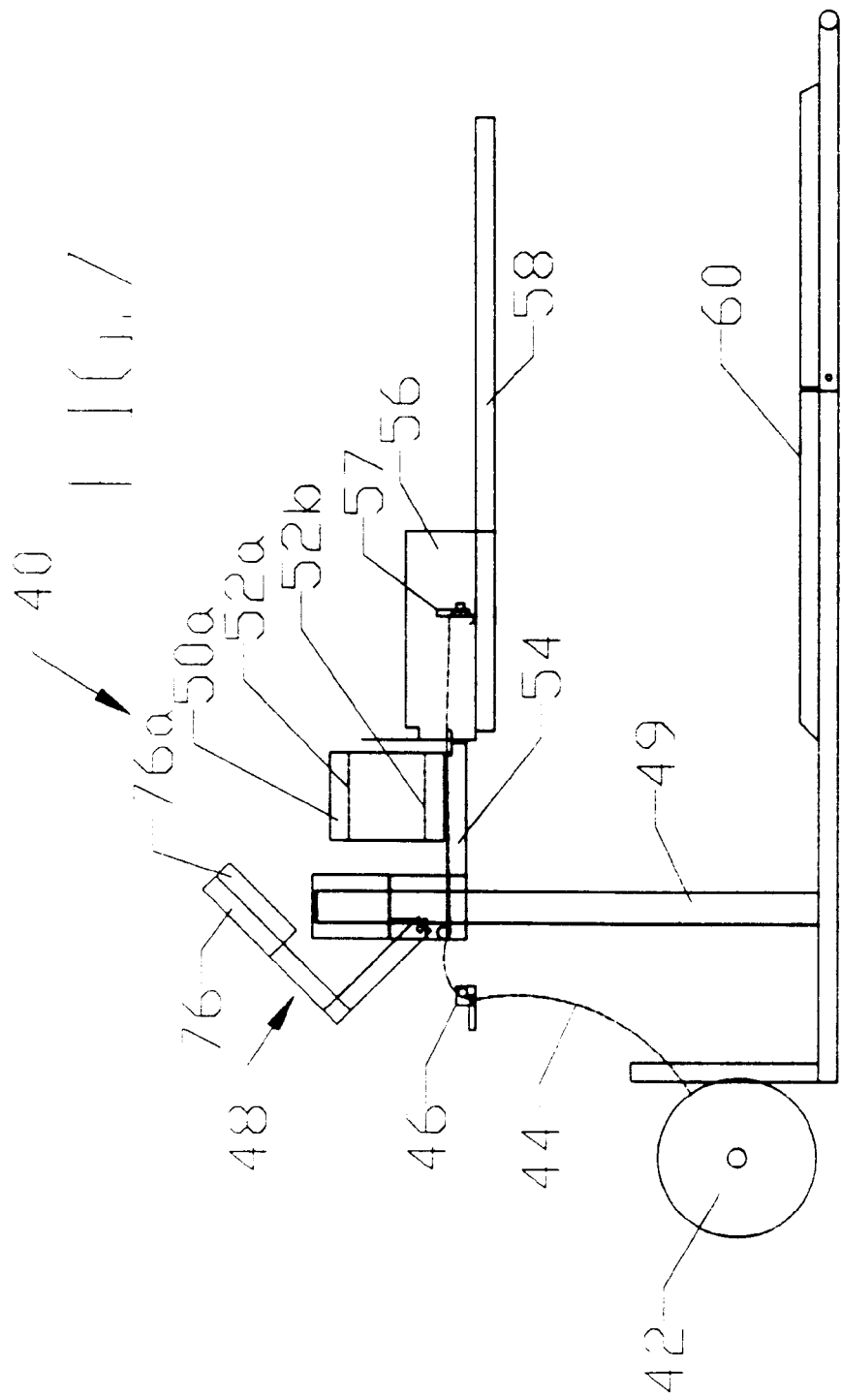
FIGS. 7–21 are a series of side elevation views in simplified schematic diagram form illustrating the manner in which a bundle of hay bales is formed in accordance with the present invention.

Referring to FIGS. 1 and 2, there are shown perspective views of a hay bale 10. In the following description, the terms "banding" and "strapping," or "straps," are interchangeable. Hay bale 10 is generally rectangular in shape and is held together by means of first and second bindings 12a and 12b which are typically wire or twine. The directions of the forces employed to compress and form bale 10 are shown by direction arrows 14a and 14b. Direction arrows 14a, 14b thus show the direction that the hay bale 10 was compressed when formed in a hay baler. When the hay bale 10 exits the hay baler, bindings 12a and 12b are positioned on the top, bottom and ends of hay bale 10 as shown in FIG. 1. In this orientation, the hay bale is described as being in the "flat" position. FIG. 2 shows hay bale 10 rotated 90° from its orientation in FIG. 1, where the hay bale has been rotated about a horizontal axis extending along the lengthwise dimension of the hay bale. The direction arrows 14a and 14b of hay bale compression are oriented horizontally in this orientation of the hay bale 10 as shown in FIG. 2. In this orientation, bindings 12a and 12b are now disposed on the sides and ends of the hay bale 10 which is described as being in the "on edge" position. Hay quality is maintained better when stored on edge as shown in FIG. 2 than when stored in the flat position as shown in FIG. 1. Moreover, bindings 12a and 12b are removed from the support surface which may be the ground or a floor of a storage building. When oriented on edge as shown in FIG. 2, bindings 12a, 12b are less likely to be damaged or destroyed by rodents or the elements as compared with the flat position shown in FIG. 1 where the bindings are in contact with the hay bale support surface. The hay bale stacking apparatus of the present invention stores the hay bales in the on end position as shown in FIG. 2 as described in detail below.

The hay bale stacking apparatus of the present invention arranges a number of hay bales as shown in FIGS. 1 and 2 in a matrix-like bundle 16 of hay bales as shown in FIG. 3. The hay bale bundle 16 shown in the figure includes twenty-one hay bales which are stacked three bales high and seven bales wide. Hay bale 10 is in the upper left-half corner of the bundle 16 and is tied by bindings 12a and 12b, as previously described. Arrows 18a and 18b represent the direction of bundle compression as the bundle is formed by application of opposing compression forces by the hay bale stacking apparatus of the present invention. Comparing the direction of compression forces in FIG. 3 with the compression forces applied to an individual bale in FIGS. 1 and 2, it can be seen that the bundle compression forces are applied to the same opposed lateral surfaces of the hay bale as are the compression forces applied in initially forming the hay bale. When a hay bale exits the baler chamber of the baling apparatus, it expands outwardly in directions opposite to the direction of the compression forces used in forming the bale. To form a solid, rigid, self-supporting large package of hay in the form of bundle 16 shown in FIG. 3, the individual hay bales must again be compressed in the same direction with greater force than they were originally compressed during formation. This is a key aspect of the present invention and represents a fundamental departure from the prior art.

Referring to FIG. 4, there is shown another view of the bundle 16 of hay bales illustrating the position of one of the bands 20a (shown in dotted line form) disposed about the bundle. FIG. 5 is another side view of the bundle 16 of hay bales illustrating additional details of the manner in which the bundle is securely held together by means of first and second bands 20a and 20b disposed about the hay bales. As previously described, the compression force applied to the bundle 16 of hale bales is in the opposed directions of arrows 18a and 18b, which are in the same directions as the forces used to initially compress the individual hay bales during formation. In FIG. 4, the first band 20a is shown disposed on the outer lateral surfaces of the bundle 16, but is positioned within the individual hay bales at the top and bottom of the bundle. This is more clearly shown in the side elevation view of FIG. 5, where the first band 20a is shown disposed within an upper recessed banding zone 22a as well as in a lower recessed banding zone 22c. Similarly, second band 20b is disposed within an upper recessed banding zone 22b and a lower recessed banding zone 22d. The bindings 12a and 12b of the top hay bale 24 are shown in dotted line form in FIG. 5. It can be seen from these figures that while the bundle bands 20a and 20b may contact the bindings of the individual hay bales along opposed lateral surfaces of the bundle 16 of hay bales, the bundle bands do not engage the bindings of the top and bottom rows of hay bales. In other words, the bundle bands 20a, 20b do not engage the bindings of the hay bales in the top and bottom rows where the individual hay bale bindings are more likely to be damaged or severed. This essentially eliminates the possibility of the bundle bands severing the bindings of the upper and lower row of hay bales so as to maintain the bundle tightly bound without the damaging the hay.

Also in accordance with the present invention, the recessed banding zones 22a–22d in the upper and lower rows of hale bales permit the first and second bundle bands 20a, 20b to be wrapped around the bundle of hay bales 16 without applying tension to the bands while still permitting the bands to securely maintain the hay in a solid, rigid, self-supporting large package. It is not possible to maintain the hay in a tightly bound bundle by applying a high tension and pulling the banding tight, as in prior art approaches, because this will result in severing the bindings of the corner hay bales resulting in cutting and shredding of the hay and a general loosening of the bundle of hay bales. In accordance with another aspect of the present invention and as described in detail below, the bundle 16 of hay bales is tightly compressed by mechanical apparatus at high pressure, permitting the bundle bands 20a and 20b to be wrapped around the bundle without the application of high tension to the bands. As the bundle 16 of hay bales is compressed by the mechanical apparatus, the four banding zones 22a–22d are formed in the upper and lower surfaces of the bundle for receiving the first and second bands 20a, 20b. After bands 20a, 20b are secured, the mechanical compression apparatus is released and the bales of hay expand outwardly against the bands, while maintaining high compression, without cutting the binding of the individual hay bales or shredding the hay in the outermost bales.

Referring to FIG. 6, there is shown a simplified schematic diagram of the manner in which the banding zones 22a–22d are formed in the bundle 16 of hale bales. A vertical plunger applies a downwardly directed force in the direction of arrow 30 to the bundle 16 of hay bale which is disposed upon a support member 32. Shown in FIG. 6 are first and second vertical plunger elements 26a, 26b which are part of the vertical plunger. Additional details of the vertical plunger are described in detail below. The first and second vertical plunger element 26a, 26b form the upper banding zones 22a and 22b in the upper row of hay bales. Attached to support member 32 are a pair of spaced lower strap guides 28a and 286 which engage the lower row of hale bales and form the lower banding zones 22c and 22d therein. It is in this manner that the banding zones 22a–22d are formed in the upper and lower rows of hay bales within the bundle 16 of hay bales by the vertical plunger device. These banding zones permit the bundle 16 to be moved by pallet forks (not shown for simplicity), maintain the bundle bands displaced from the support surface, and permit the bands to be tightly positioned about the bundle without the application of high tension to the bands.

Referring to FIGS. 7–21, there is shown a series of simplified schematic diagrams of the operation of a hay bale stacking apparatus 40 in accordance with the principles of the present invention. FIGS. 7–21 are in the form of side elevation views of the hay bale stacking apparatus 40 and omit many structural details of the apparatus in order to specifically illustrate the series of operations carried out by the hay bale stacking apparatus 40 in forming a bundle of hay bales in accordance with the present invention. These structural details of the hay bale stacking apparatus are fully described herein following the description of the operation of the apparatus shown in FIGS. 7–21.

The hay bale stacking apparatus 40 includes a pair of banding dispensers (only one of which is shown as element 42 in FIGS. 7–21 for simplicity). Banding dispenser 42 holds and dispenses banding 44 which is shown in the figures in dotted line form. There are two banding dispensers 42 disposed side by side each of which lets out a respective length of banding 44 although only one is shown in the figures for simplicity. Banding 44 is tightly wrapped around a bundle of hay bales by the hay bale stacking apparatus 40 as described in the following paragraphs. One end of banding 44 is attached to a banding apparatus 56. The hay bale stacking apparatus 40 further includes a banding clamp 46 through which the banding 44 passes and a vertical plunger 48. Vertical plunger 48 includes a pair of pivoting arms (only one of which is shown in the figures as element 76). Vertical plunger 48 further includes a pair of strap guides 54 for supporting a hay bale 50a. Hay bale 50a is bound together by bale bindings 52a and 52b (also shown in dotted line form). Hay bale stacking apparatus 40 further includes a pair of upper banding troughs 58 and a pair of lower banding troughs 60.

Hay bale stacking apparatus 40 operates in the following manner to form a large bound bundle of hay bales. Hay bale 50a is received by the hay bale stacking apparatus 40 and is positioned on the vertical plunger 48. Vertical plunger is attached to and supported by a support frame 49 and moves vertically both upwardly and downwardly on the support frame. Vertical plunger 48 includes the aforementioned pivoting arms 76 and strap guides 54. Pivoting arms 76 are horizontally spaced from one another as are the strap guides 54. The pivoting arms and strap guides 76, 54 initially move as a single unit in forming a stack of hay bales, but later separate to accommodate a stack of two or more hay bales as described below. The pivoting arms and the strap guides 76, 54 as part of the vertical plunger 48 are vertically displaced in both directions along support frame 49.

Figure 8:
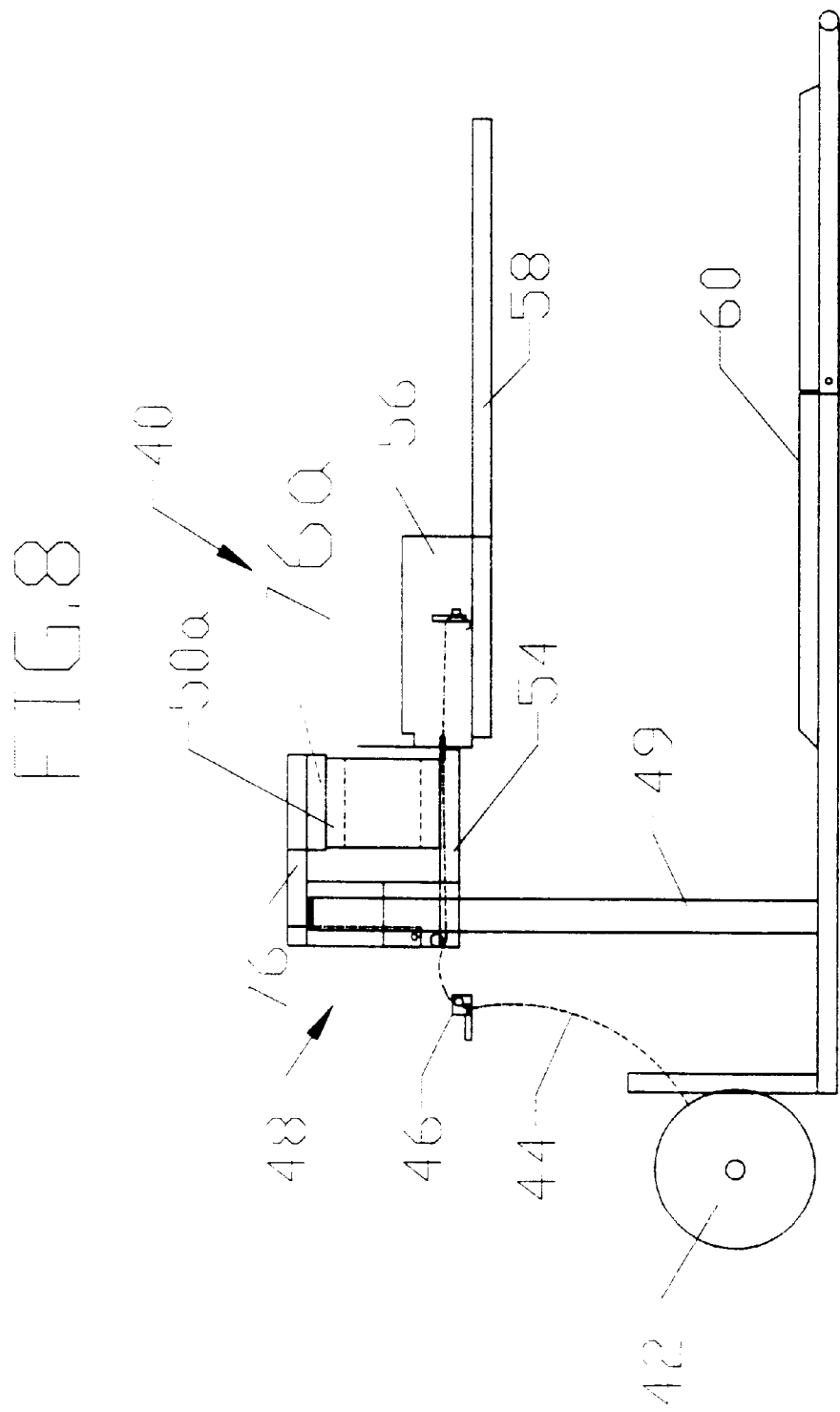
Figure 9:
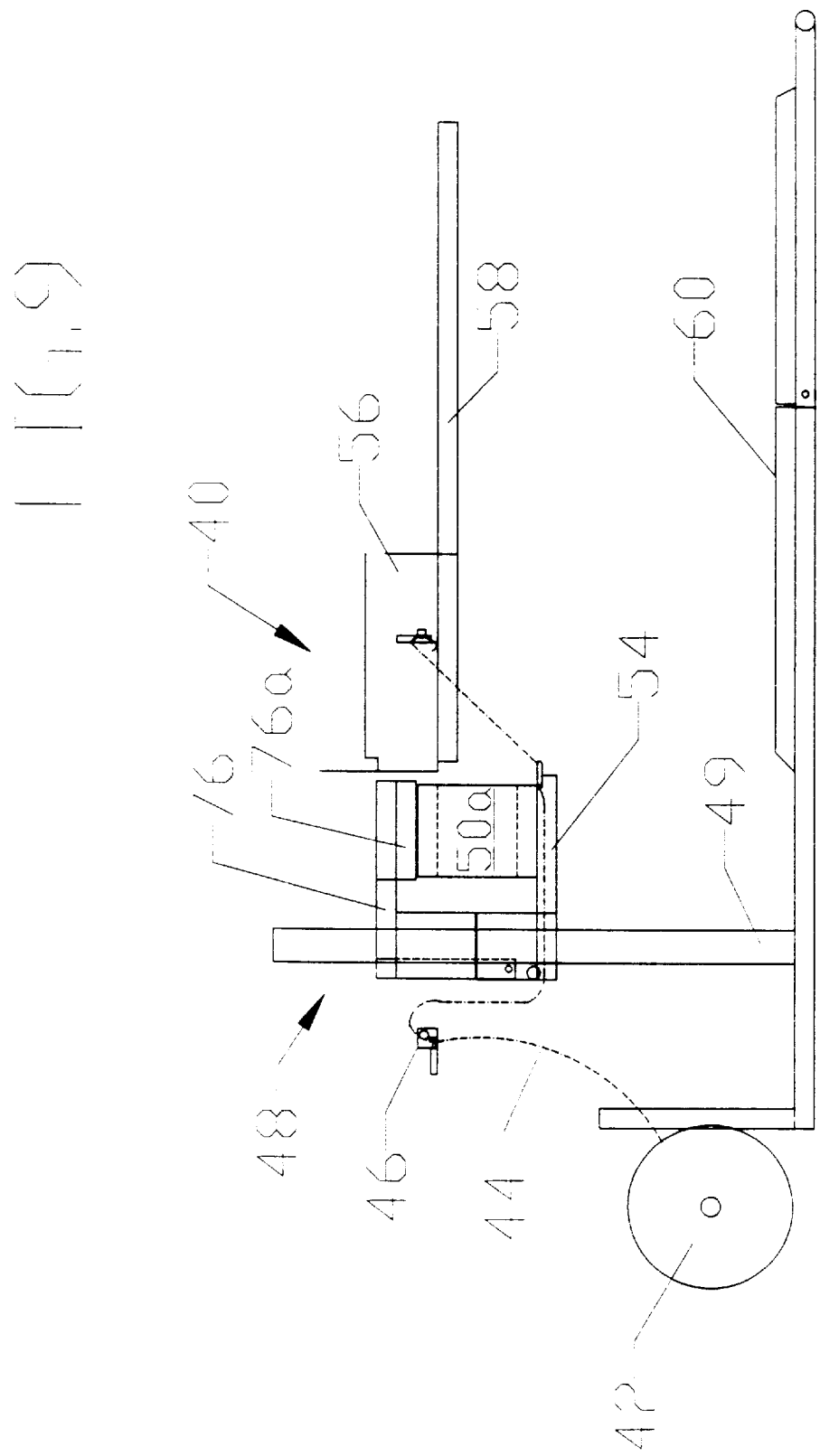
Figure 10:
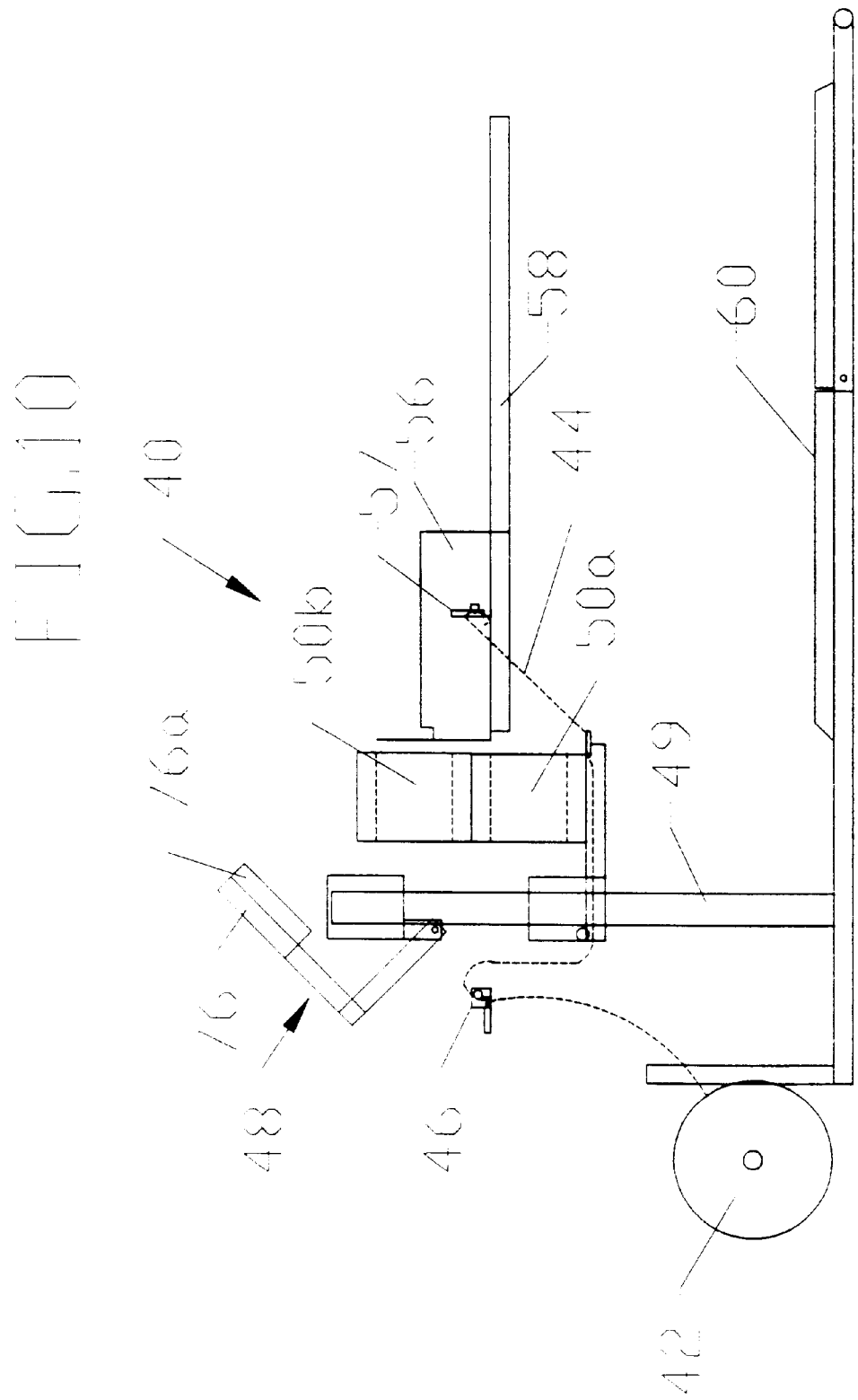
Figure 11:
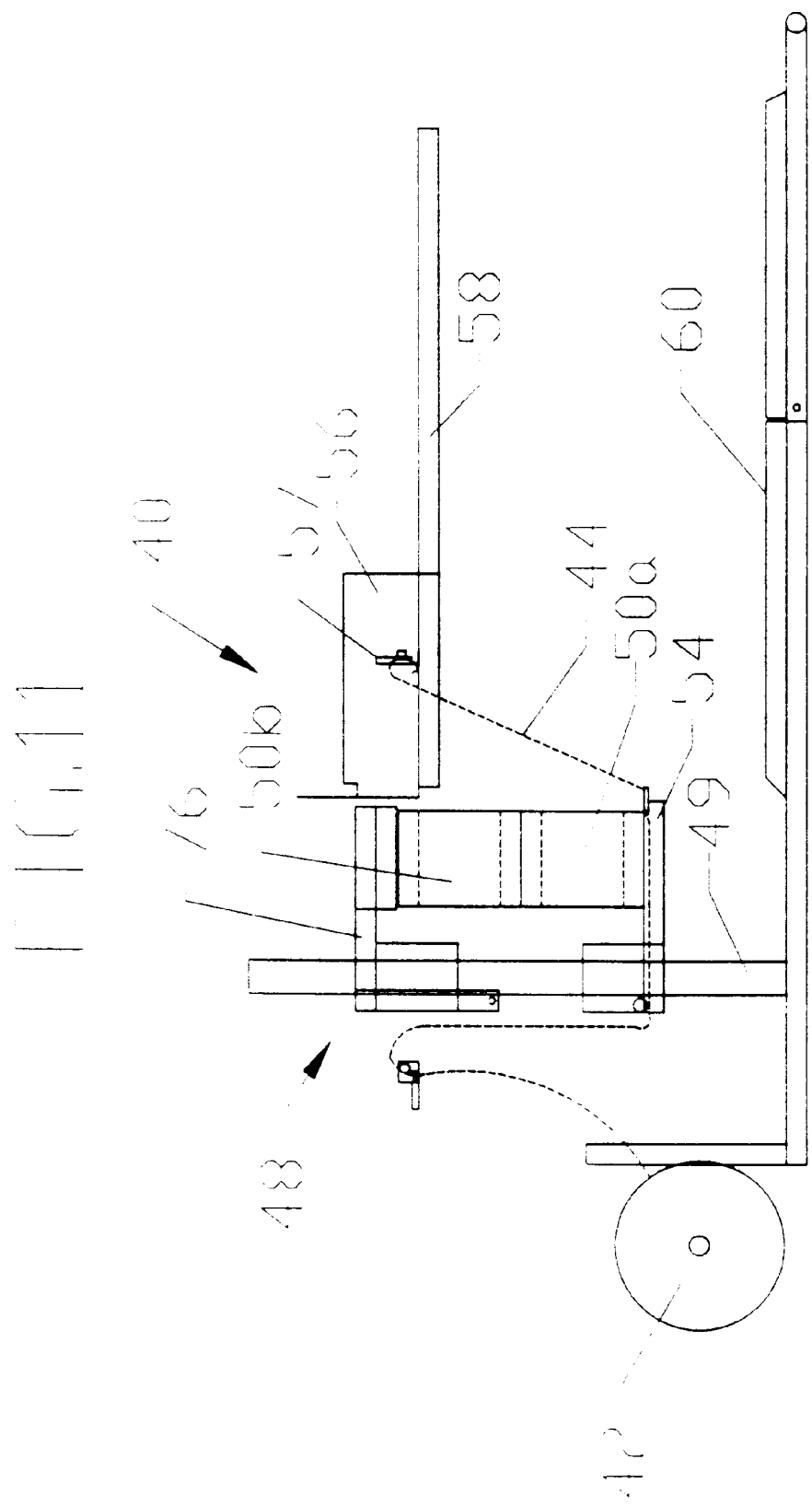
Figure 12:
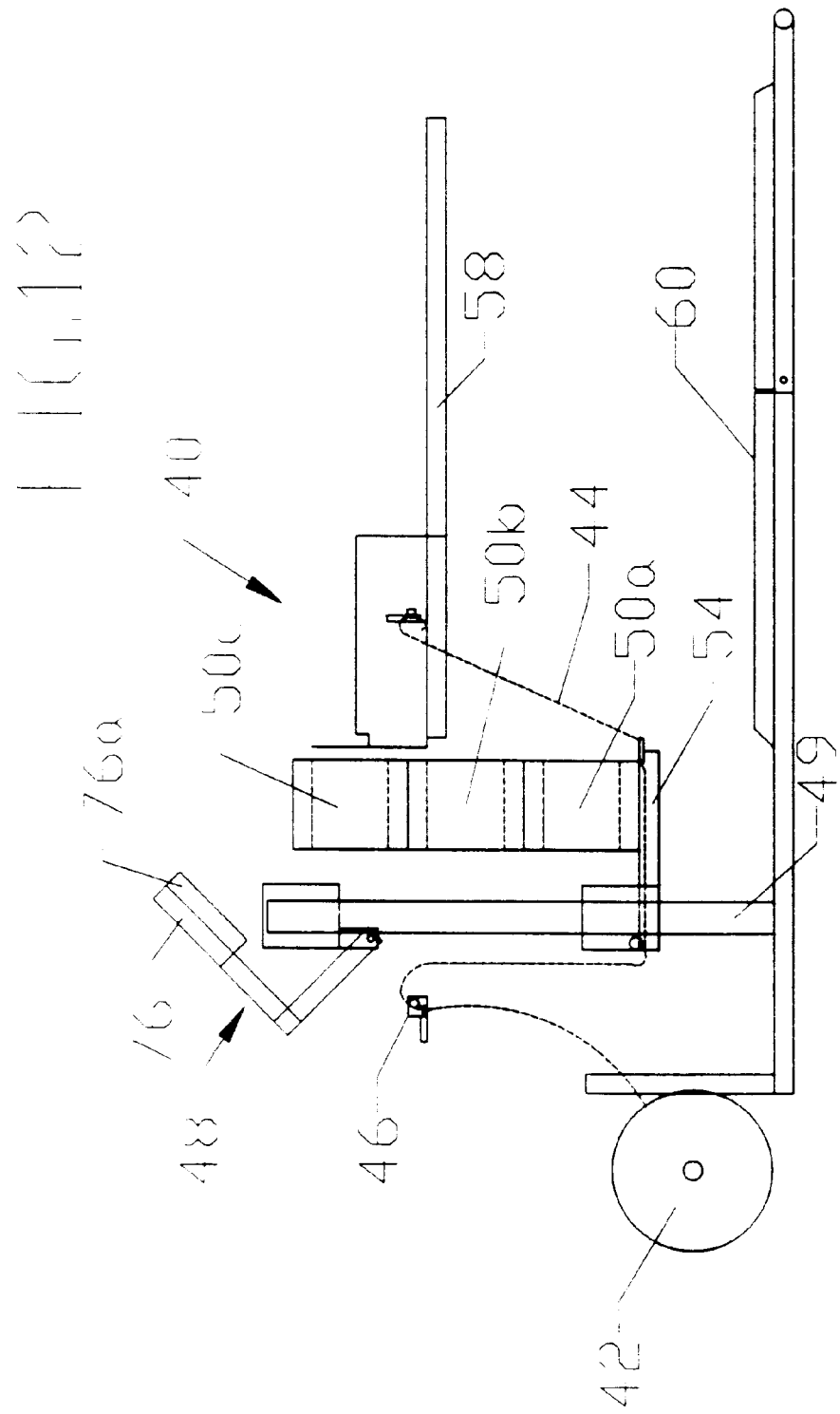
Figure 13:
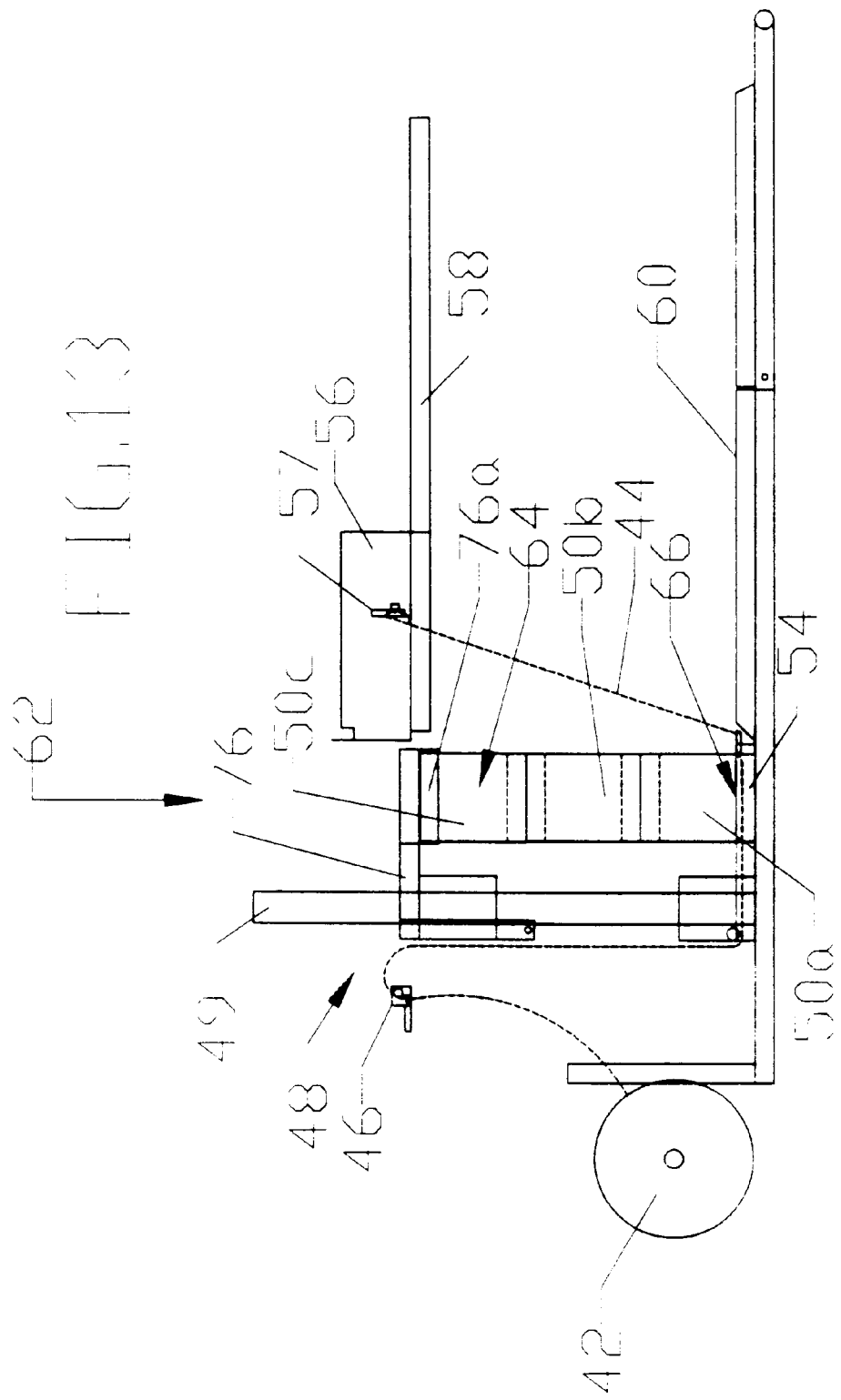
Figure 14:
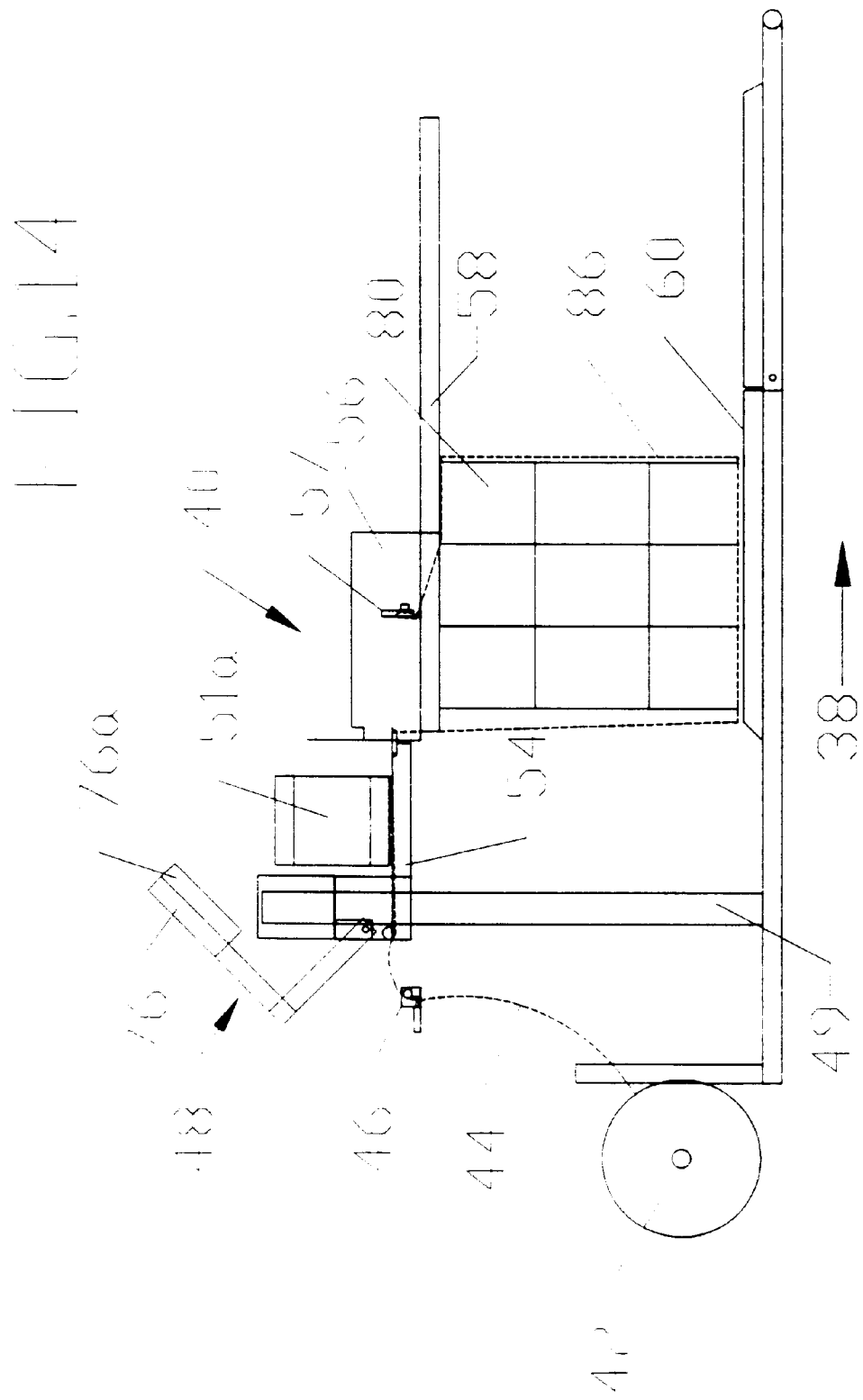

Banding 44 which is let off from the banding dispenser 42 is connected at one end thereof to a banding mechanism 57 within the banding apparatus 56. With hay bale 50a positioned on the strap guides 54, the pivoting arms 76 are lowered onto the upper surface of the hay bale as shown in FIG. 8. Attached to the lower surfaces of the pivoting arms 76 are a pair of vertical compression members 76a for forming upper banding zones within the hay bales as described below. With hay bale 50a securely positioned between pivoting arms 76 and strap guides 54, the hay bale is lowered by the vertical plunger 48 as shown in FIG. 9. As the vertical plunger 48 lowers hay bale 50a to form the first stack of three bales, banding 44 is let out by the banding clamp 46 and is maintained in contact with the lower surface of the hay bale 50a by means of the strap guides 54. With the strap guides 54 lowered a distance equal to the height of a hay bale, the upper portion of the vertical plunger 48 including the pivoting arms 76 is raised to receive a second hay bale 50b which is positioned on the first hay bale 50a as shown in FIG. 10. Again, pivoting arms 76 are lowered to a position in contact with the upper surface of the hay bale, as shown for the case of hay bale 50b in FIG. 11, and the vertical plunger 48 lowers the first and second hay bales 50a, 50b a distance equal to the height of the second hay bale. A third hay bale 50c is then positioned on top of the second hay bale 50b as shown in FIG. 12. The three hay bales 50a, 50b and 50c are thus supported by the strap guides 54 which have been separated from the upper portion of the vertical plunger 48 to accommodate the three stacked hay bales. The vertical plunger 48 is then displaced downwardly in the direction of arrow 62 as shown in FIG. 13 letting out additional banding 44 from the banding dispenser 42. During the stacking and lowering of the three hay bales, the end of banding 44 is securely clamped to the banding mechanism 57 within the banding apparatus 56. As shown in FIG. 13, the strap guides 54 form a pair of spaced, parallel lower compressed banding zones 66, while the vertical compression members 76a on the pivoting arms 76 form a pair of parallel, spaced upper compressed banding zones 64. As shown in FIG. 14, a first bundle 80 of three stacks of hay bales, each three bales high, has been formed by the hay bale stacking apparatus 40 with each successive stack of three hay bales displaced in the direction of arrow 38 causing additional banding 44 to be withdrawn from the banding dispenser 42 so that the banding is guided around three sides of the hay bale bundle and is disposed within the upper and lower compressed banding zones formed in the upper and lower rows of hay bales.

Figure 15:
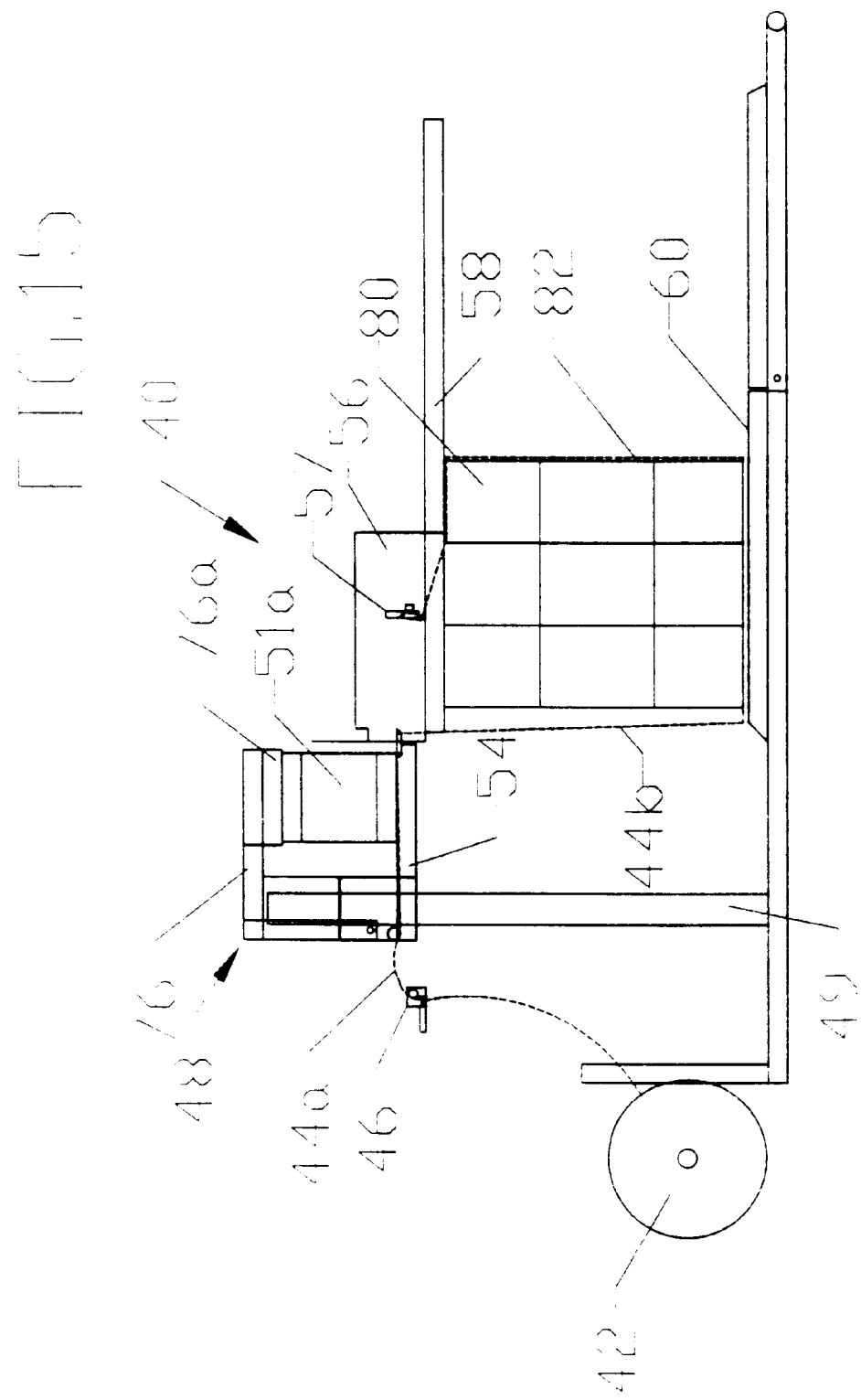
Figure 16:
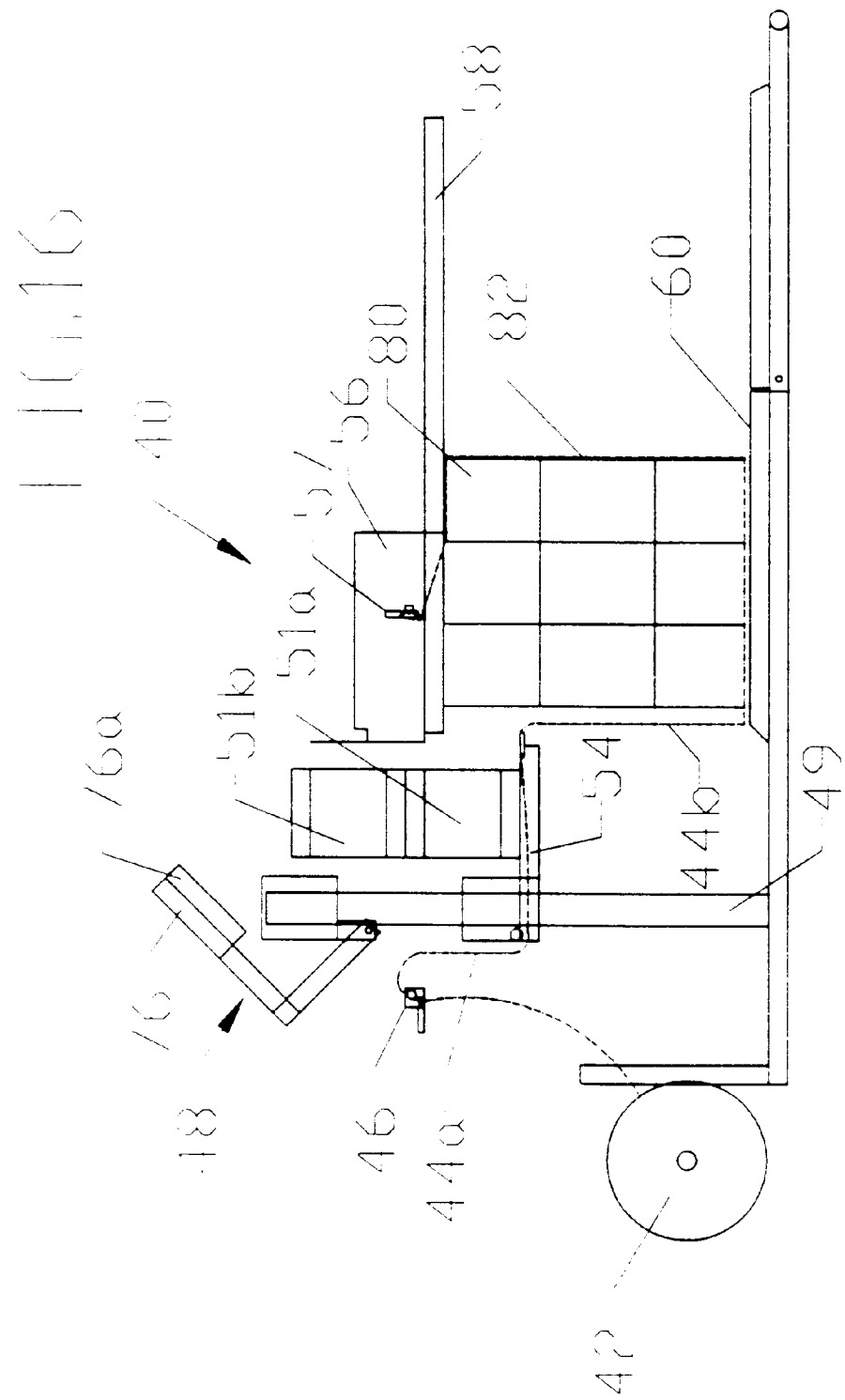
Figure 17:
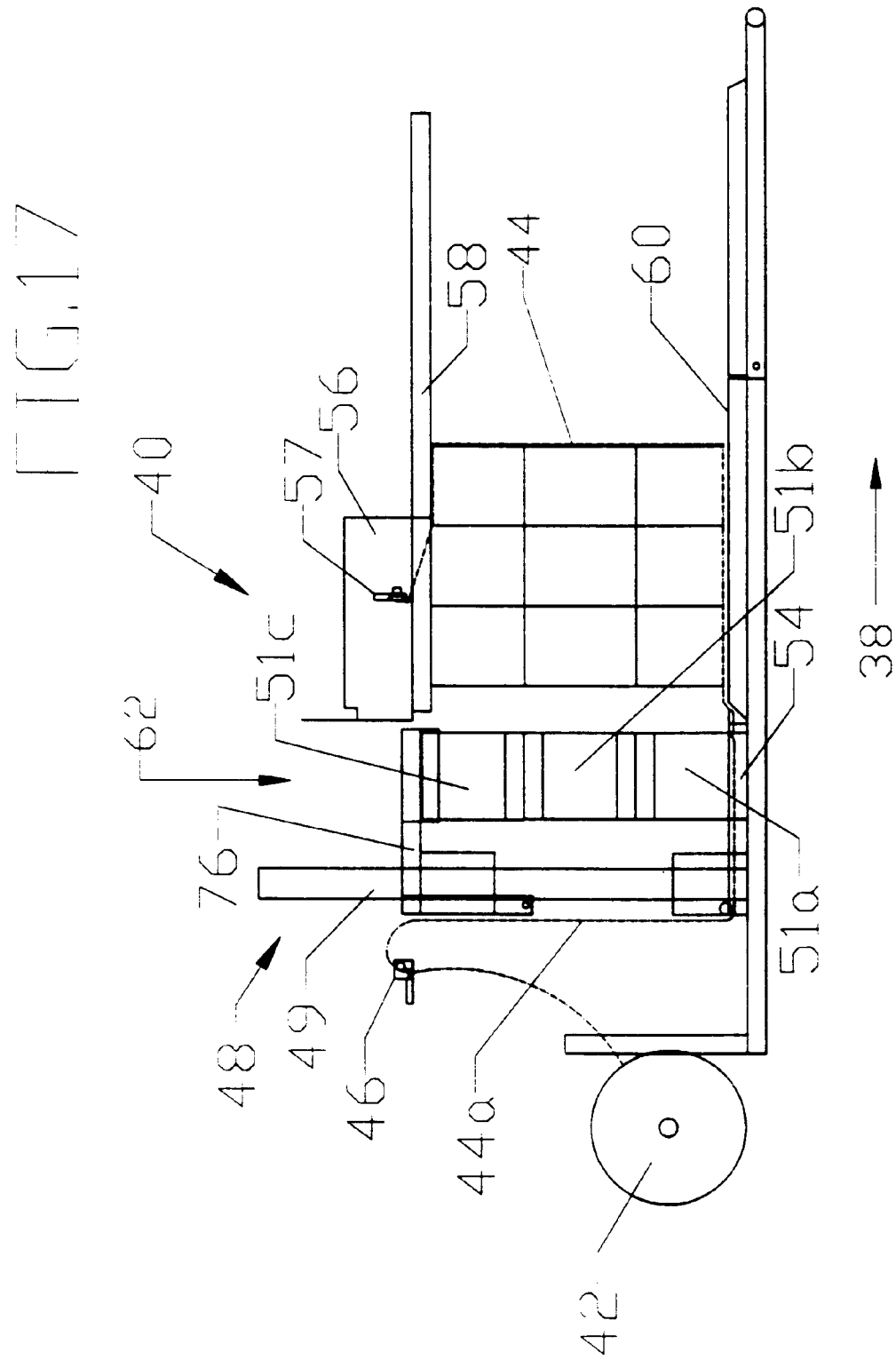

As each stack of three hay bales is displaced in the direction of arrow 38 so as to form a larger bundle of bales, the vertical plunger 48 returns to the raised position as shown in FIG. 14 for receiving the first bale of another stack of bales. As also shown in FIG. 14, hay bale 51a is positioned in the vertical plunger 48 and is disposed upon the strap guides 54. After the first stack of three bales of a particular bundle is displaced, the banding clamp 46 clamps and holds banding 44a as the vertical plunger 48 lowers hay bales 51a, 51b and 51c. This action pulls banding 44b through strap guides 54 to the position of banding 44a, removing the slack 44b that is created by the lowering of vertical plunger 48 in FIGS. 15, 16 and 17. In FIG. 15, pivoting arms 76 of the vertical plunger 48 are placed over and in contact with hay bale 51a and the hay bale is lowered as previously described. In FIG. 16, the vertical plunger 48 has received a second hay bale 51b which is disposed upon the lowered first hay bale 51a. In FIG. 17, the three stacked hay bales 51a, 51b and 51c are shown in the vertical plunger 48. Pivoting arms 76 are lowered in the direction of arrow 62 so as to form the upper compressed banding zones in the top hay bale 51c while the strap guides 54 form the lower compressed banding zones in the bottom hay bale 51a as previously described. During movement in the direction of arrow 38, the strap guides 54 guide the banding 44 on top of lower banding trough 60 and the banding is held there by each successively formed stack of three hay bales.

Figure 18:
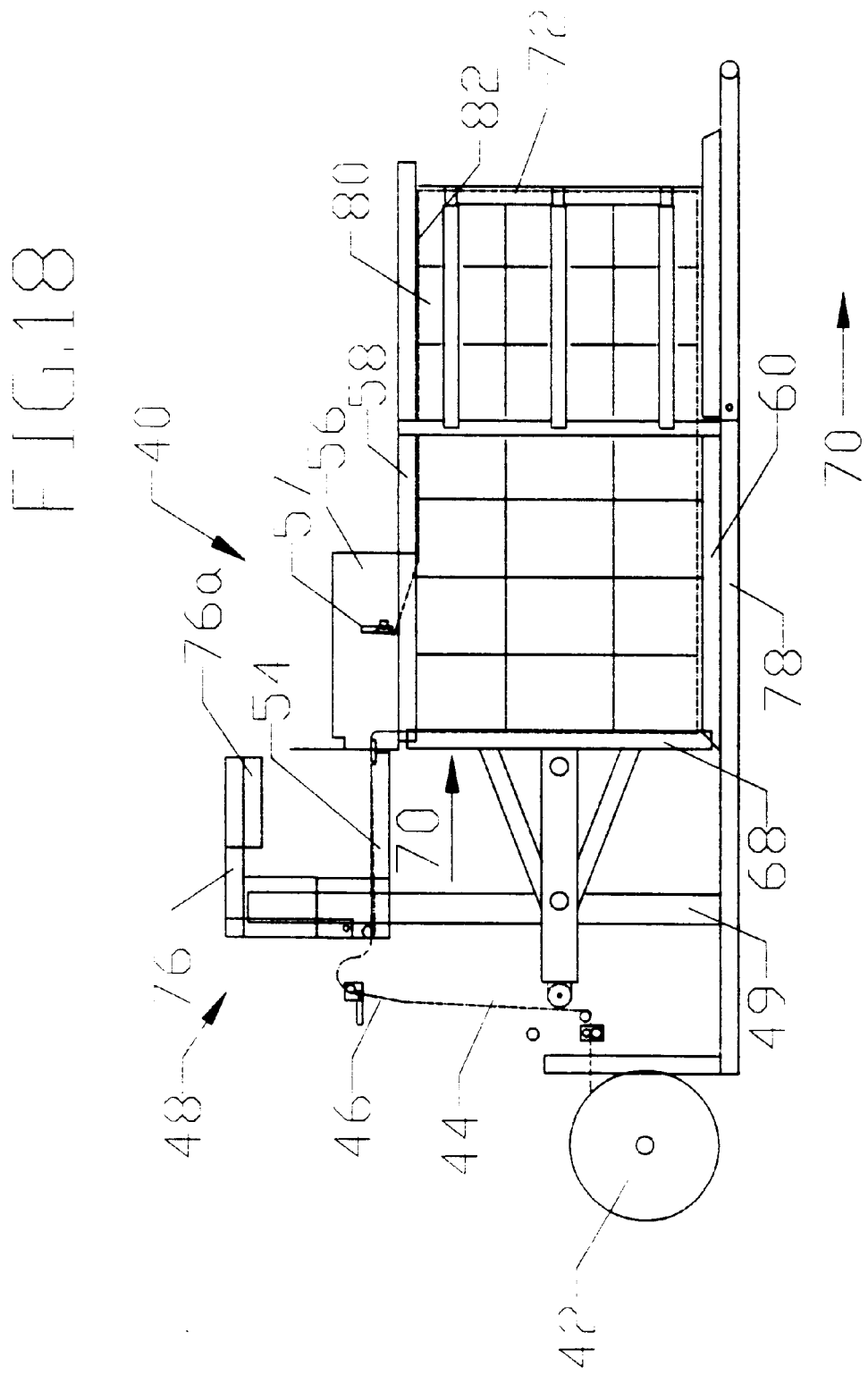
Figure 19:
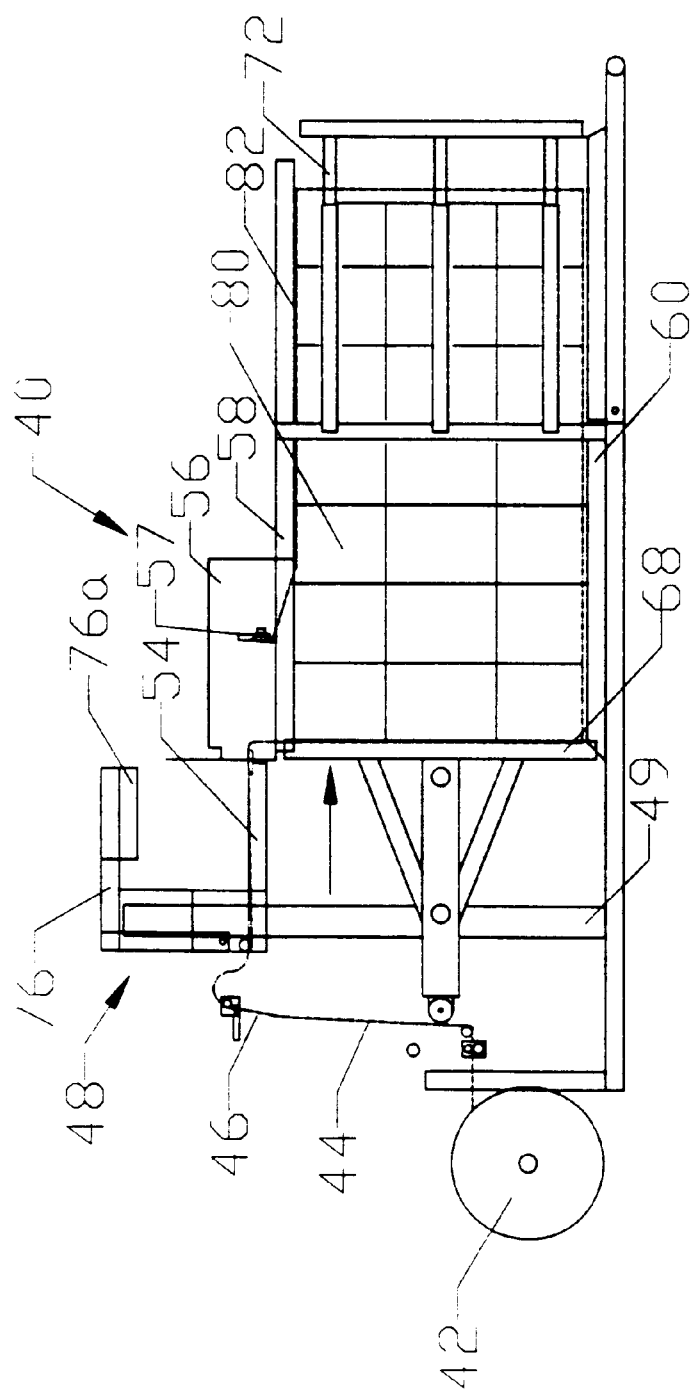
Figure 20:
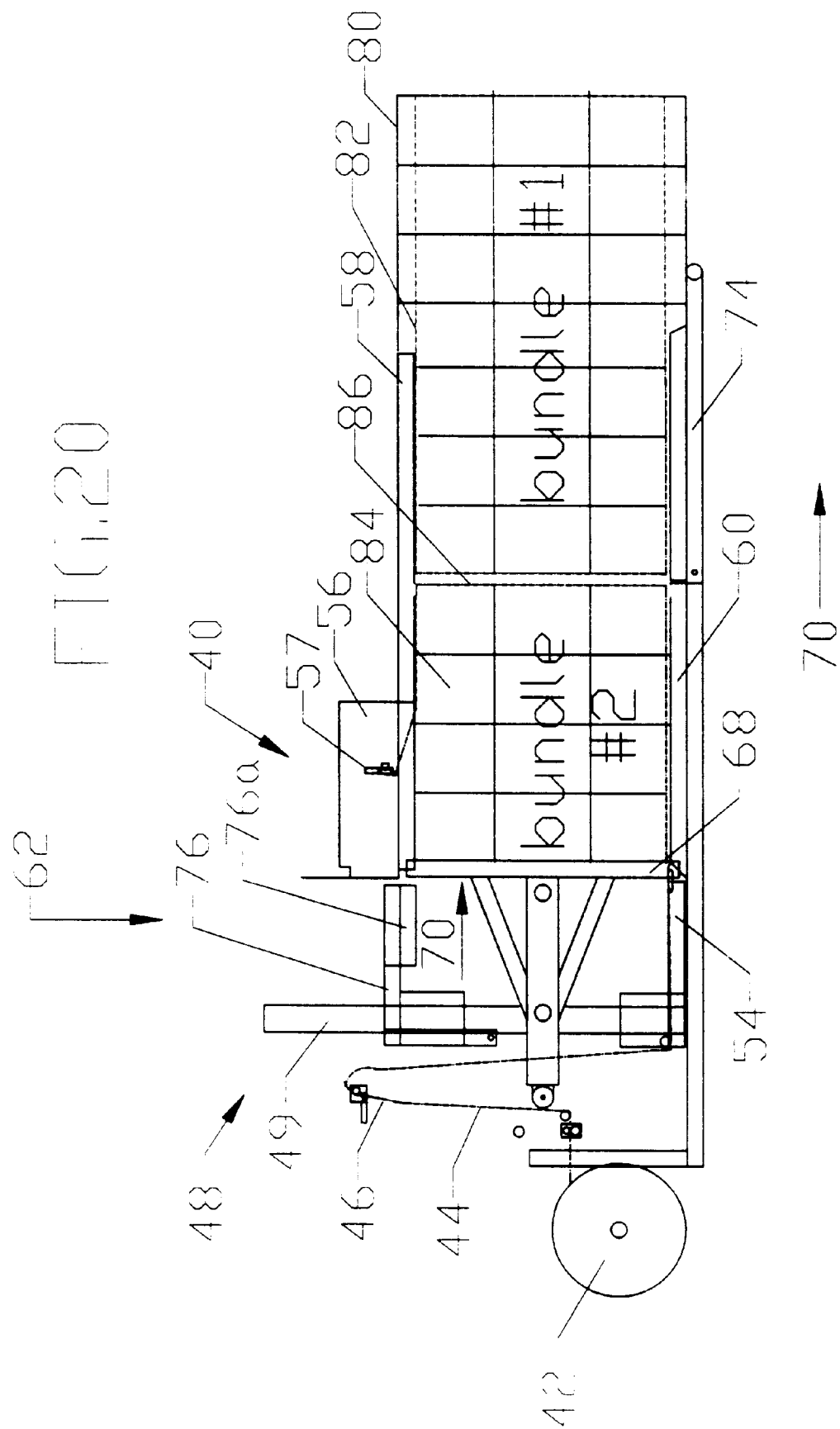
Figure 21:
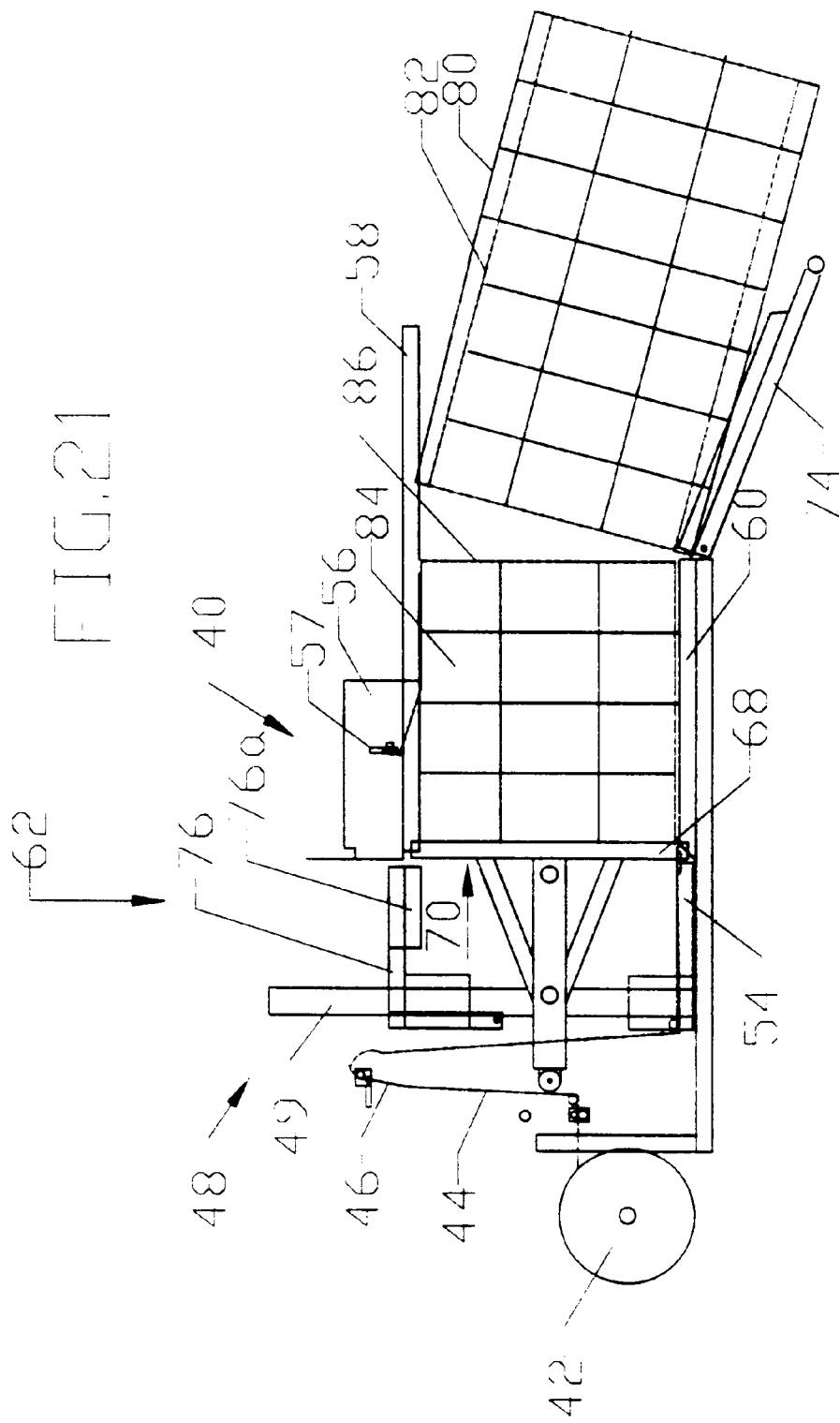

FIG. 18 shows a horizontal plunger 68 moving a first bundle of hay bales 80 in the direction of arrow 70. Hay bale bundle 80 is bound by a pair of bindings, one of which is shown in dotted line form as element 82. Disposed above bundle 80 is a pair of spaced upper compression members 58 and disposed below the bundle is a pair of lower spaced compression members 60 which are attached to a lower frame member 78. Each of the four compression members 58, 60 forms a respective banding trough and compression zone for receiving one of the bandings 82. A pair of back gates 72 (only one of which is shown in the figure for simplicity) on the aft portion of the hay bale stacking apparatus 40 are shown in the closed position in FIG. 18, allowing the hay bale bundle 80 to be horizontally compressed by the horizontal plunger 68 during the banding operation. Following the securing of bandings 82 about the periphery of the hay bale bundle 80, the back gates 72 are moved outwardly then to the right and left of the hay bale stacking apparatus 40 and assume an extended position as shown in FIG. 19. Following formation of the first hay stack bundle 80, a second hay stack bundle 84 is formed in a similar manner and is also moved rearwardly in the direction of arrow 70 by the horizontal plunger 68 as shown in FIG. 20. Continued rearward displacement of the second hay stack bundle 84 by the horizontal plunger 68 causes a corresponding rearward displacement of the first hay stack bundle 80. An aft, lower portion of the hay bale stacking apparatus 40 includes a hinged back floor 74 which may be released as shown in FIG. 21 for the discharge of the first hay bale bundle 80 as the second hay bale bundle 84 is moved by the horizontal plunger 68 in the direction of arrow 70. The second hay stack bundle 84 will next be discharged from the hay bale stacking apparatus 40 in a similar manner following the formation and rearward displacement of a third hay stack bundle which is not shown in the figure.

Figure 22:
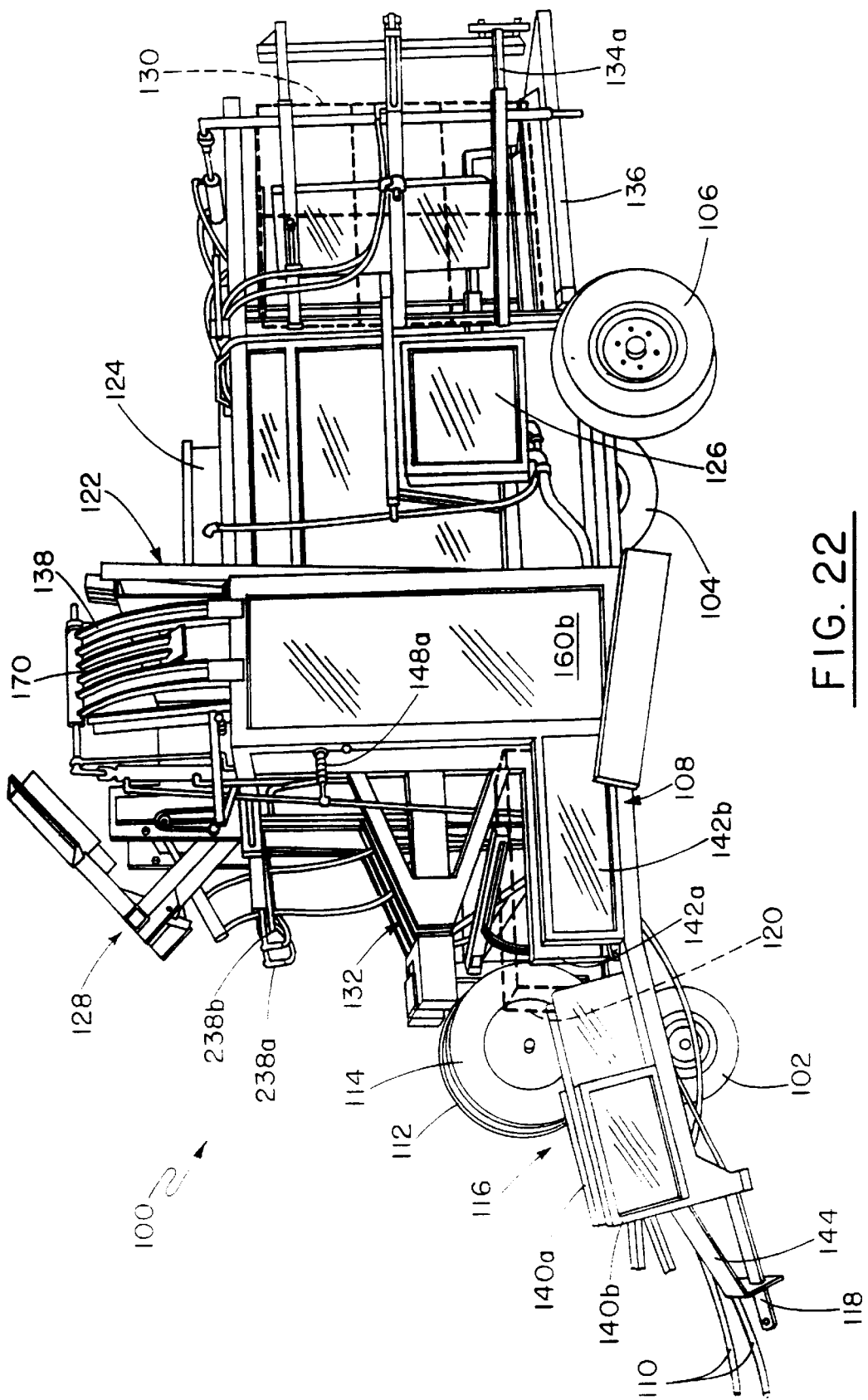
FIG. 22 is a side view of the hay bale stacking apparatus of the present invention.

Referring to FIGS. 22–39, additional details of the structure and operation of the hay bale stacking apparatus 100 of the present invention will now be described. Hay bale stacking apparatus 100 includes a hay bale receiving or inlet portion 116 adapted to receive a hay bale 120 shown in FIG. 22 in dotted line form. The bale receiving portion 116 of the hay bale stacking apparatus 100 sequentially delivers hay bales to a vertical lift or elevator 122 which lifts the bale while reorienting the bale 90° from the orientation of bale 120 as shown in FIG. 22 and delivers the bales to an upper portion of a vertical plunger 128. The hay bales may be provided to the hay bale receiving portion 116 of the stacking apparatus either by hand or automatically by a hay baler (not shown for simplicity) which may be disposed in front of and connected to the hay bale receiving portion. The hay bale stacking apparatus 100 is intended for "on-the-go" operation as it traverses a field of hay. Vertical plunger 128 forms a vertical stack of three hay bales, vertically compresses the stacked bales forming a pair of elongated, linear banding zones in the top and bottom bales, and delivers the three stacked bales to a horizontal plunger 132. Horizontal plunger 132 moves the three stacked bales toward the rear of the hay bale stacking apparatus 100, or to the right as viewed in FIG. 22. In moving each stack of three hay bales rearwardly, the vertical plunger 128 forms a bundle of stacked hay bales, preferably three bales high and seven bales in width as shown and described below. The bundle of hay bales is tightly wrapped by a pair of bands disposed about the bundle by means of a pair of strap guides and upper and lower compression members in combination with a banding apparatus 124 located on an upper portion of the hay bale stacking apparatus 100. Continued rearward displacement of the successively stacked bales of hay causes the banded large bundle of hay bales to be discharged from an aft portion of the hay bale stacking apparatus 100 after a pair of back gates 134a and 134b are opened and a back floor 136 hingedly coupled to a floor 230 of the apparatus is lowered as described in detail below. The large bundle of banded hay bales is thus deposited in a field as the hay bale stacking apparatus 100 is transported through the field in an "on-the-go" operation.

Figure 33:
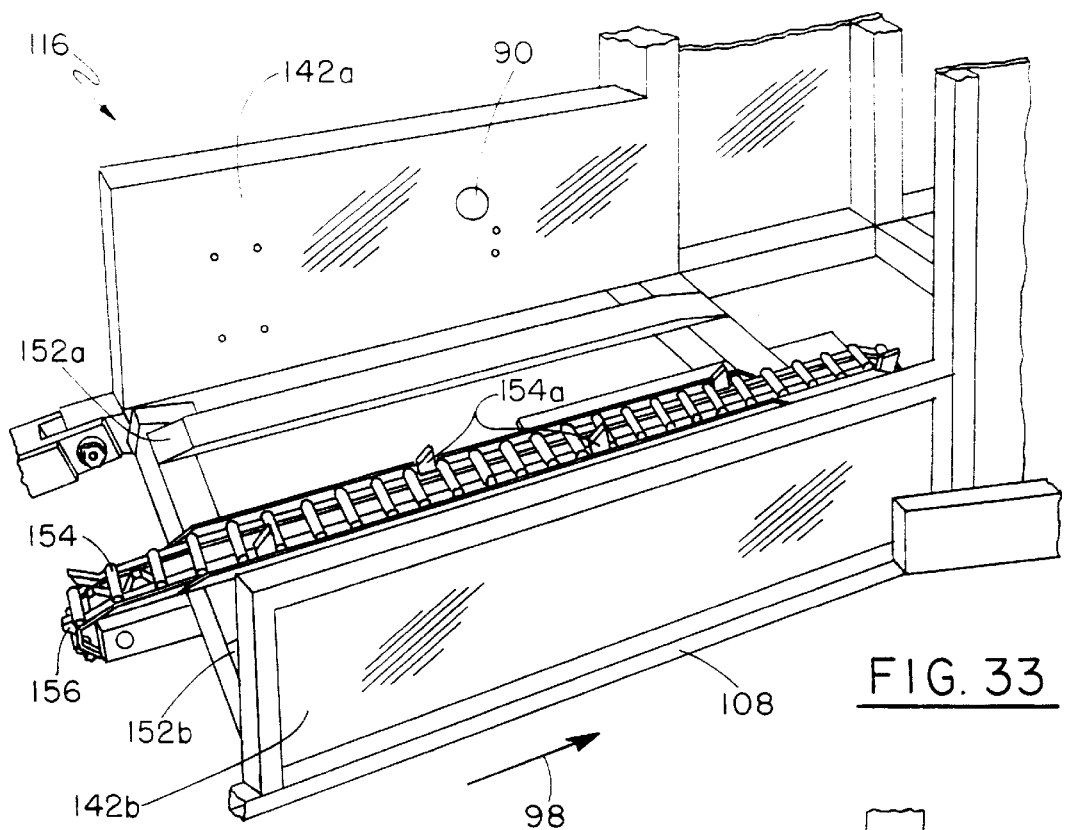
FIG. 33 is a perspective view of a proportion of the hay bale stacking apparatus illustrating the hay bale inlet or receiving conveyor.

Attached to a forward portion of the bale receiving portion 116 of the hay bale stacking apparatus 100 is a hitch 118 to facilitate pulling of the stacking apparatus aft of a baler by a traction vehicle (not shown in the figures for simplicity). The bale receiving portion 116 includes a bale support panel 144, a bale door 145, three forward support members 158, and a pair of aft support members 152a and 152b for supporting the hay bales as they are displaced rearwardly toward vertical lift 122. First and second forward guide panels 140a and 140b in combination with third and fourth aft guide panels 142a and 142b ensure that the hay bales loaded onto the bale receiving portion 116 are moved to the vertical lift 122 without being discharged or falling from the apparatus. The bale receiving portion 116 includes an endless transport chain 154 as shown in greater detail in the perspective view of FIG. 33. The transport chain drive mechanism includes forward and aft sprockets where only the forward sprocket 156 is shown in FIG. 33 for simplicity. One of these sprockets is connected to drive means such as a hydraulic motor which also is not shown in the figures. Disposed in a spaced manner along the transport chain 154 are a plurality of teeth 154a for engaging the hay bales and transporting them rearwardly toward and into the vertical lift 122. Element 108 generally designates the support frame of the hay bale stacking apparatus 100 which supports the various components of the stacking apparatus which are described in detail below. As the hay bales are received by the bale receiving portion 116, they are displaced in the direction of arrow 98 in FIG. 33. An optical sensor 90 such as a photoswitch detects the presence of a hay bale and activates the hydraulic motor which drives the transport chain 154.

Vertical lift 122 raises the hay bales to an upper portion of the hay bale stacking apparatus 100 and positions the hay bales on a vertical plunger 128. Vertical lift 122 includes first and second side panels 160a and 160b as well as a forward guide panel 162 and an aft guide panel 174 as more clearly shown in the partially cut away perspective view of FIG. 35. The aforementioned panels align each hay bale with its longitudinal axis generally vertical and confine the hay bale so that it is properly positioned at the upper end of the vertical lift 122 for deposit in the vertical plunger 128. The lower portion of the forward guide panel 162 is curved so as to guide the hay bales to the proper position within the vertical lift 122. Forward guide panel 162 is mounted to the support frame by means of a plurality of springs 148a and 148b to permit the forward guide panel to urge the moving bales into the vertical lift 122 with their lengthwise axis aligned generally vertical. An endless lift chain 164 disposed within the vertical lift 122 engages and raises the hay bales to an upper portion of the vertical lift. Lift chain 164 is coupled to upper and lower sprockets, where the lower sprocket is shown as element 184 in FIG. 35. Sprocket 184 serves as the drive sprocket for the lift chain 164 as it is coupled to and driven by a hydraulic motor 180. Disposed along the length of the chain 164 in a spaced manner are a plurality of teeth 182 which engage and raise the hay bales within the vertical lift 122 in the direction of arrow 146 in FIG. 35. A second optical sensor (not shown for simplicity) in the vertical lift 122 detects the presence of a hay bale to hold the bale in the vertical lift.

Figure 23:
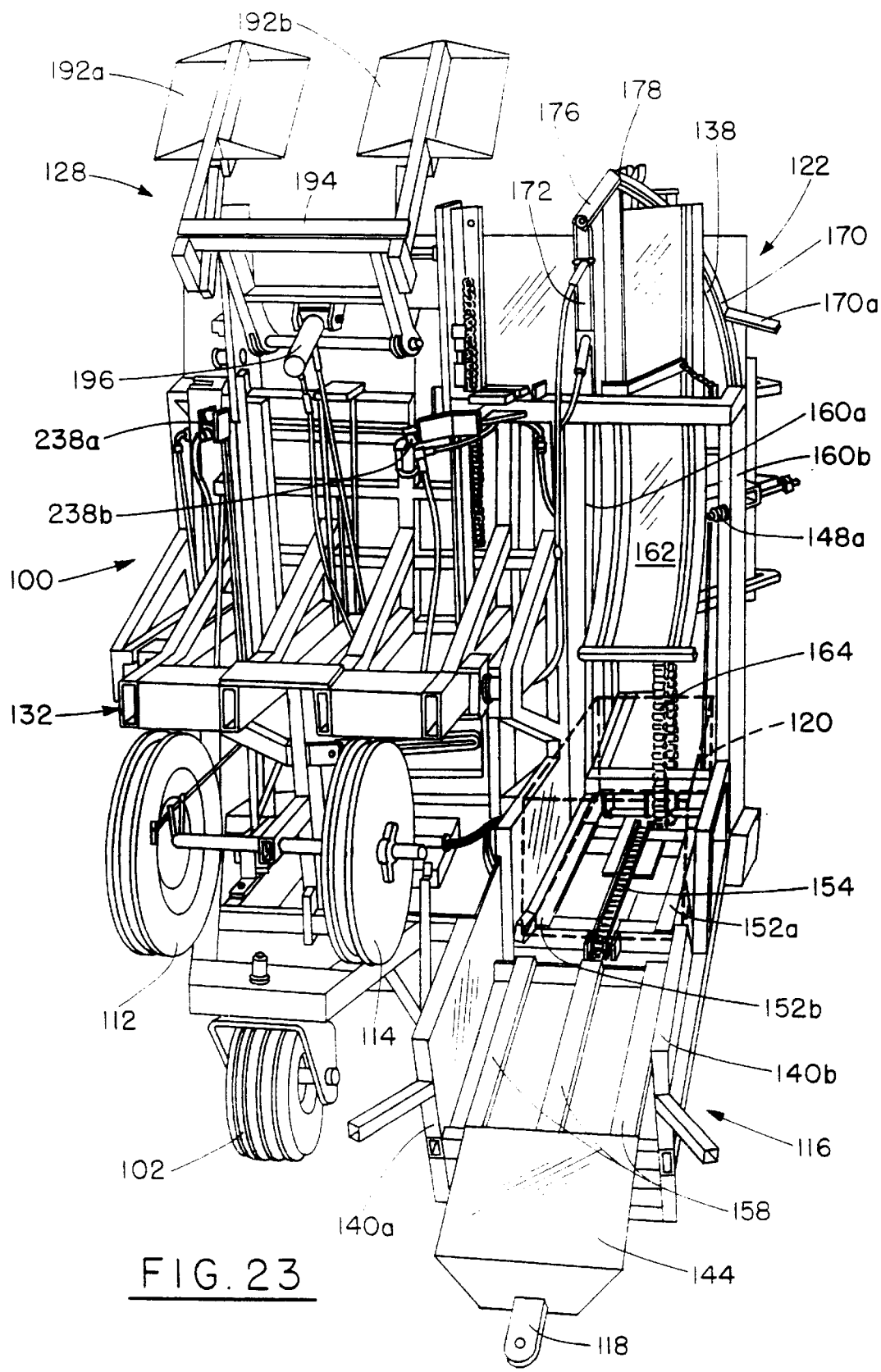
FIG. 23 is a perspective view of the front portion of the hay bale stacking apparatus shown in FIG. 22.
Figure 24:
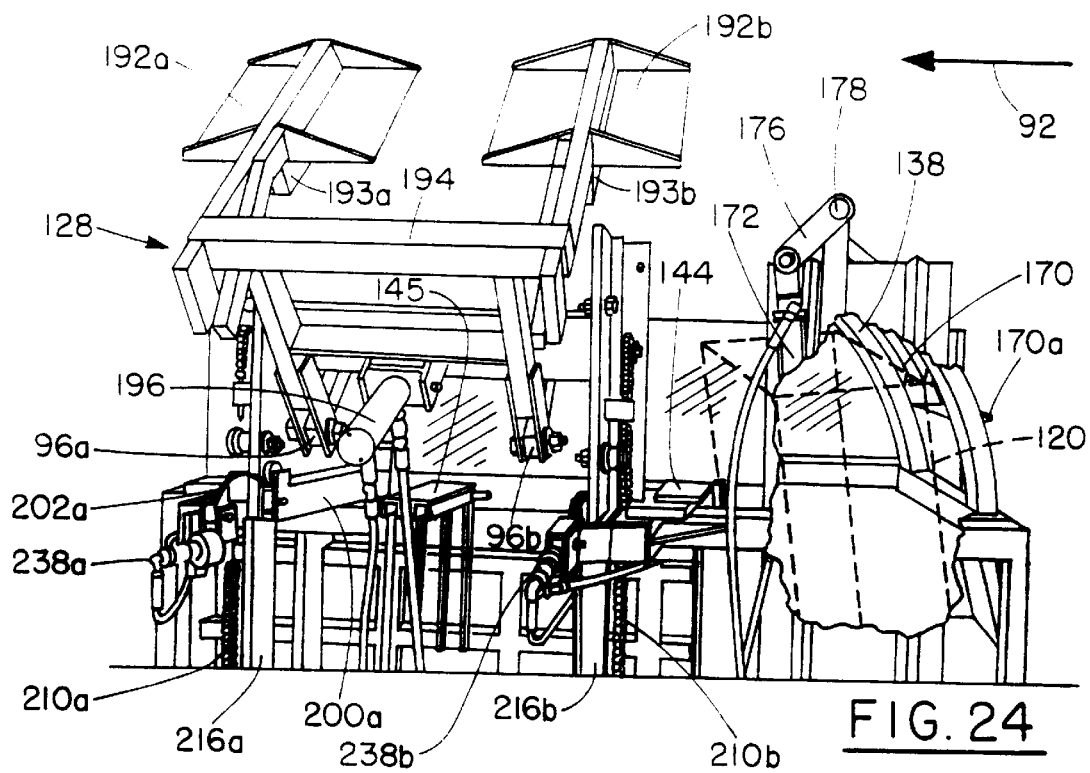
FIG. 24 is a perspective view of an upper, front portion of the hay bale stacking apparatus of FIG. 22 showing the pivoting arms of the vertical plunger in the upraised position.
Figure 25:
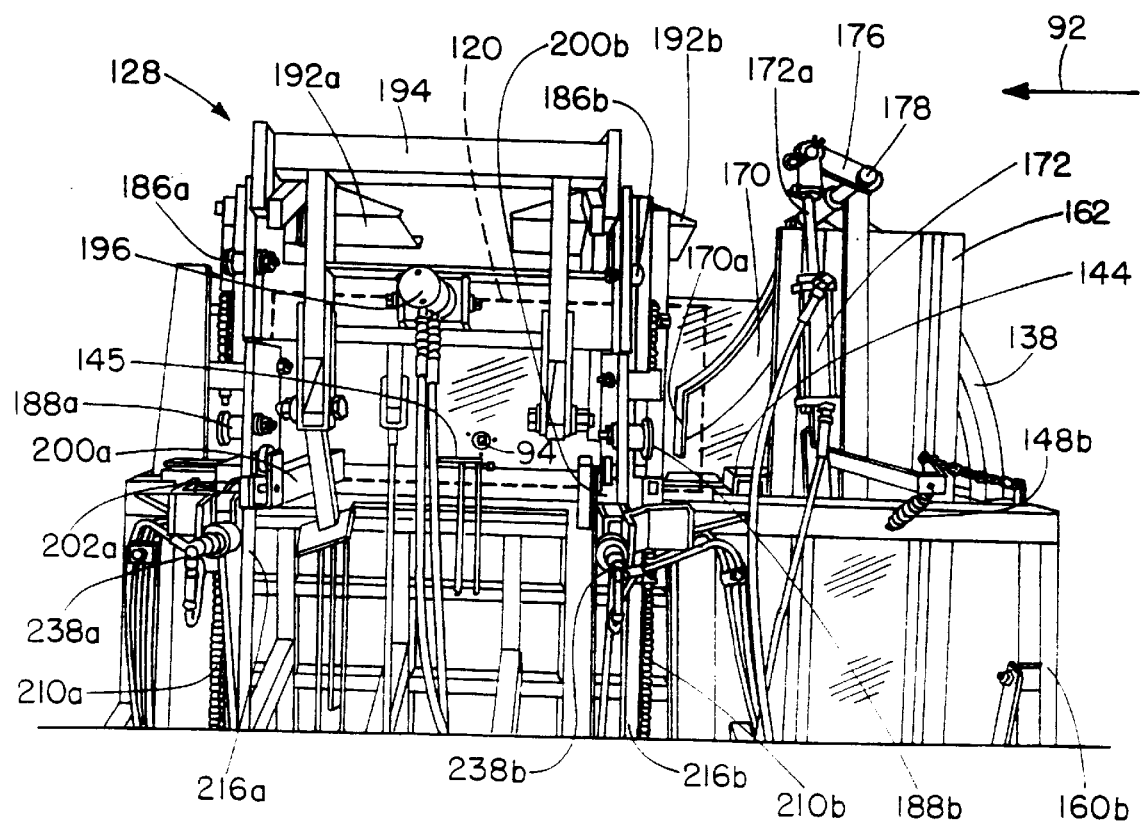
FIG. 25 is a perspective view of the upper portion of the hay bale stacking apparatus as shown in FIG. 24 showing the pivoting arms of the vertical plunger in the lowered position.

Disposed in an upper portion of the vertical lift 122 are a plurality of curvilinear guide members 138 which engage and turn the hay bale 120 as shown in FIGS. 24 and 25 so as to change the orientation of the hay bale from vertical to horizontal, or flat. As also shown in the partially cut away view of FIG. 24, as the upper outer corner of hay bale 120 engages the curvilinear guide members 138, continued upward displacement of the hay bale causes it to assume a generally horizontal, or flat, orientation and to be displaced leftward in the direction of arrow 92 in FIGS. 24 and 25. Once oriented horizontally, the hay bale 120 is positioned upon support panel 144. The hay bale is then displaced horizontally onto first and second strap guides 200a and 200b by means of a kicker arm 170. Kicker arm 170 is initially aligned with the curvilinear guide members 138 and has disposed on a lower end thereof a kicker plate 170a. Kicker arm 170 is attached to and supported by a pivot shaft 178 at its upper end. Connected to pivot shaft 178 by means of a pivot arm 176 is a hydraulic cylinder 172 having an extendible rod 172a. In the retracted position, as shown in FIGS. 23 and 24, kicker arm 170 is aligned with the curvilinear guide members 138 and kicker plate 170a is disposed outside of the guide members. Following the lifting and horizontal reorientation of a hay bale by the vertical lift 122, rod 172a is extended from the hydraulic cylinder 172 causing clockwise rotation of the pivot shaft 178 and kicker arm 170 attached thereto as viewed in FIG. 25. Kicker plate 170a engages and displaces hay bale 120 to the left as viewed in FIG. 25 so that the hay bale rests upon and is supported by the first and second strap guides 200a, 200b. In this position, hay bale 120 is ready for stacking by the vertical plunger 128 as described in the following paragraphs. The kicker arm 170 and its plate 170a also compress bales that are too long approximately 3–4 inches. Following displacement of the hay bale 120 onto the first and second strap guides 200a, 200b, hydraulic cylinder 172 retracts its extendible arm 172a resulting in kicker arm 170 again assuming a position in alignment with curvilinear guide members 138 in the upper portion of the vertical lift 122. A photo-electric sensor 94 detects the presence of a hay bale at the top of the vertical lift 122 for activating the kicker arm 170 for moving the bale onto the vertical plunger 128.

Figure 26:
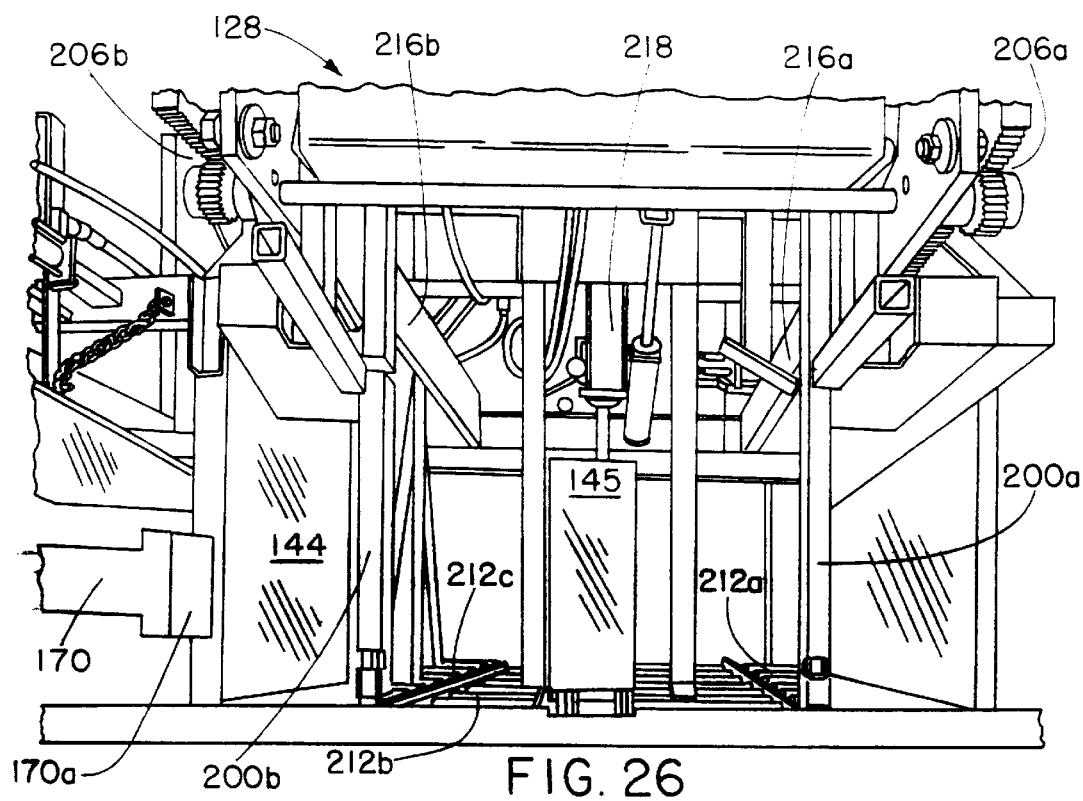
FIG. 26 is a top plan view of the vertical and horizontal plunger portions of the hay bale stacking apparatus of the present invention.

Vertical plunger 128 includes first and second pivoting arms 192a and 192b. Pivoting arms 192a, 192b are coupled by cross members such as connecting arm 194 and move in unison. The pivoting arm assembly is pivotally coupled to the vertical plunger 128 by means of first and second pivot couplings 96a and 96b. The first and second pivoting arms 192a, 192b are moved between an upraised position as shown in FIGS. 23 and 24 and a lowered position as shown in FIG. 25. The pivoting arm assembly in the vertical plunger 128 is moved between the upraised and lowered position by means of a hydraulic cylinder 196 connected to a cross member of the assembly. Disposed below the first and second pivoting arms 192a, 192b when in the lowered position are the first and second strap guides 200a, 200b. Vertical plunger 128 is mounted to and supported by first and second vertical rails 216a and 216b. Attached to aft portions of the first and second vertical rails 216a and 216b are respective racks, while a pair of pinions are coupled to the vertical plunger 128 as shown in FIG. 26. The first and second rack and pinion arrangements 206a, 206b allow for vertical displacement of the vertical plunger 128 on the first and second vertical rails 216a, 216b. A pair of single flange rollers 186a and 186b allow the vertical plunger 128 to be displaced vertically on the first and second vertical rails 216a, 216b.

The first and second strap guides 200a, 200b are also respectfully attached to and supported by the first and second vertical rails 216a and 216b. Strap guides 200a, 200b support the hay bales as they are lowered and guide the banding into the banding apparatus 124 as well as to the lower banding compression zones. Upper and lower sprockets in combination with an endless drive chain are disposed on respective forward portions of each of the vertical rails. Thus, drive chain 210a is disposed on vertical rail 216a, while drive chain 210b is disposed on vertical rail 216b. The aforementioned sprockets are omitted from the drawings for simplicity. Drive chain 210a is coupled to the first strap guide 200a, while drive chain 210b is coupled to the second strap guide 200b. Each of the first and second drive chains 210a, 210b is displaced by a respective drive sprocket for raising and lowering the first and second strap guides 200a and 200b on the first and second vertical rails 216a and 216b. First and second double flange rollers 188a and 188b allow the first and second strap guides 200a, 200b to be displaced vertically on the first and second vertical rails 216a, 216b.

As previously described, vertical plunger 128 in combination with the first and second strap guides 200a, 200b arranges three hay bales in a vertical stack and compresses the stack of bales for forming a large bundle of hay bales. The vertical plunger 128 and strap guides 200a, 200b move downwardly the thickness of one bale as detected by a proximity switch (not shown) with the deposit of a hay bale on the vertical plunger 128. With three hay bales arranged in a vertical stack, the first and second pivoting arms 192a, 192b are lowered onto the upper hay bale and the stack of hay bales is compressed. Upper compression members 193a and 193b respectively attached to the first and second pivoting arms 192a, 192b form a pair of upper compression banding zones in the upper hay bale, while the first and second strap guides 200a, 200b form a pair of lower compression banding zones in the bottom hay bale as previously described.

Figure 27:
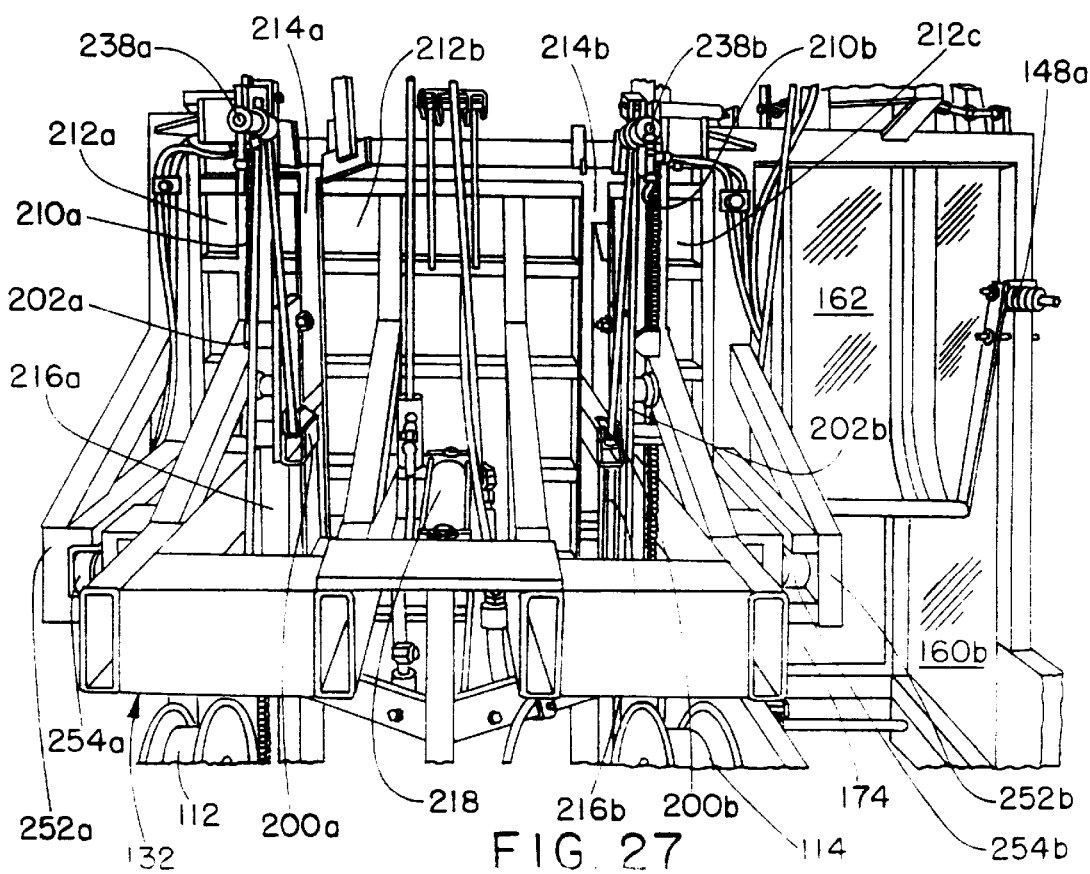
FIG. 27 is a front view of a lower portion of the hay bale stacking apparatus of FIG. 22.

Disposed in a forward portion of the hay bale stacking apparatus 100 is a horizontal plunger 132. Horizontal plunger 132 includes first, second and third vertical panels 212a, 212b and 212c. A first vertical slot 214a is disposed between panels 212a and 212b, while a second vertical slot 214b is disposed between panels 212b and 212c. The first strap guide 200a is disposed within slot 214a, while the second strap guide 212b is disposed within slot 214b. The elongated, vertical slots 214a, 214b allow the first and second strap guides 200a, 200b to be displaced vertically within the hay bale stacking apparatus, while permitting the three panels 212a, 212b, and 212c to engage and displace a vertical stack of three hay bales rearwardly within the apparatus in forming a bundle of stacked hay bales. The three panels 212a, 212b and 212c are connected by various structural members of the horizontal plunger 132 to allow the three panels to be displaced in unison forward and aft by means of a hydraulic cylinder 218. Each of the strap guides 200a, 200b has a generally rectangular cross section and is in the form of a hollow tube permitting a strip of banding to extend through the strap guide from one end to the other. Thus, first and second strips of banding 202a and 202b are respectively let off of the first and second banding dispensers 112, 114 and are routed through the first and second strap guides 200a and 200b. This arrangement allows the vertical plunger 128 and pair of strap guides 200a, 200b to arrange the hay bales in stacks of three, while wrapping the two strips of banding about a bundle of stacked hay bales. Following the stacking of three hay bales, the horizontal plunger 132 is displaced rearwardly with the extension of the rod of hydraulic cylinder 218 causing panels 212a, 212b and 212c to engage and displace rearwardly a stack of three hay bales in forming a bundle of hay bales as previously described. The first and second strips of banding 202a and 202b are respectively directed through first and second banding clamps 238a and 238b before entering the first and second strap guides 200a, 200b. Banding clamps 238a, 238b control the let out and take up of the strips of banding 202a, 202b from the two banding dispensers 112 and 114 and pull the banding from the rear of a strap guide to the front of the strap guide. Rollers 254a and 254b are attached to respective lateral portions of horizontal plunger 132. Fixed structural members 252a and 252b each having a respective slot therein are oriented generally horizontal and are aligned parallel as shown in FIG. 27. The first and second rollers 254a, 254b are disposed in respective slots in the first and second structural members 252a, 252b allowing for forward a forward displacement of the horizontal plunger 132 by means of hydraulic cylinder 218. The horizontal plunger 132 is in the extended position upon the delivery of a first bale to the vertical plunger 128 to permit the bale door 145 to catch the first bale.

Figure 28:
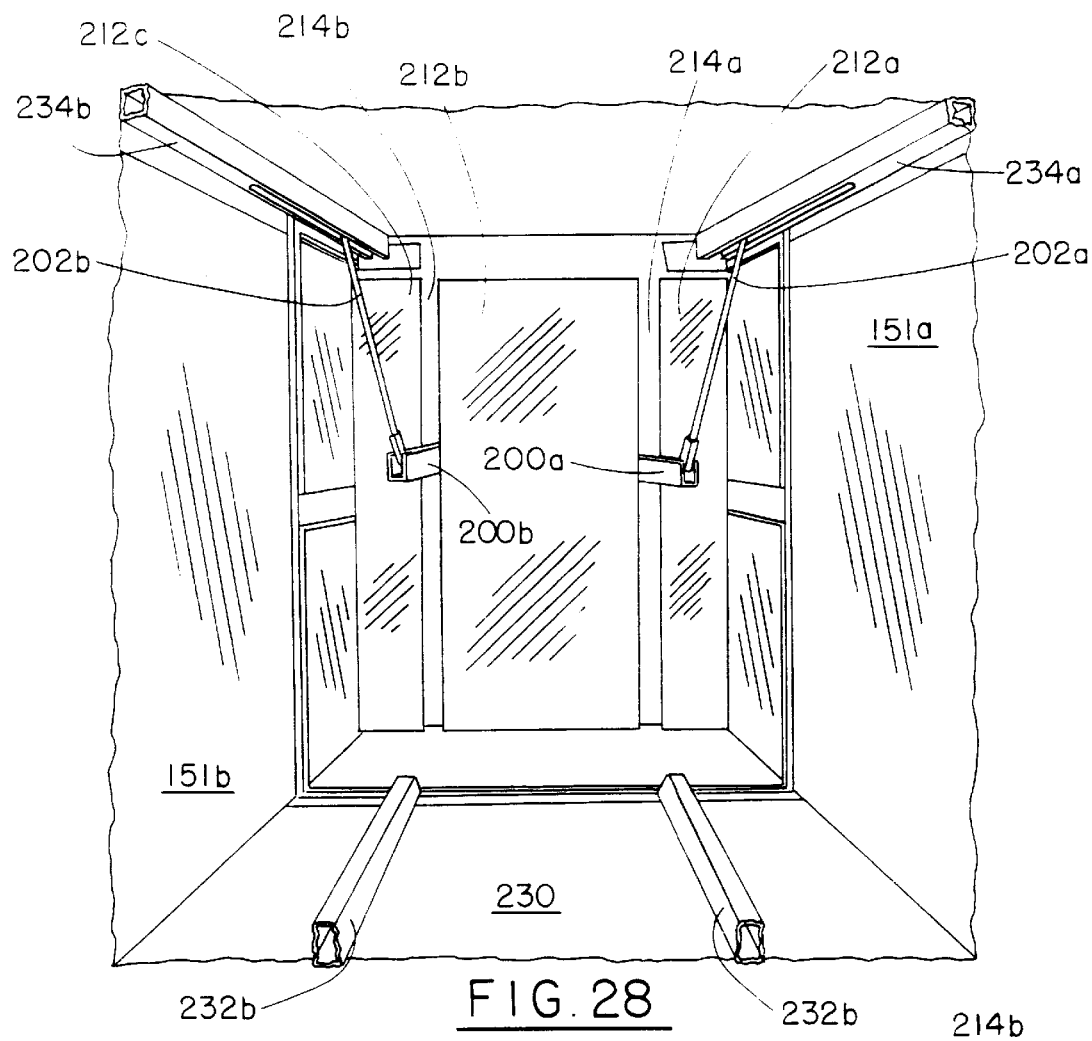
FIG. 28 is an aft view of the hay bale stacking apparatus illustrating the chamber in which a bundle of hay bales is formed.

FIG. 28 is a forward view of the inside of the hay bale stacking apparatus where the hay bales are stacked and arranged in a large bundle. The first and second strap guides 200a, 200b, are shown extending through respective slots 214a and 214b which are respectively disposed between front panels 212a, 212b and 212c. Strips of banding 202a and 202b are let off of a respective banding dispenser and are secured at one end to the banding apparatus which is not shown in the figure for simplicity. A pair of upper compression members 234a, 234b and a pair of lower compression members 232a, 232b are disposed aft of and aligned with the first and second strap guides 200a and 200b. The upper and the lower compression members maintain the compression banding zones within the upper and lower stacked hay bales which are formed by the pivoting arms 192a, 192b of the vertical plunger 128 and by the aforementioned first and second strap guides. The lower compression members 232a, 232b are disposed upon and extend upwardly from a back floor 136 of the stacking apparatus, while the upper compression members 234a and 234b are attached to and extend downwardly from an upper panel 150 of the stacking apparatus.

Figure 29:
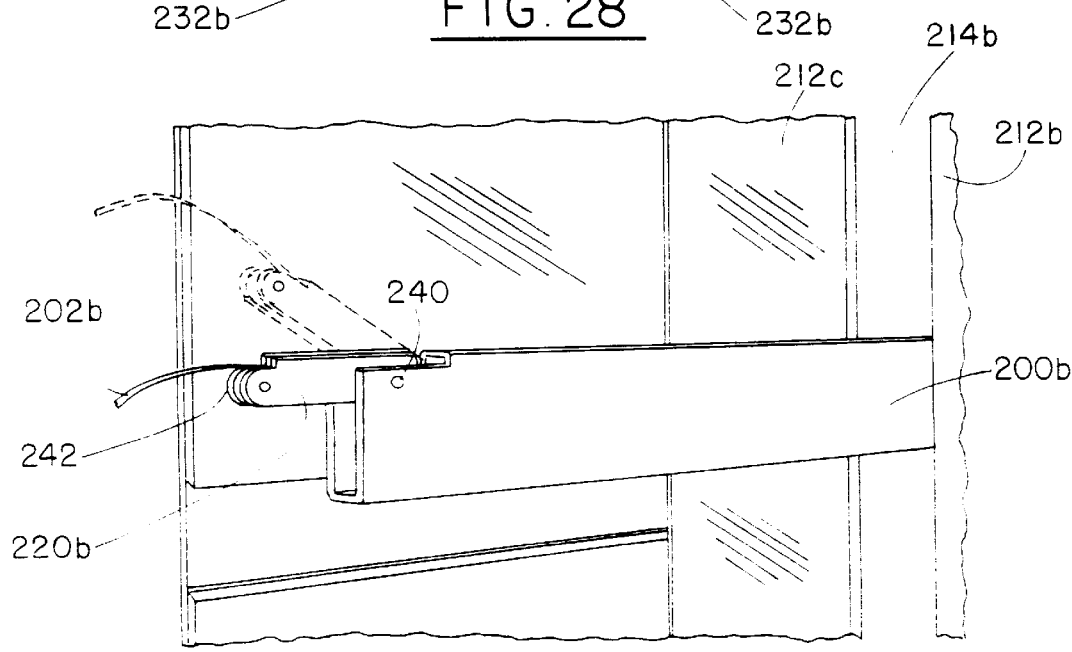
FIG. 29 is a perspective view of one of the strap guides showing the strap guide hinge in two different orientations.

Referring to FIG. 29, there is shown a perspective view of a portion of the second strap guide 200b showing a strap guide hinge 220b disposed on the aft end thereof. Strap guide hinge 220b is connected to the second strap guide 200b by means of a pivot pin 240 which allows the strap guide hinge to be displaced upwardly as shown in dotted line form in the figure. Banding 202b is disposed within and extends the length of strap guide 200b. Disposed on the distal end of strap guide hinge 220b is a roller 242 which facilitates displacement of banding 202b through the strap guide hinge 220b. The pivoting strap guide hinge 220b allows for clearance of the end of the strap guide 200 from other components as the strap guide is vertically displaced during let out of the banding 202b through the strap guide as the bundle of hay bales is banded.

Figure 30:
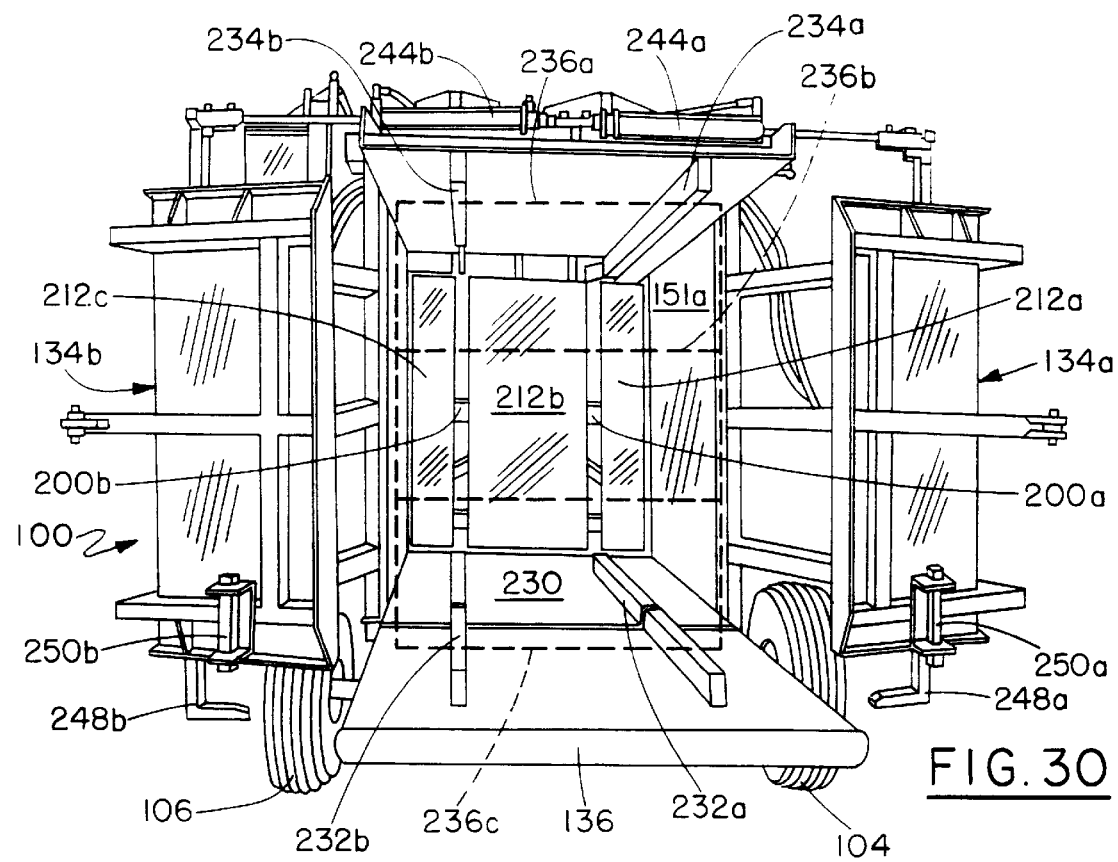
FIG. 30 is an aft view of the hay bale stacking apparatus of the present invention showing the back gates in the open position.
Figure 31:
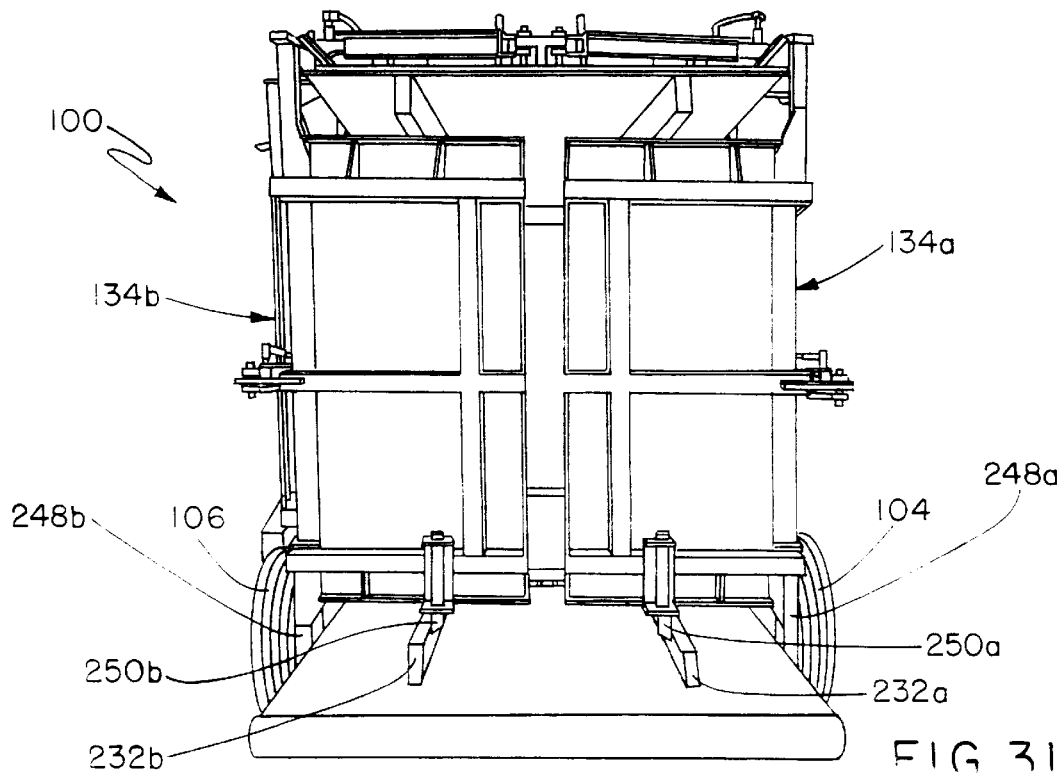
FIG. 31 is an aft view of the hay bale stacking apparatus showing the back gates in the closed position.

Referring to FIGS. 30 and 31, there are shown back elevation views of the hay bale stacking apparatus showing the back gates 134a and 134b in the open and closed positions, respectively. Additional details of the operation of back gates 134a, 134b are described below. Each of the back gates is connected to the stacking apparatus by means of a plurality of hinges, as shown for the case of the second back gate 134b and hinges 246 in the partial side elevation view of the stacking apparatus of FIG. 32. Three stacked hay bales 236a, 236b and 236c are shown in dotted line form in FIG. 30 disposed in the hay bale stacking apparatus 100. A pair of upper banding zones are shown in the top hay bale 236a as formed by the first and second upper compression members 234a and 234b. A pair of lower banding zones are shown in the bottom hay bale 236c as formed by the first and second lower compression members 232a, 232b.

Figure 32:
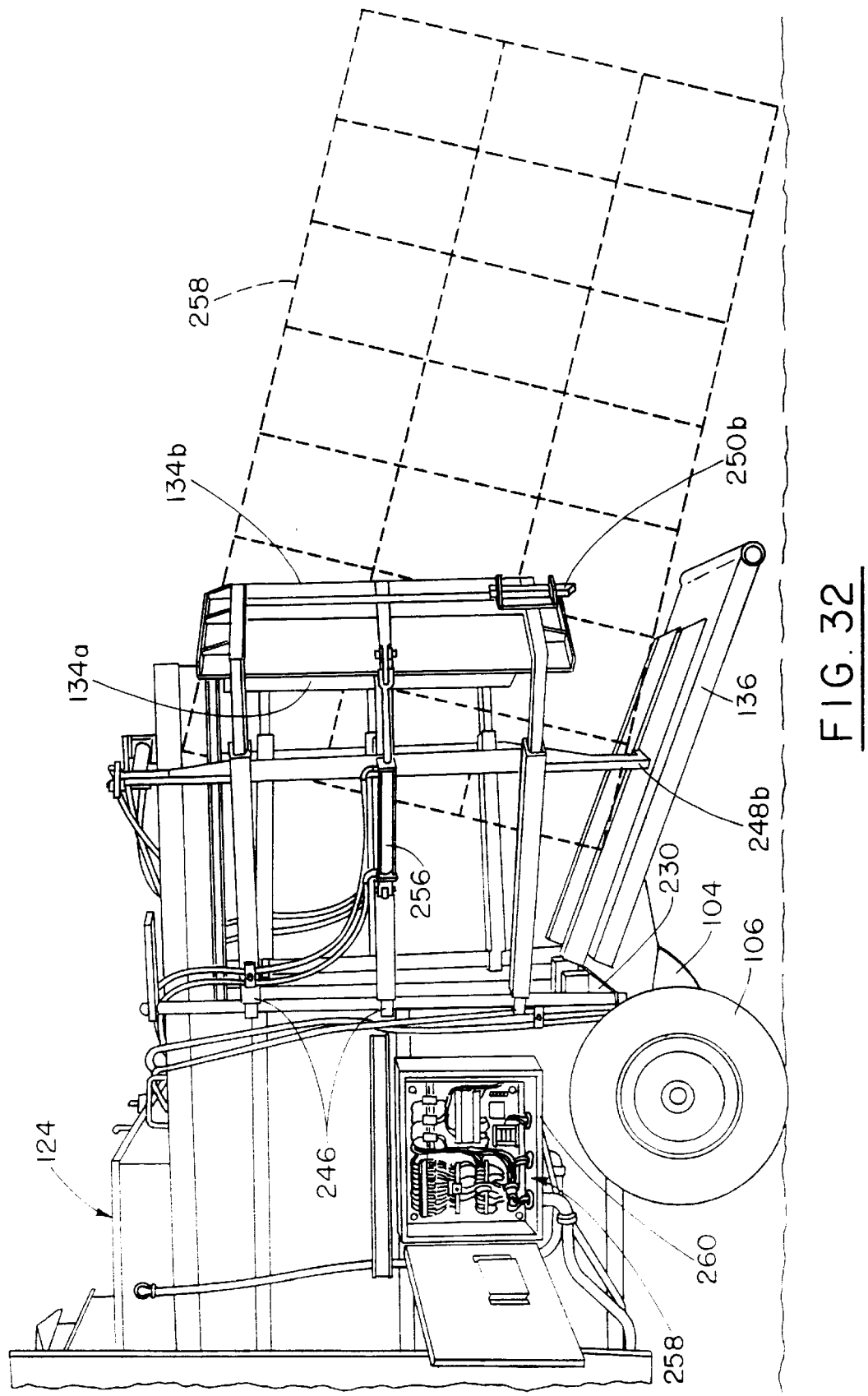
FIG. 32 is a side view of the hay bale stacking apparatus illustrating the manner in which a large bundle of hay bales is discharged from the apparatus.

A back floor 136 is hingedly coupled to an aft portion of the stacking apparatus floor 230. A hydraulic cylinder (not shown in the figures for simplicity) on the underside of the stacking apparatus is coupled between the frame of the apparatus and the back floor 136 for lowering the back floor for the discharge of a large bundles 258 of hay bales as shown in dotted line form in FIG. 32. First and second support hooks 248a and 248b respectively attached to the first and second back gates 134a, 134b as shown in FIGS. 30 and 31 are adapted for engaging respective lower sides of the hinged back floor 136 for maintaining the back floor in the upraised position as shown in FIG. 31. First and second latches 250a and 250b are also disposed on the first and second back gates 134a, 134b, respectively. When the back gates are closed, the first and second latches 250a, 250b respectively engage the first and second lower compression members 232a, 232b for maintaining the back gates in the closed position as shown in FIG. 31. In lowering the back floor 136 to discharge a large bundle of hay bales as shown in FIG. 32, the two back gates 134a, 134b are moved outwardly by their respective hydraulic cylinders releasing the two support hooks 248a, 248b from the back floor. This allows the back floor 136 to be lowered by means of the hydraulic cylinder on the bottom of the stacking apparatus. The back floor 136 is also raised by the aforementioned bottom hydraulic cylinder, followed by the inward displacement of the two back gates 134a, 134b permitting the two support hooks 248a, 248b to again engage and support the back floor. The two latches 250a, 250b again engage the first and second lower compression members 232a, 232b for maintaining the back gates 134a, 134b closed. A pair of hydraulic cylinders each mounted to a respective lateral portion of the stacking apparatus are coupled to the aft panels of the first and second back gates 134a, 134b as shown for the case of hydraulic cylinder 256 in FIG. 32. These two hydraulic cylinders operate in conjunction with the upper hydraulic cylinders 244a and 244b for pivotally displacing the aft portions of the back gates outwardly when the back gates are opened, and for pivotally displacing the back portions of the back gates inwardly when the back gates are moved to the closed position.

Figure 34:
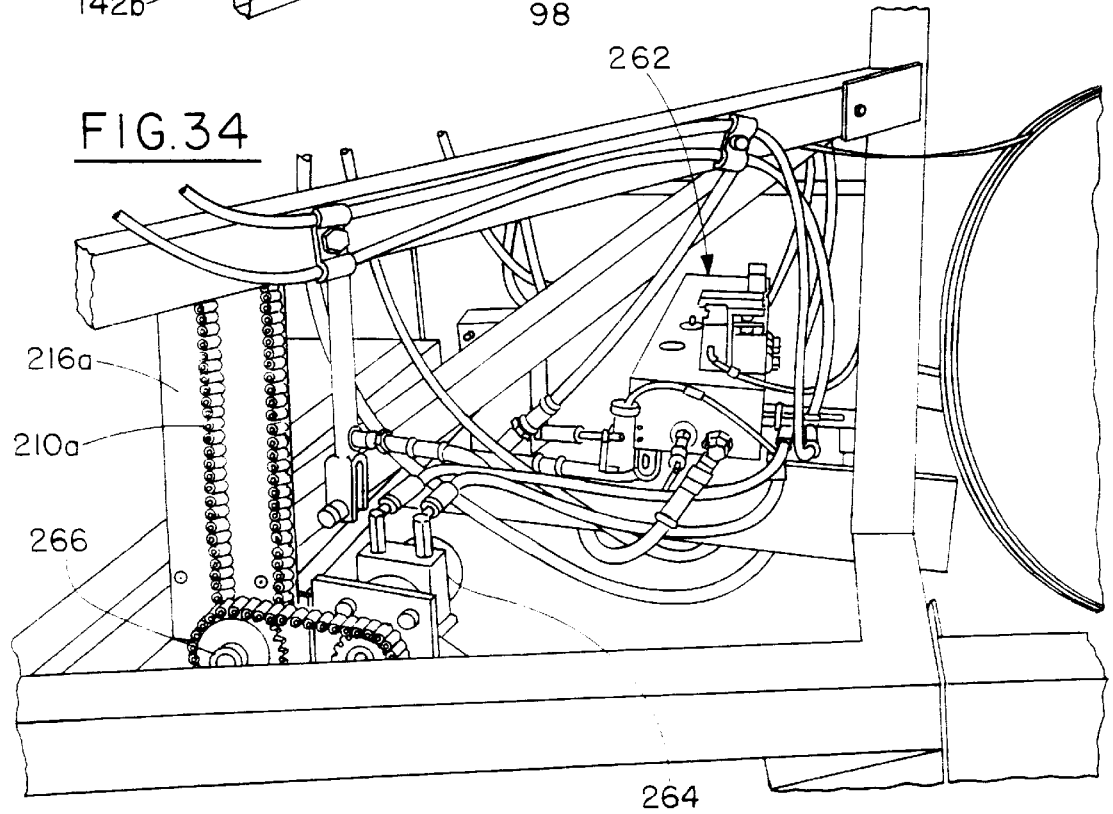
FIG. 34 is a partial perspective view of the hay bale stacking apparatus of the present invention illustrating details of the hydraulic control system.
Figure 35:
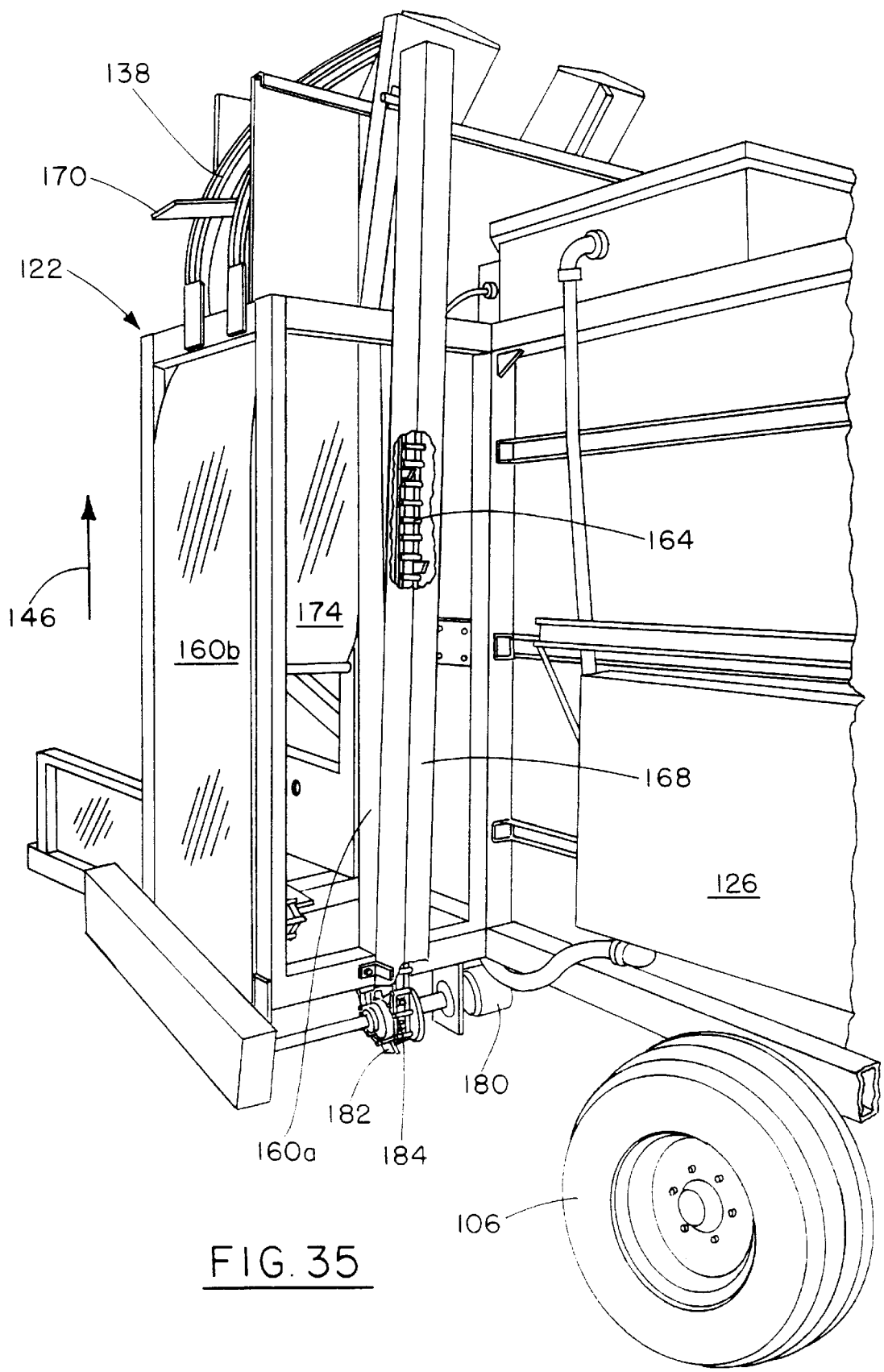
FIG. 35 is a partial perspective view of the inventive hay bale stacking apparatus shown partially cutaway illustrating the hay bale elevator portion thereof.

A computer 258 is disposed within a closed housing 260 on a side portion of the stacking apparatus as shown in FIG. 32. Computer 258 controls the operation of the stacking apparatus including the various components thereof as described in detail below. One of the components controlled by computer 258 is a hydraulic manifold 262 which is shown in FIG. 34. The hydraulic manifold 262 is connected to the various hydraulic cylinders discussed above by means of hoses also shown in FIG. 34. The hydraulic manifold 262 is further connected to the hydraulic system of the traction vehicle pulling the hay bale stacking apparatus, where a pair of hydraulic lines 110 from the traction vehicle to the hay bale stacking apparatus 100 are shown in FIG. 22. Also shown in FIG. 34 is a portion of the first vertical rail 216a and the first drive chain 210a used in raising and lowering the strap guides. A hydraulic motor 264 is coupled to drive chain 210a by means of a slip clutch 266 which maintains the pair of strap guides at the same vertical level as they are displaced upward and downward.

Figure 36:
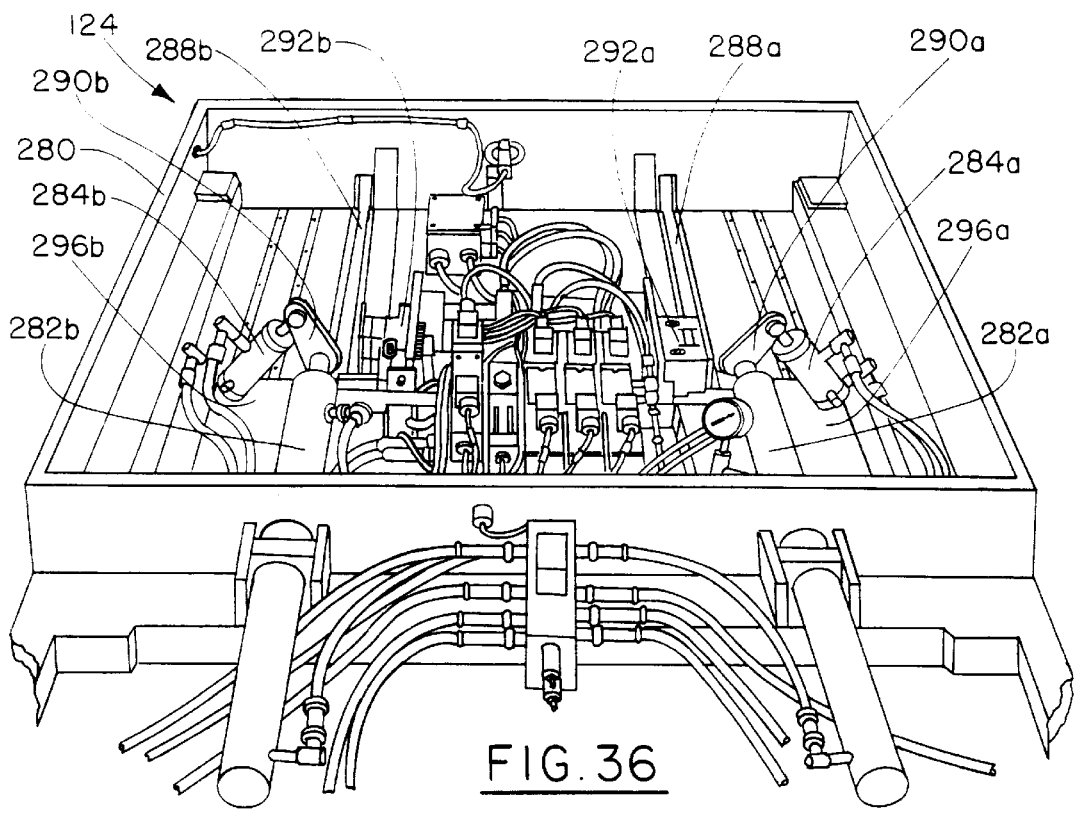
FIGS. 36–39 are perspective views of the banding mechanism used in the hay bale stacking apparatus of the present invention.
Figure 37:
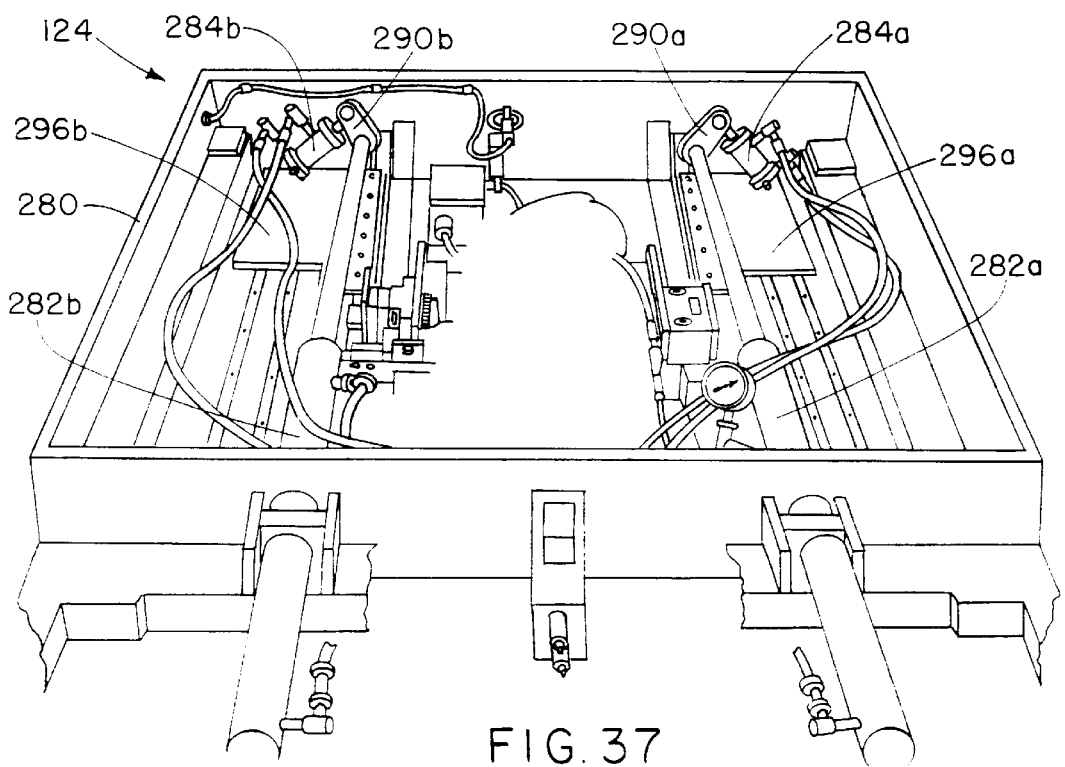

FIGS. 40–50 are a series of simplified side elevation views in schematic diagram form which will be used in explaining the operation of the banding apparatus 124 shown in the perspective views of FIGS. 36, 37, 38 and 39. FIGS. 40–50 are directed to the left hand portion of the banding apparatus 124 as shown in FIGS. 36–39 involving a first fetcher cylinder 282b and trough 288b and associated components. Like reference numerals are used in FIGS. 40–50 to identify the corresponding structures in FIGS. 36–39. Banding apparatus 124 includes a housing 280 having a removable cover (which is not shown for simplicity). Banding apparatus 124 further includes first and second fetcher cylinders 282a and 282b respectively connected to first and second fetcher arms 290a and 290b and fetcher carriages 296a and 296b. Each of the fetchers moves with the extension or retraction of the extendible arm of its associated fetcher cylinder. FIG. 36 shows the first and second fetcher cylinders 282a, 282b in the retracted position with the first and second fetchers 290a, 290b in position toward a forward portion of the banding apparatus 124. The right hand or first fetcher cylinder 282a and associated components operate in a similar manner and thus are not described in detail herein.

Figure 40:
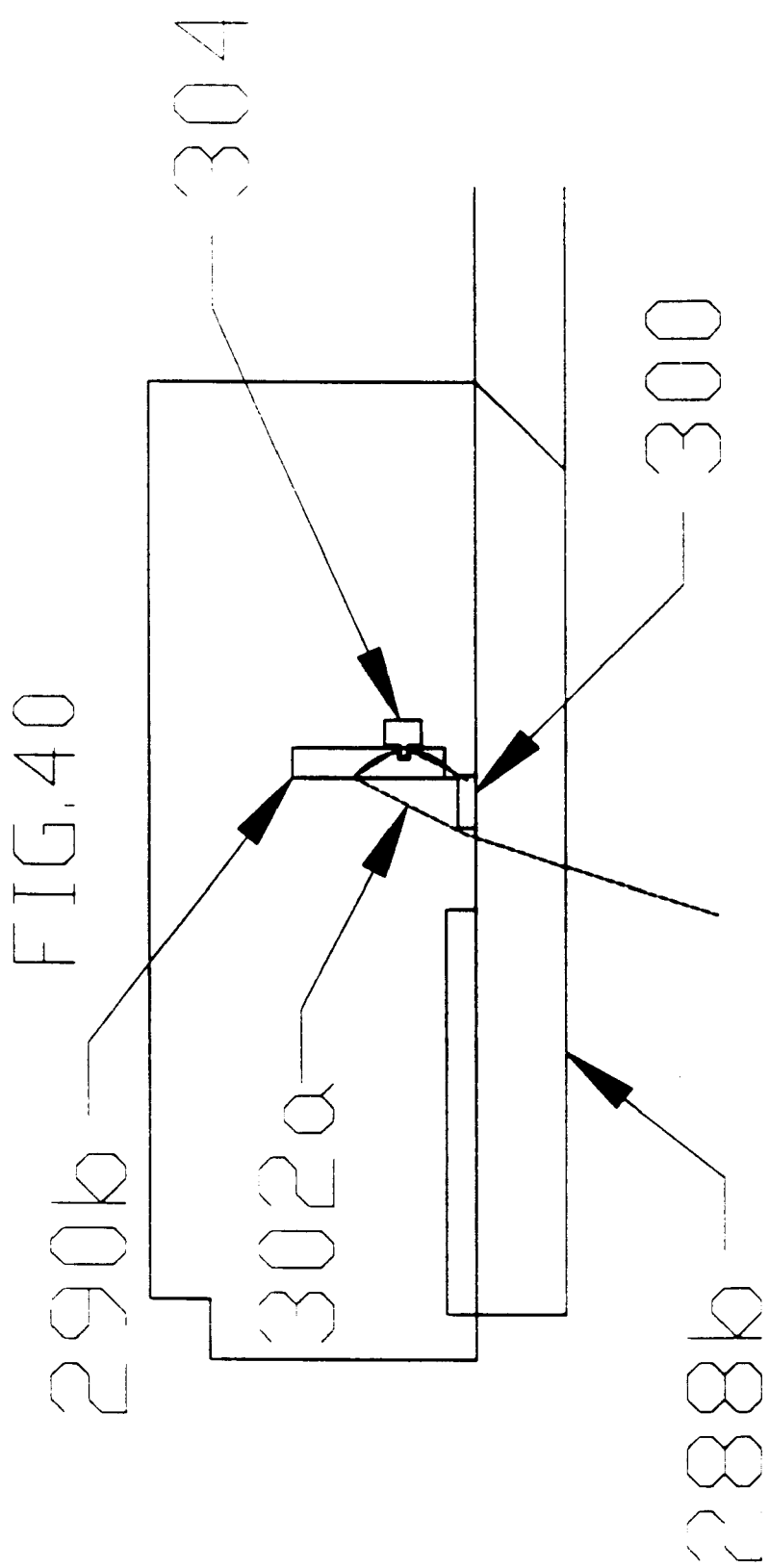
FIGS. 40–50 are a sequence of side views showing details of the manner in which one section of strapping is manipulated in the banding apparatus of the hay bale stacking apparatus of the present invention.
Figure 41:
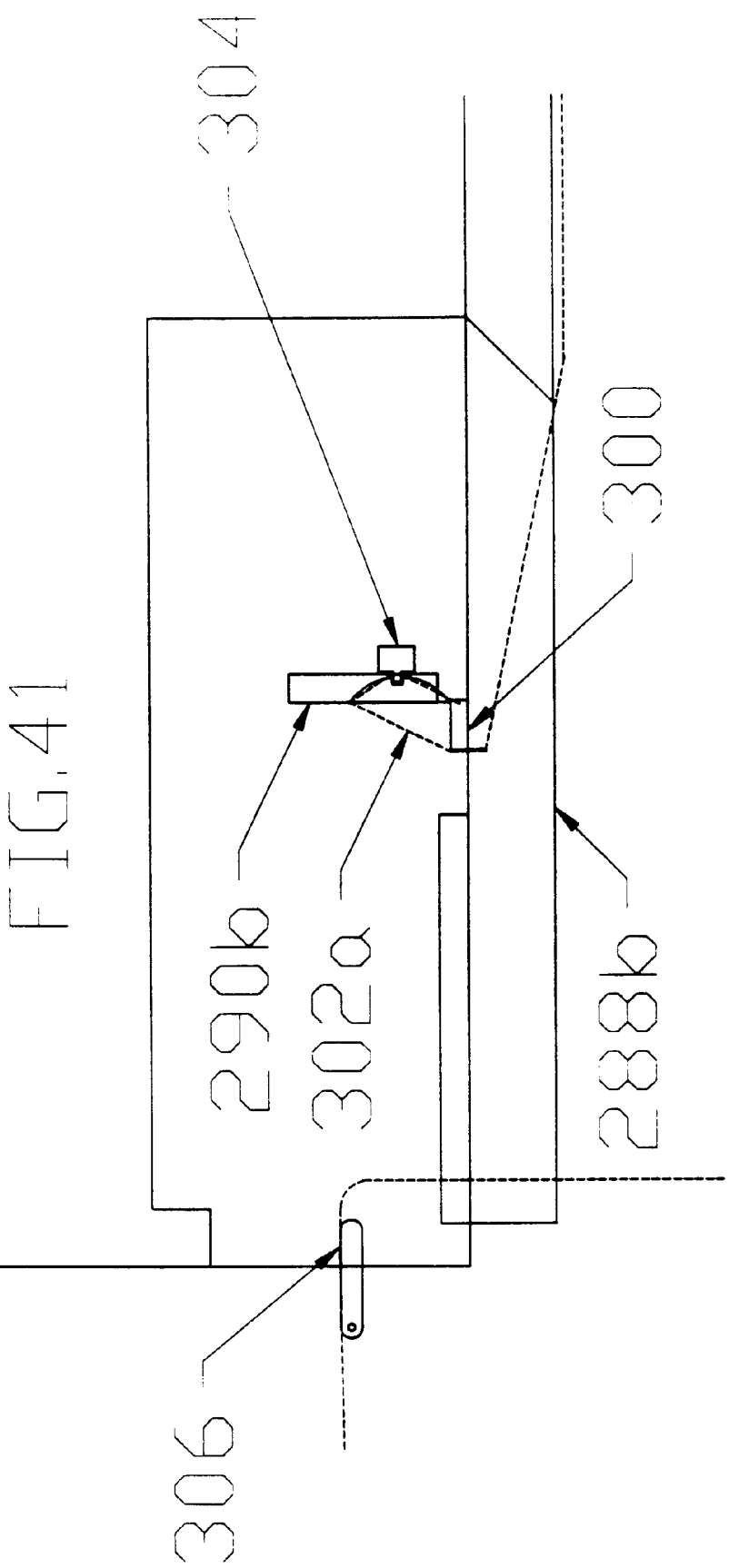
Figure 42:
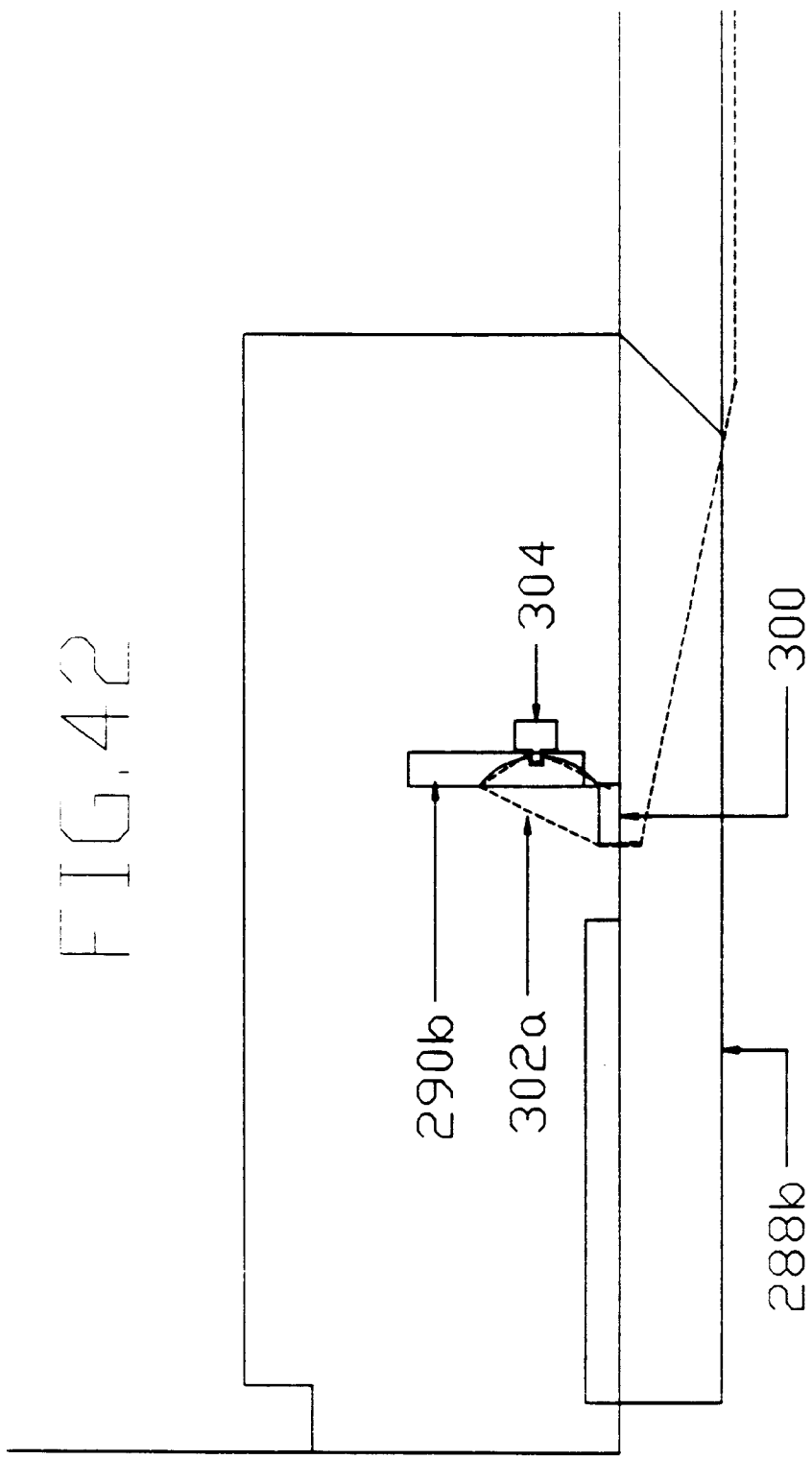
Figure 43:
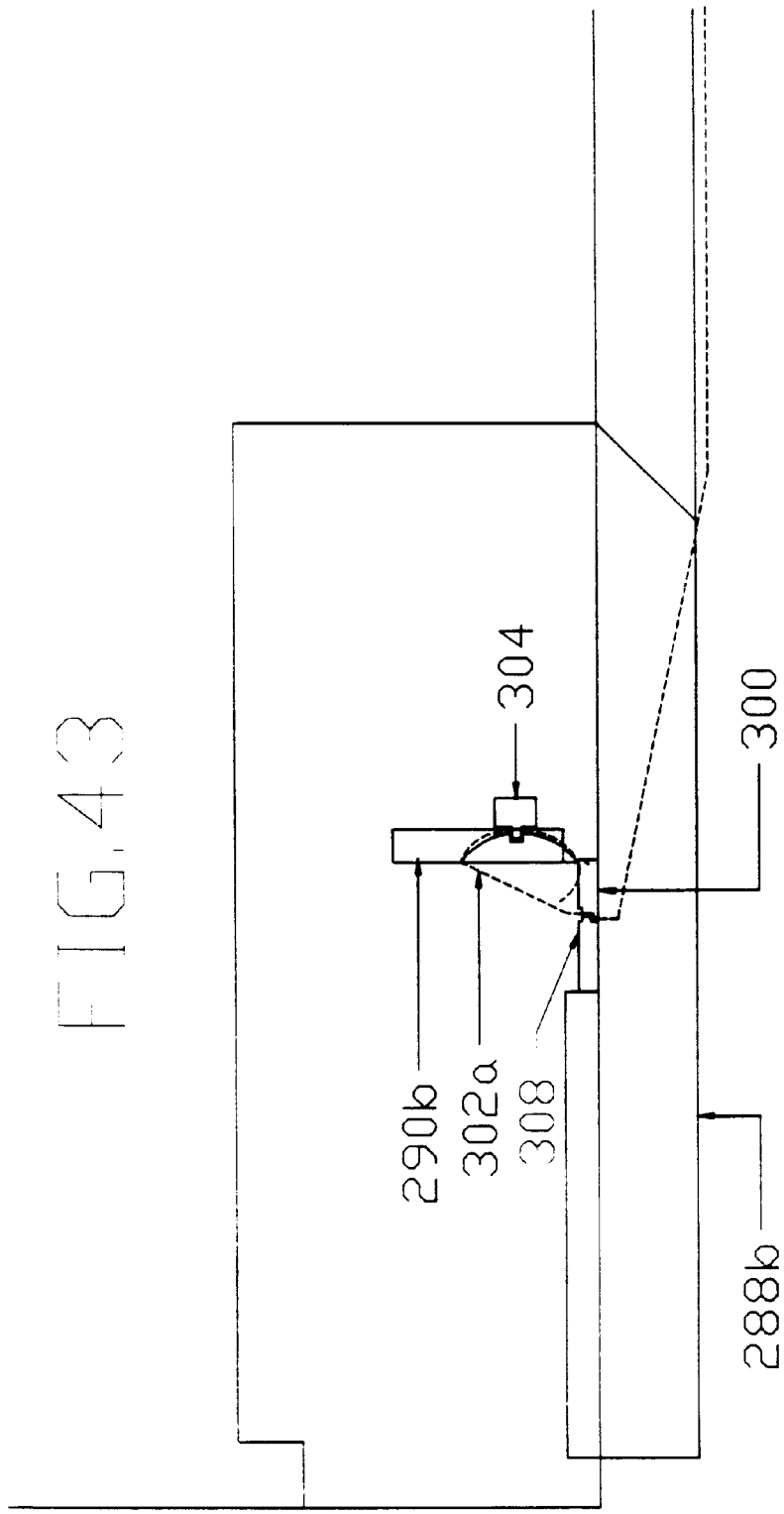
Figure 44:
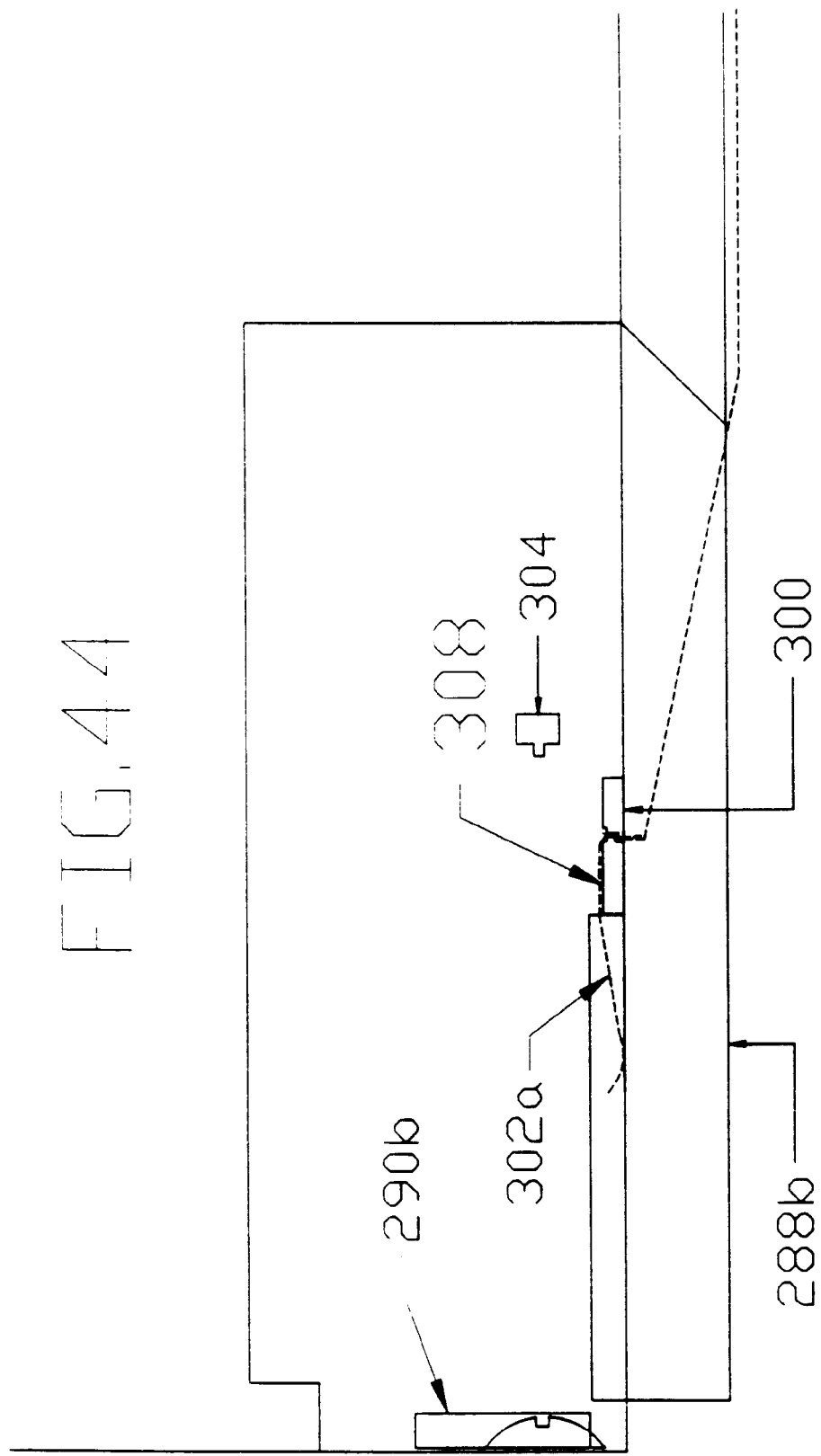
Figure 45:
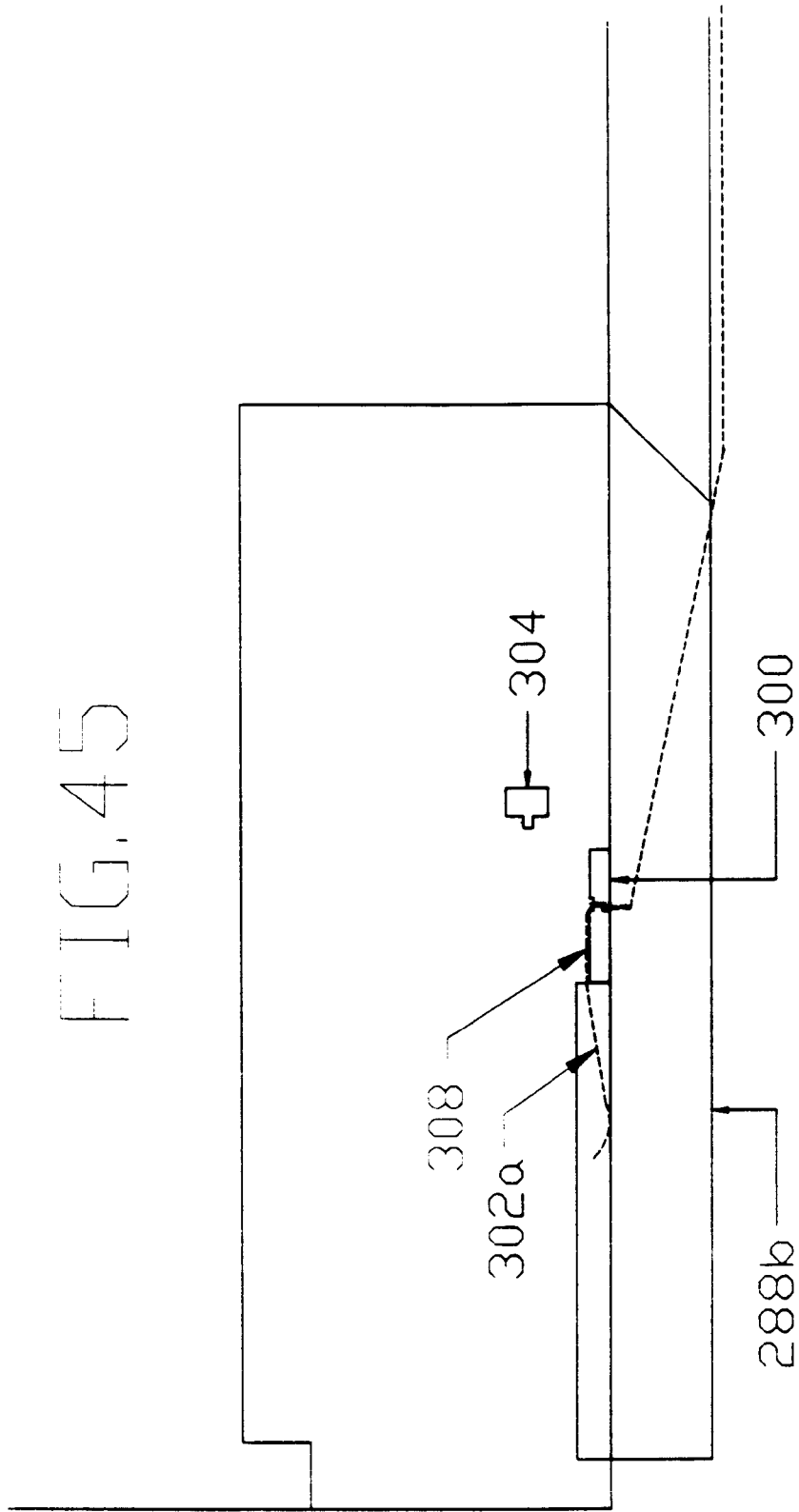
Figure 46:
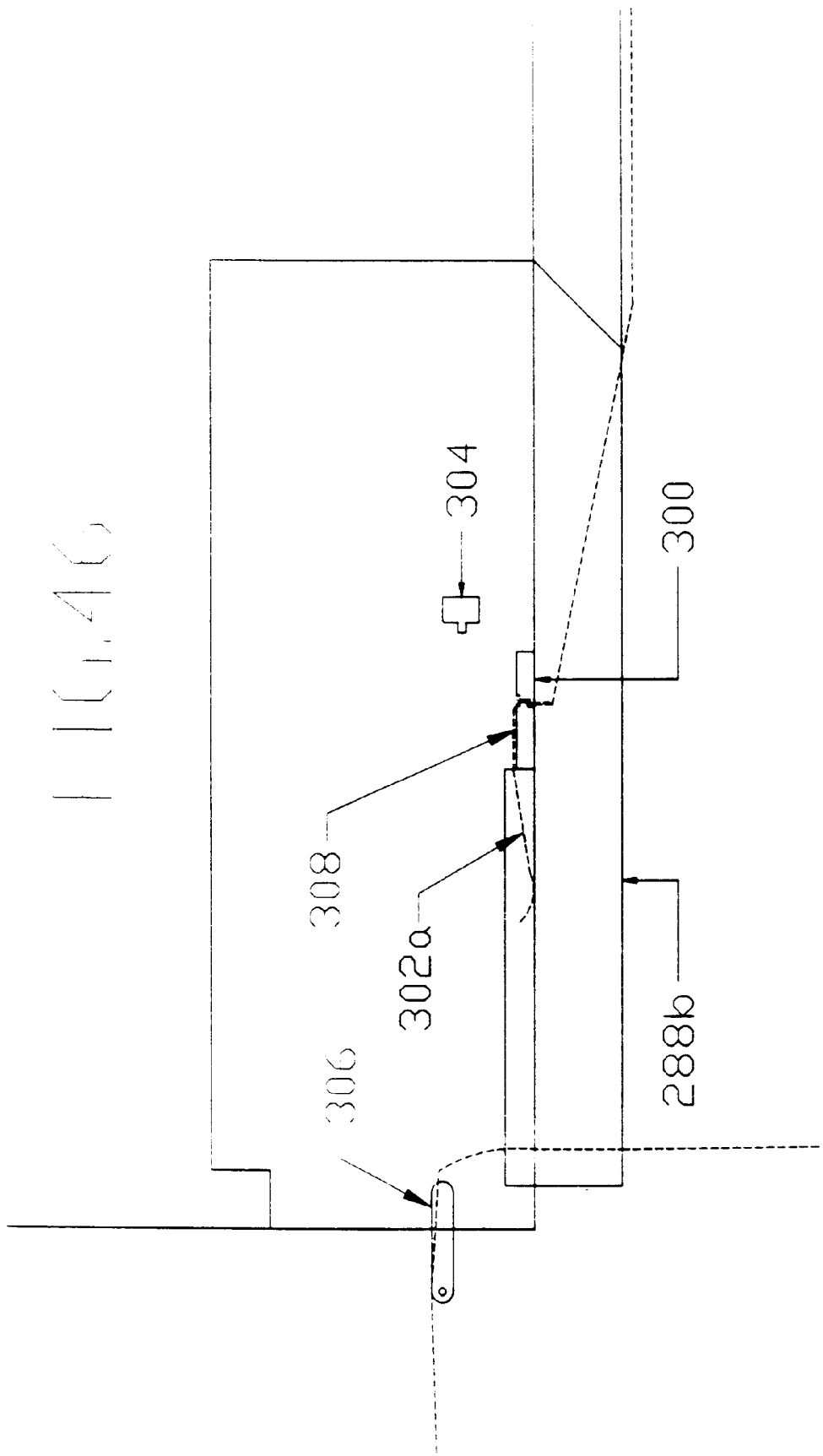
Figure 47:
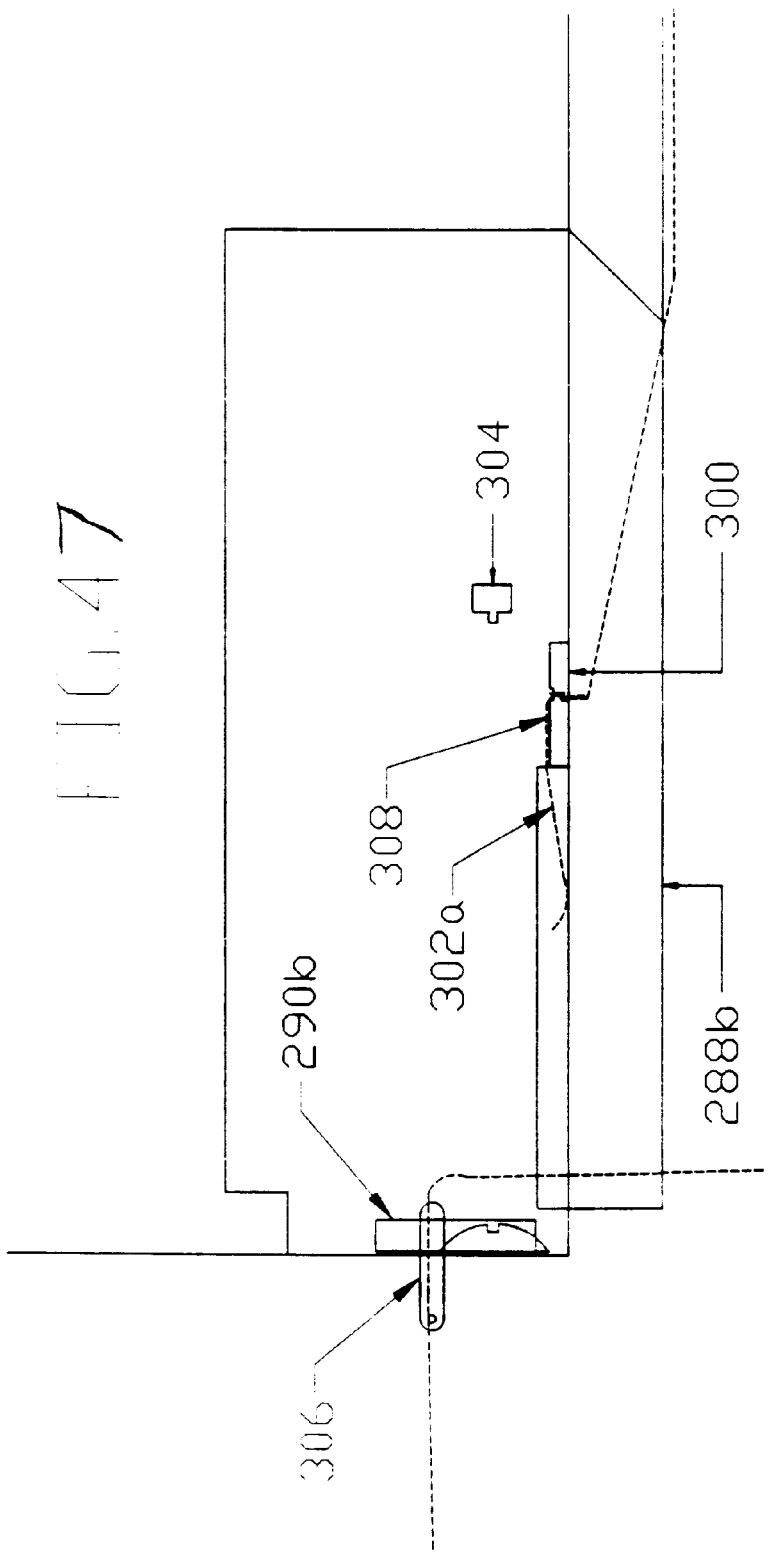
Figure 48:
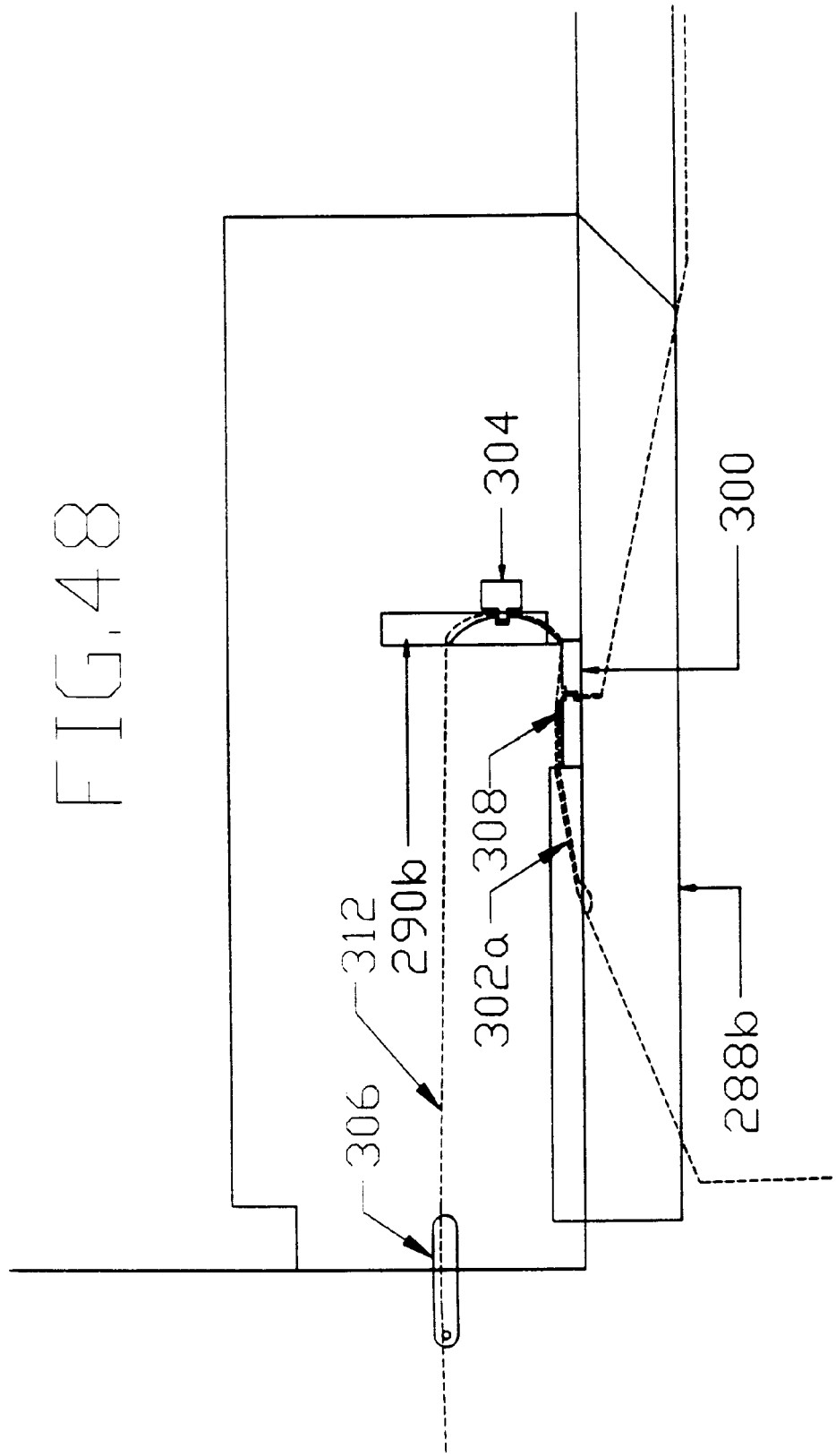

As shown in FIG. 40, the banding apparatus 124 includes a first gripper foot 300, fetcher arm 290b, and a strap gripper 304 used in the gripping of strapping 302a (shown in dotted line form in FIG. 40) about a large bundle of hay bales as described hereinafter. With reference to FIGS. 18 and 22, as horizontal plunger 132 moves stacks of three hay bales in the direction of arrow 70, strapping 302a is pulled tightly against first gripper foot 300 as shown in FIG. 42 is ready for engagement with a second gripper foot 308 shown in FIG. 43. The first step in the operation is the engagement of the second gripper foot 308 as shown in FIG. 43. This grips strapping 302a between the first gripper foot 300 and second gripper foot 308 as shown in FIG. 43. When strapping 302a is gripped by and between the first gripper foot 300 and the second gripper foot 308, fetcher cylinder 282b extends outwardly releasing strapping 302a from strap gripper 304 and fetcher arm 290b. As fetcher cylinder 282b continues to extend outwardly, fetcher 290b and fetcher carriage 296 guide strapping 302a into trough 288b as shown in FIG. 44. Each of the troughs is aligned with a respective strap guide as well as with a respective banding zone in a hay bale as previously described. When fetcher cylinders 282a, 282b are completely extended, fetcher arms 290a, 290b are rotated out of the path of strap guide 306 as shown in FIG. 47 by the extension of fetcher swing cylinders 284a, 284b. When strap guides 306 are raised to the full up position in the banding apparatus 124, the fetcher swing cylinders 284a, 284b retract and rotate fetcher arms 290a, 290b into the path of the strapping as shown in FIG. 47 for the case of strapping 302a. Once fetcher arm 290b is in the path of strapping 302a, the fetcher cylinder 282b is retracted. The fetcher carriage 296 maintains strapping 302a in trough 288b while the fetcher arm positions one section of strapping 302a over another section of the same strapping. When fetcher cylinder 282b is fully retracted, strapping 302a is laid on top of itself and over the second gripper foot 308 and is ready to be spliced together as shown in FIG. 48. The segment of strapping labeled 312 is gripped between fetcher arm 290b and strap gripper 304 and forms the starting end of strapping for the next bundle.

Figure 38:
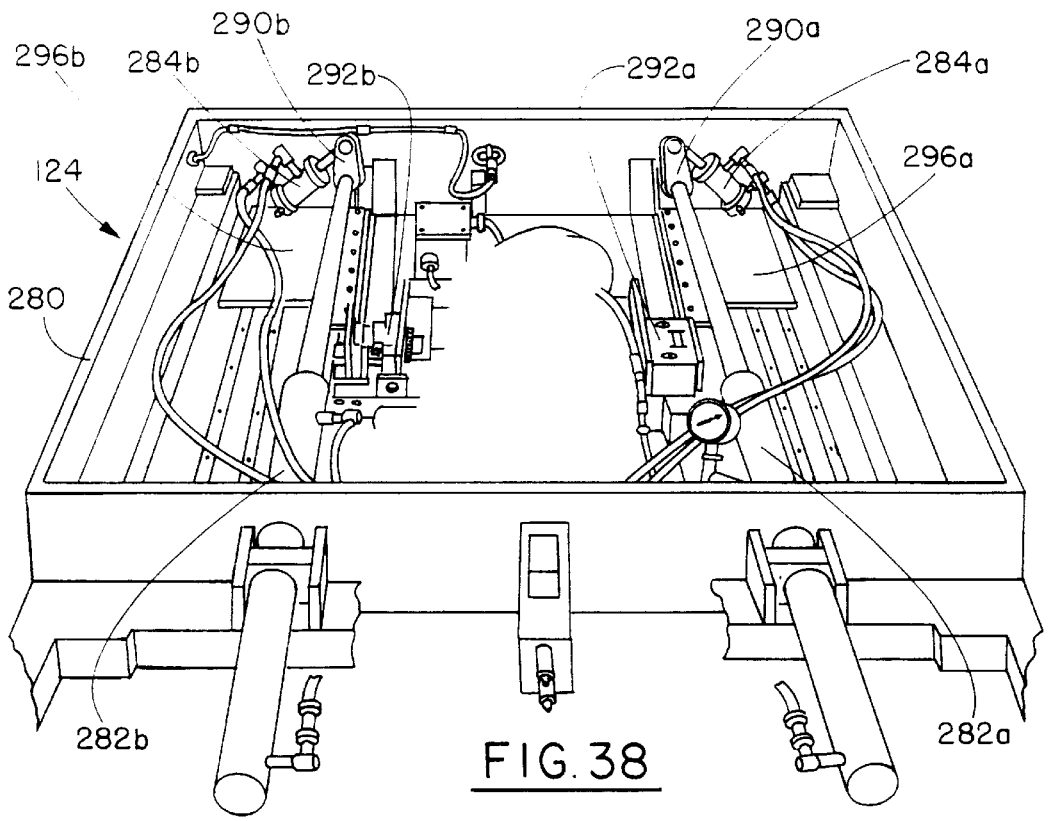
Figure 39:
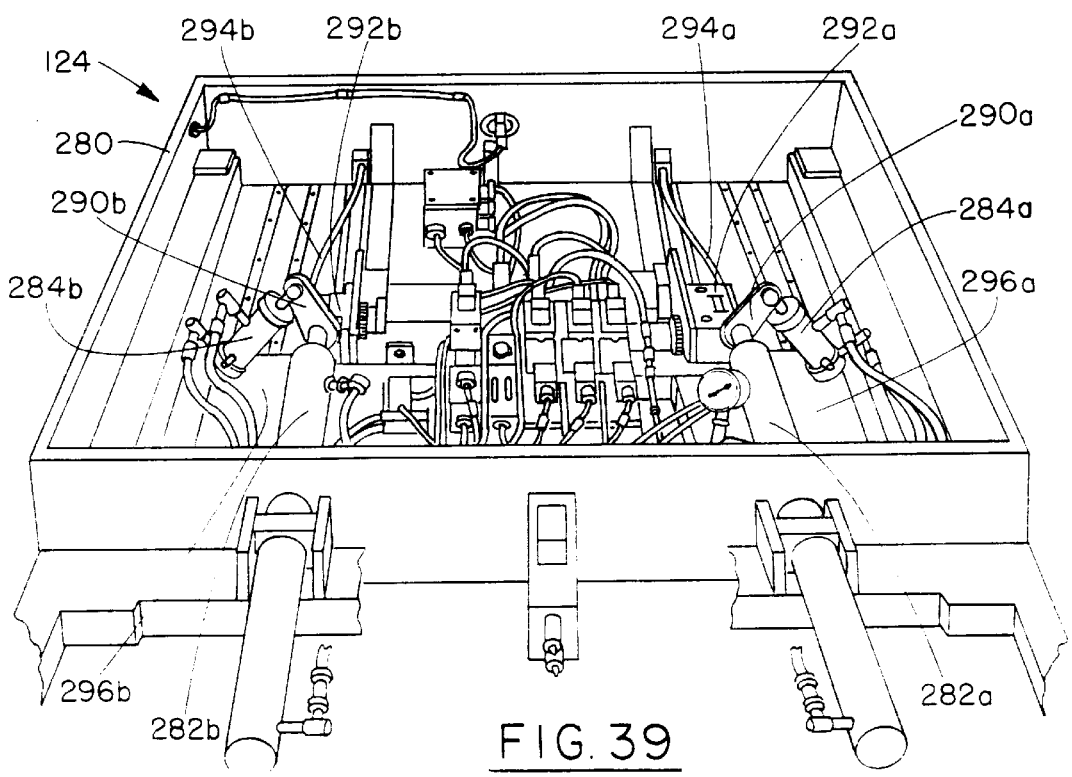
Figure 49:
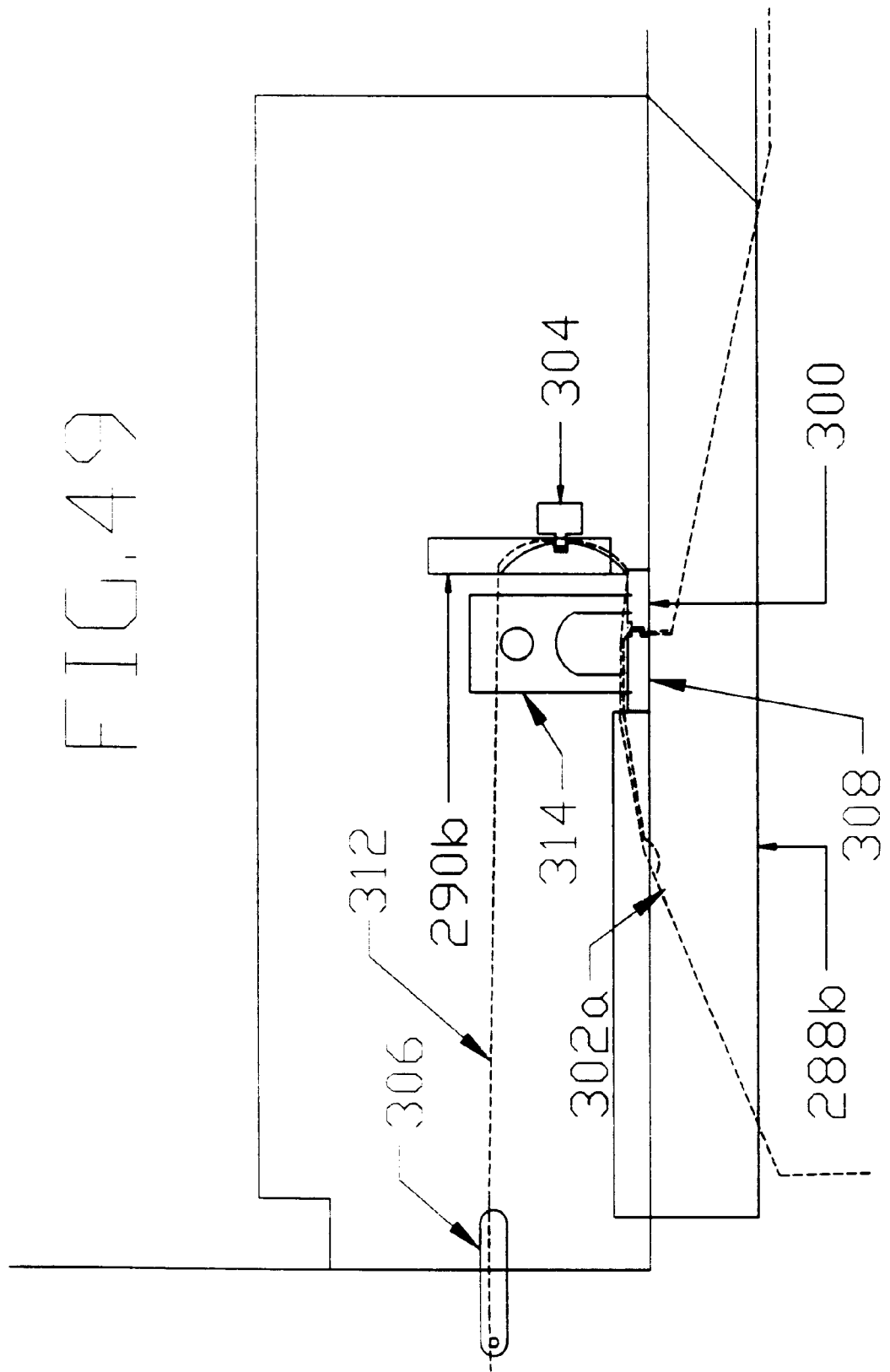
Figure 50:
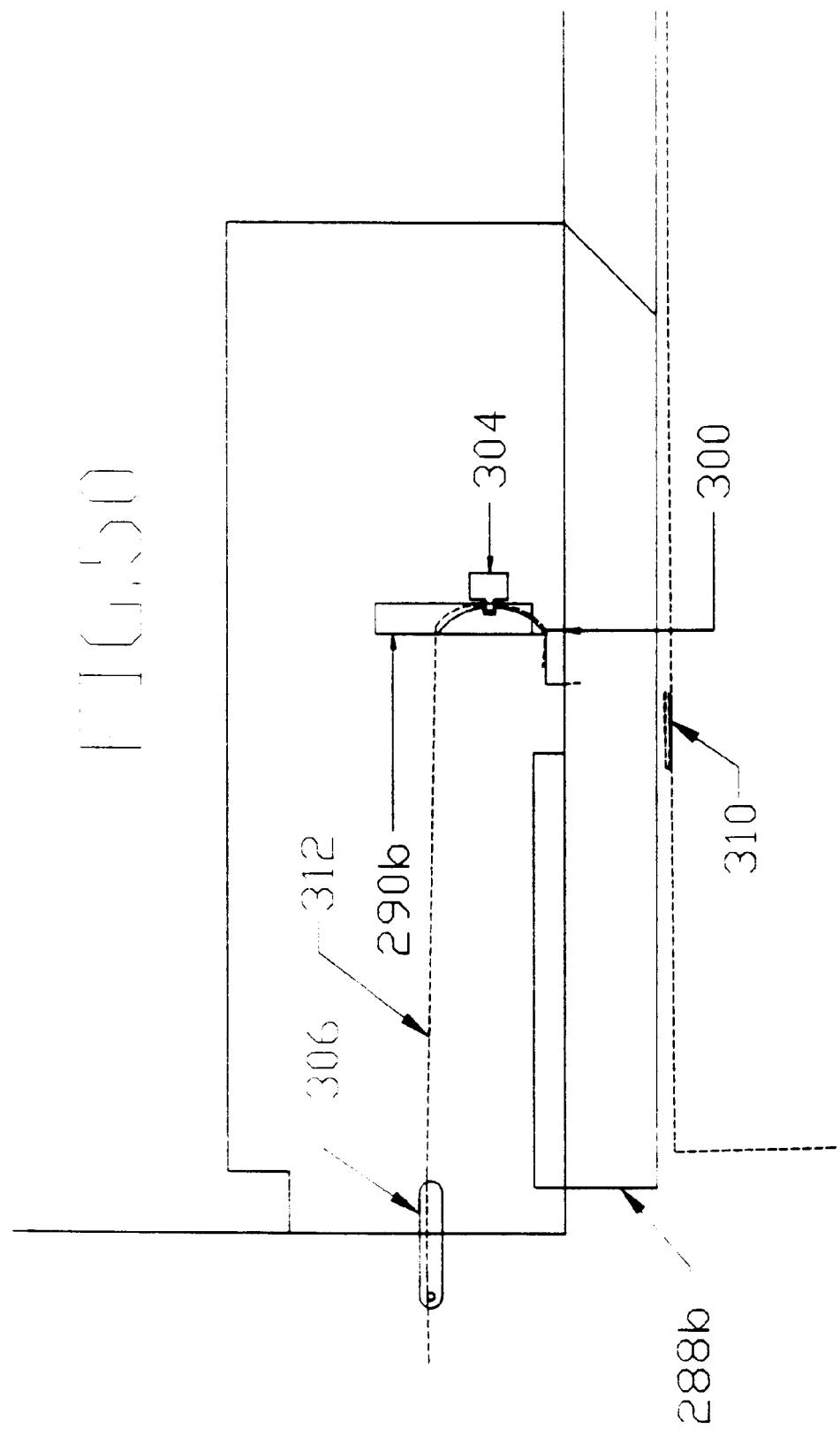

With the fetcher 290b in the fully retracted position as shown in FIG. 49, a die and cutter 314 is displaced outwardly by the second banding mechanism 292b as shown in FIG. 39. As shown in FIGS. 38 and 39, the first and second banding mechanisms 292a and 292b are displaced outwardly following full retraction of the first and second fetcher cylinders 282a and 282b. Die and cutter 314 attached to the first banding mechanism 292b then engages the two adjacent ends of strapping sections 302a and 312 as shown in FIG. 49 for connecting the two ends together and severing the second end of the strapping disposed about the bundle of hay bales. After strapping 302a is spliced and severed by the die and cutter 314, a first strapping section 310 is spliced together and disposed about a first bundle of hay bales (not shown) as shown in FIG. 50. A second section of strapping 312 is then engaged by the combination of fetcher 290b and strap gripper 304 as shown in FIG. 50 for wrapping around a second bundle of hay bales about to be formed. The new sections of strapping are shown in FIG. 39 and are designated by numerals 294a and 294b. Strapping 294a is engaged by the first fetcher 290a, while strapping 294b is engaged by the second fetcher 290b. Following splicing and severing of the two straps or bands, the first and second banding mechanisms 292a and 292b are displaced inwardly toward one another, as shown in FIG. 36 to initiate a new banding cycle. The second gripper foot 308 connected to the banding mechanism 292a also moves inwardly when the banding mechanisms are drawn toward one another. This leaves the first gripper foot 300 as well as the first fetcher 290b and strap gripper 304 in position to engage strapping 312 for positioning about a second bundle of hay bales as shown in FIG. 50. The next cycle begins with strapping again pulled downwardly by the strap guide 306 as shown in previously discussed FIG. 40.

Figure 51:
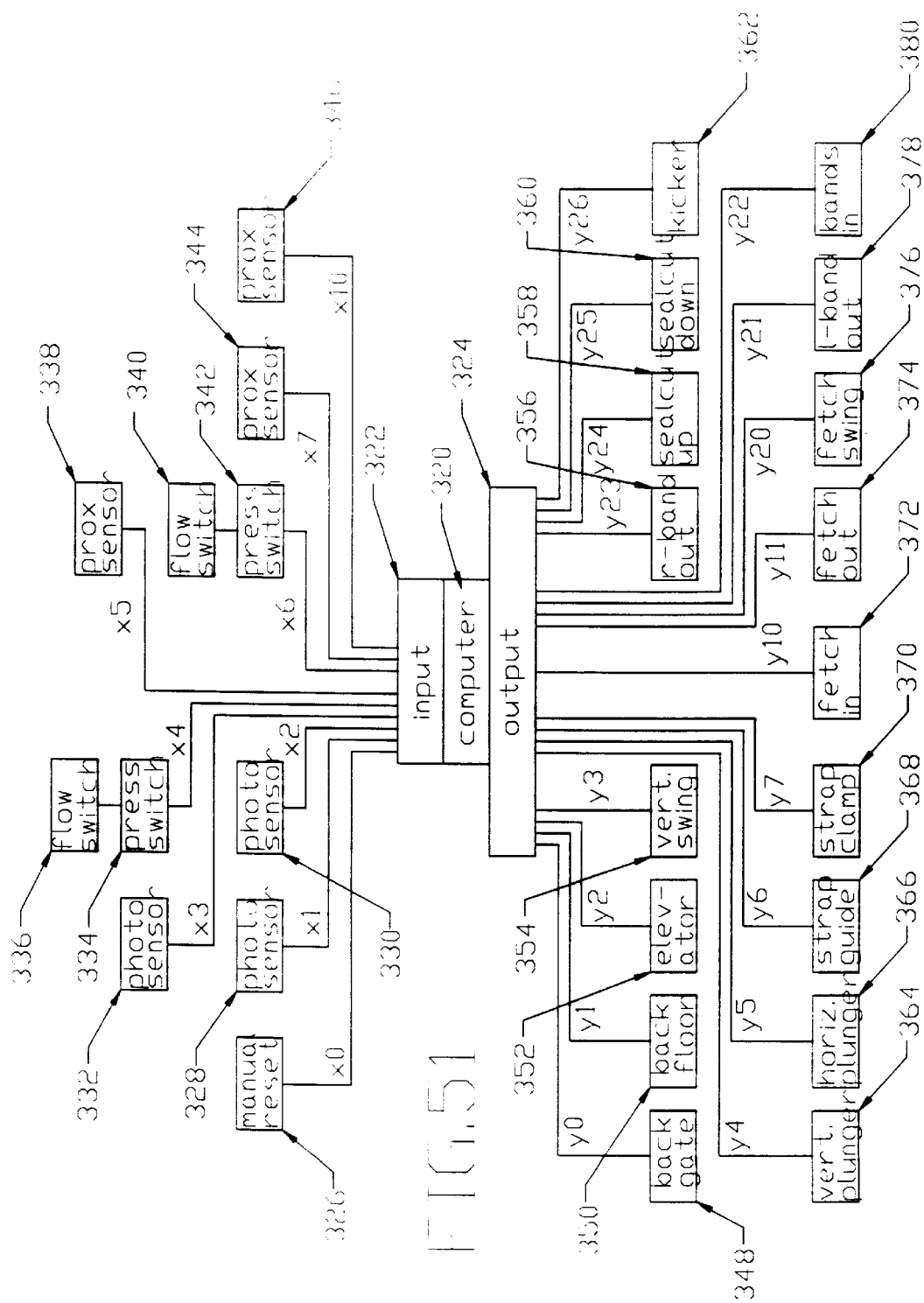
FIG. 51 is a simplified block diagram showing the various inputs to and outputs from the computer which automatically controls the operation of the inventive hay bale stacking apparatus.

Referring to FIG. 51, there is shown a block diagram of the computer control system used in controlling the hay bale stacking apparatus of the present invention. The computer control system includes a computer 320 having input and output interfaces 322 and 324. The inputs to computer 320 include a first combination of a flow switch 336 and a pressure switch 334 and a second combination of a flow switch 340 and a pressure switch 342. The two combinations of flow switches and pressure switches provide inputs to the computer 320 indicating a given operation or procedure is completed. For example, in detecting the completion of a cylinder stroke, the flow switch will indicate no hydraulic fluid flow and the pressure switch will indicate a high pressure signaling that the associated operation is completed and providing the appropriate input to computer 320. Upon being informed of the completion of a given operation or sequence of operations, computer 320 proceeds to the next step in its programmed operation. A manual reset input 326 allows the operator to interrupt stacking apparatus operation and begin the stacking operation over. The operator may want to re-initiate operation of the stacking apparatus upon detection of a low strapping condition and following replacement of the strapping supply. Photosensor 328 is attached to the bale input stage as previously described, while photosensor 333 is incorporated in the vertical elevator to detect the lifting of a hay bale. Photosensor 332 detects the positioning of a hay bale on the vertical plunger. An input to computer 320 from photosensor 332 initiates the sequence of operations by the computer. Proximity sensor 338 is located in the vertical plunger to detect the lowering of a hay bale, or bales, by the vertical plunger so that the vertical plunger is lowered the correct distance according to the number of bales on the vertical plunger. Proximity sensors 344 and 346 are located in banding apparatus 124 as shown in FIG. 36 to detect the position of banding mechanisms 292a and 292b, respectively.

Outputs from computer 320 include a back gate output 348, a back floor output 350, a vertical elevator output 352, and a vertical swing output 354. The vertical swing output 354 controls the position of the vertical plunger pivoting arms. Additional outputs further include the vertical plunger output 364, the horizontal plunger output 366, the strap guide position control output 368, and a strap clamp output 370 for clamping the strap in the banding apparatus to allow the strapping to backfeed when the strap guide is lowered. Additional outputs include the fetcher retraction output 372, the fetcher extension output 374, the fetcher swing output 376, the lefthand banding apparatus output 378, and input 380 for retracting the left and right banding apparatus. The R-band output 356 provides for extension of the righthand banding apparatus, while the sealcut up output 358 and sealcut down output 360 control the aforementioned banding mechanisms for severing and joining the ends of strapping enclosing a large bundle of hay bales. The kicker output 362 controls the operation of the kicker in positioning hay bales on the vertical plunger as previously described.

Figure 52:
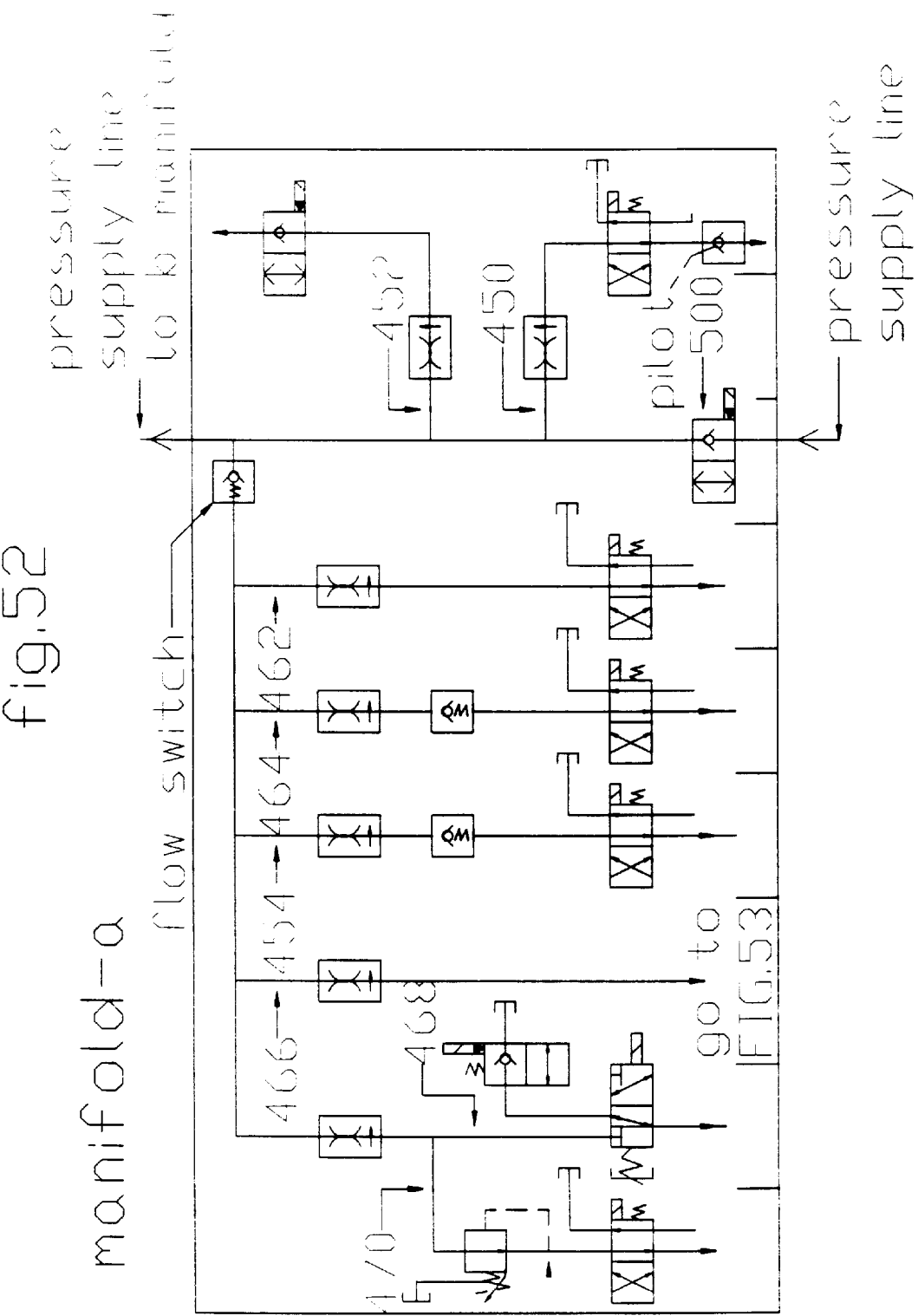

Referring to FIG. 52, there is shown a block diagram of the hydraulic circuits in manifold 262 shown in FIG. 34. A valve 500 is used as a safety valve to stop flow to all manifolds. Circuit 450 controls hydraulics to the back floor. Circuit 452 controls hydraulics to the horizontal and vertical elevators. Circuit 462 controls hydraulics to the kicker. Circuit 464 controls hydraulics to the vertical plunger. Circuit 454 controls hydraulics to the vertical swing plunger, while circuit 470 controls hydraulics to the strap clamps. Circuit 468 controls the hydraulic motor for the strap guides 54. When strap guide 54 is to be raised from the lowered position shown in FIG. 13, valve 468a is energized and the hydraulic motor 264 shown in FIG. 34 raises the strap guides. When vertical plunger 48 is about to be lowered as shown in FIG. 8, valve 468b is energized causing the vertical plunger to mechanically push the strap guides down which in turn drives hydraulic motor 264 shown in FIG. 34 which operates as a hydraulic pump, pumping hydraulic oil from the tank through hydraulic pump 264 creating a restriction which produces a clamping action on the bales as the vertical plunger and strap guides are lowered. Circuit 466 controls hydraulics to the horizontal plunger as described in the following paragraph.

Referring to FIG. 53, there is shown a complex hydraulic circuit 466 for the operation of the horizontal plunger. The purpose of hydraulic circuit 466 is to reduce the demand for a large capacity of hydraulic oil, as measured in gallons per minute, while maintaining the horizontal plunger's cycle time, speed and high compression needed to handle a large volume of hay bales, in forming a solid rigid, self-supporting large package of hay bales formed into a bundle. The pressure supply line goes through a pressure compensated flow control valve regulated at 20 gallons per minute, the two position four-way directional control valve in the de-energized mode places the horizontal plunger and cylinder 218b and 218a in the retracted position. When the directional control valve is energized, the pressure supply is directed to the piston side of cylinder 218a. Cylinder 218a is mechanically joined together with cylinder 218b so that as cylinder 218a extends, it mechanically pulls or extends cylinder 218b and moves the horizontal plunger. As cylinder 218b extends mechanically, a pilot check valve allows flow from the tank to fill the piston side of cylinder 218b with hydraulic oil. Cylinder 218a produces ample force to displace the first six stacks of three bales. On the seventh and final stack of three bales when the bundle is highly compressed for banding, cylinder 218a extends approximately ½ stroke (10 inches). The circuit pressure exceeds the sequence valve setting, shifting the sequence valve so as to allow high pressure into the piston side of cylinder 218b which is then full of hydraulic oil from the tank and closes the pilot check valve. Cylinder 218a and cylinder 218b work in tandem to produce high compression in displacing the horizontal plunger.

Cylinder 218b is used as a one way cylinder with hydraulic force on the piston side of the cylinder. The rod side of cylinder 218b is used as a reservoir. When the directional control valve is de-energized, the pressure in the supply line is directed to the rod side of cylinder 218a and opens the pilot check valve allowing the oil on the piston side of cylinder 218a and cylinder 218b to return to the rod side of cylinder 218b and to the tank. The return flow rate on the piston side of cylinder 218a and cylinder 218b is sixty-two (62) gallons per minute. The normal system return flow rate is 20 gallons per minute. Forty-two (42) gallons per minute returns through the pilot check valve into the rod side of cylinder 218b and twenty (20) gallons per minute returns to the tank.

Referring to FIG. 54, there is shown a block diagram of the hydraulic circuits in manifold B. Circuit 472 controls hydraulics to the fetcher cylinders. Circuit 476 controls hydraulics to the fetcher swing cylinders. Circuit 456 controls hydraulics to the left banding mechanism, while circuit 478 controls hydraulics to the right banding mechanism. Circuit 458 controls the operation of the dies and cutters.

Referring to FIG. 55, there is shown a complex hydraulic sequence circuit for the operation of the back gate extension cylinders and the back gate swing cylinders. When directional valve 501 is de-energized, back extension cylinders extend fully and the sequence valve shifts. The back gate is then opened by swing cylinders. When directional valve is energized, pressure in the line is directed to the rod side of the back gate cylinders. Pressure in the circuit then exceeds the setting for the sequence valve 502. The sequence valve 502 then shifts and directs pressure to the rod side of the back gate extension cylinders 236a and 236b. When cylinders 236a and 236b are fully retracted, circuit pressure exceeds settings for sequence valve 503 which then shifts, directing pressure to the pilot of valve 504 which shifts and connects the rod side of the back gate extension cylinders to pressure relief valve 505. Pressure relief valve 505 is manually set to control the desired compression of the hay bundles. As the horizontal plunger compresses the hay against the back gates, the back gates mechanically pull out on the rod end of the back gate extension cylinders 236a and 236b generating pressure at relief valve 505. When the pressure exceeds the setting of the relief valve 505, back gate extension cylinders 236a and 236b then extend outwardly to produce a controlled setting for compressing a bundle of hay.

Referring to FIG. 56, there is shown the curved edge apparatus 404 used to curve the edges of banding 44 as the banding is mechanically pulled from the banding dispenser 42 by retraction of the horizontal plunger 68. Guide roller 402 is used to keep the banding 44 in a horizontal plane to the curved edge apparatus 404, while the curved edge is being formed in banding 44. Thus, the banding is maintained straight while a pair of opposed curved edges are formed in the banding in accordance with one aspect of the present invention.

Referring to FIG. 57, horizontal plunger 68 is shown in the retracted position 408n after having mechanically pulled banding 446 off of banding dispenser 42 and through curved edging apparatus 404, for forming the banding straight with curved edges. As the horizontal plunger moves to the retracted position 408, strap clamp 46 clamps banding 44. An adjustable banding length bar 406 is used to determine the length of banding 44b pulled by the horizontal plunger 68 in the retracted position 408. Horizontal plunger pulley 400 is used to eliminate drag of banding 44b as the horizontal plunger 68 pulls banding 44b.

FIG. 58 shows the horizontal plunger 68 in the extended position 410. Element 44c represents the slack in banding that was applied around the bundle of hay bales as the horizontal plunger 68 was being extended to position 410. This eliminates the cutting and shredding of hay and bale binding as the banding 44 is being applied in a slack condition around the bundle of hay bales.

Referring to FIG. 59 is a side view of the curved edge apparatus 404.

Referring to FIG. 60, there is shown is an end view of the curved edge apparatus 404 showing the roller 416 and die 412 that forms the curved edge of banding 414.

Referring to FIG. 61, there is shown an enlarged view of curved edge banding 414 showing the curved edge 422 in relation to a bale binding 420. As banding is pulled tight against bale binding 420, the curved edge 422 will not cut the bale binding.

Figure 62:
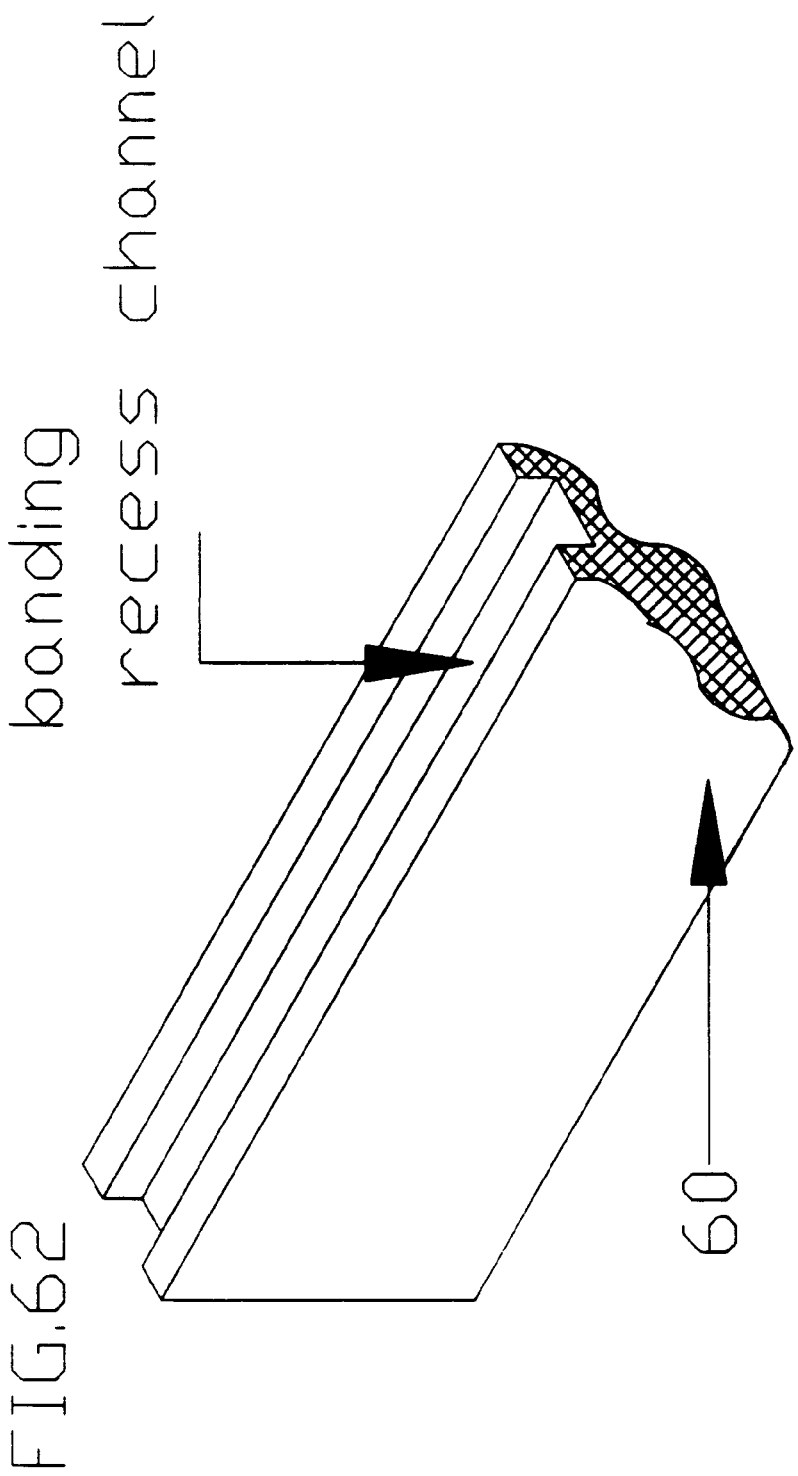
FIG. 62 is a partial perspective view of the lower banding troughs.

Referring to FIG. 62, there is shown a partial upper perspective view of a lower banding trough 60. Lower banding trough 60 includes a recess channel in an upper surface thereof. This allows banding to move freely within the compression zones within a hay bale as the horizontal plunger 68 moves forward and aft. FIG. 58 shows the horizontal plunger 68 in an extended position for applying banding 44 without cutting or shredding hay and the bale binding.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for stacking a plurality of bound hay bales in a large bundle of hay bales comprising:

intake means for sequentially receiving the bound hay bales and orienting the hay bales in common alignment;

stacking means for receiving each hay bale from said intake means and arranging the aligned hay bales in a vertical stack of hay bales;

compression means for forming inwardly extending, spaced banding zones in a top and a bottom hay bale in the stack of hay bales;

bundling means for forming vertical stacks of hay bales into a bundle of hay bales comprised of vertical stacks of hay bales in side-by-side alignment including top and bottom rows of hay bales;

banding means for tightly wrapping at least one band around the bundle of hay bales, wherein said at least one band is disposed in a respective banding zone in the top and bottom rows of bay bales in the bundle of hay bales; and discharge means for removing the bundle of hay bales from the apparatus.

2. The apparatus of claim 1 wherein each of the hay bales is bound by at least one binding aligned with a longitudinal axis of the hay bale, and wherein said at least one band wrapped around the bundle of hay bales is aligned generally transverse to said at least one binding on the hay bales.

3. The apparatus of claim 2 wherein said at least one binding is disposed about lateral portions of each of the hay bales and said banding zones are disposed in respective upper and lower surfaces of the top and bottom rows of hay bales.

4. The apparatus of claim 3 wherein each hay bale is bound by a pair of spaced bindings tightly disposed about the hay bale and wherein the bundle of hay bales is tightly wrapped by a pair of spaced bands disposed about the bundle.

5. The apparatus of claim 4 wherein said bindings are comprised of twine or wire and said bands are comprised of steel strapping.

6. The apparatus of claim 1 wherein each of said bales is formed by compressing the hay bale along its length in a first direction and tightly wrapping said at least one binding about the hay bale, and wherein said compression means compresses the hay bales arranged in said large bundle in said first direction along the lengths of the hay bales in the top and bottom rows of the bundle.

7. The apparatus of claim 1 wherein the bundle of hay bales is three bales high and seven bales long.

8. The apparatus of claim 1 further comprising a hitch disposed on the forward portion of the apparatus and wheels disposed on a lower portion of the apparatus to permit the apparatus to be pulled through a field for stacking hay bales as the apparatus is displaced.

9. The apparatus of claim 1 wherein said intake means is disposed on a forward portion of said apparatus and includes a first conveyor for moving the hay bales rearwardly in said apparatus, and wherein the hay bales are oriented generally flat when displaced rearwardly.

10. The apparatus of claim 9 wherein said intake means further includes guide means for directing the hay bales onto said first conveyor.

11. The apparatus of claim 10 further comprising a vertical lift disposed between said intake means and said stacking means for receiving hay bales from said first conveyor and delivering the hay bales to an upper portion of said stacking means.

12. The apparatus of claim 11 wherein said vertical lift includes a second conveyor for lifting the hay bales in an upright orientation to an upper portion of said stacking means.

13. The apparatus of claim 12 further comprising deflection means disposed adjacent an upper end of said second conveyor for engaging and changing the orientation of the hay bales from upright to flat.

14. The apparatus of claim 13 further comprising displacement means for moving the hay bales from the upper end of said second conveyor to an upper portion of said stacking means.

15. The apparatus of claim 14 wherein said displacement means also compresses a hay bale along its length as the hay bale is moved to an upper portion of said stacking means.

16. The apparatus of claim 1 wherein said stacking means includes a vertical plunger for sequentially receiving each hay bale and forming a plurality of hay bales into a vertical stack.

17. The apparatus of claim 16 wherein said stacking means further includes a fixed support frame coupled to said vertical plunger, and wherein said vertical plunger is incrementally lowered on said fixed support frame with the positioning of each hay bale on a vertical stack of hay bales.

18. The apparatus of claim 17 wherein said compression means includes first and second spaced vertical compression members and first and second spaced strap guides for respectively engaging a top hay bale and a bottom hay bale in a vertical stack of hay bales for forming upper and lower pairs of spaced banding zones in the vertical stack of hay bales.

19. The apparatus of claim 18 wherein said compression means further includes first and second pivot arms respectively coupled to said first and second vertical compression members for lowering said vertical compression members into engagement with the top hay bale in a vertical stack of hay bales and for vertically compressing said stack of hay bales.

20. The apparatus of claim 19 wherein said bundling means further includes a horizontal plunger for sequentially moving a stack of hay bales rearwardly in said apparatus and arranging a plurality of stacks of hay bales in adjacent, side-by-side alignment.

21. The apparatus of claim 20 further comprising at least one band dispenser for supplying said at least one band, wherein said horizontal plunger includes means for removing a band from a band dispenser when said horizontal plunger retracts after moving a stack of hay bales rearwardly in said apparatus.

22. The apparatus of claim 21 further comprising means for incorporating slack in a band when said horizontal plunger extends to preventing shredding and cutting of the hay and bale binding.

23. The apparatus of claim 21 further comprising means for engaging a band as the band is removed from a band dispenser and for bending opposed edges of the band for preventing cutting of the hay and said bindings tightly wrapped around each of the hay bales.

24. The apparatus of claim 23 wherein said means for engaging a band and bending opposed edges of the band includes a roller and beveled die combination through which the band is drawn by retraction of said horizontal plunger.

25. The apparatus of claim 24 further comprising clamp means for securely engaging said bands as a stack of hay bales is lowered by said vertical plunger for removing the slack from said bands after said horizontal plunger moves to an extended position.

26. The apparatus of claim 25 wherein said horizontal plunger moves between a retracted position and an extended position for compressing the hay bales and displacing a stack of hay bales rearwardly in said apparatus.

27. The apparatus of claim 26 wherein said horizontal plunger further displaces a bundle of hay bales rearwardly in said apparatus for discharge from said apparatus when said horizontal plunger moves to said extended position.

28. The apparatus of claim 27 wherein slack is provided in said at least one band when said horizontal plunger moves to an extended position to prevent cutting and shredding of the hay and said bindings.

29. The apparatus of claim 28 wherein said horizontal plunger includes a plurality of vertical panels coupled to at least one hydraulic cylinder, and wherein extension of said at least one hydraulic cylinder causes said vertical panels to engage and displace rearwardly in said apparatus a stack of hay bales.

30. The apparatus of claim 29 further comprising at least one band guide for wrapping said at least one band around the bundle of hay bales, wherein said at least one band guide is disposed between a pair of adjacent vertical panels and moves vertically with said vertical plunger.

31. The apparatus of claim 30 further comprising adjustable means for controlling the length of said at least one band pulled from said at least one band dispenser by said horizontal plunger.

32. The apparatus of claim 31 wherein said adjustable means for controlling the length of said at least one band is an adjustable banding length bar.

33. The apparatus of claim 20 wherein said bundling means further includes back gates disposed in an aft portion of the apparatus for limiting rearward displacement of a bundle of hay bales by said horizontal plunger in forming a compressed bundle of hay bales.

34. The apparatus of claim 33 wherein said discharge means includes means for opening said back gates when a bundle of stacked hay bales is formed by said horizontal plunger for permitting discharge of the bundle from said apparatus by rearward displacement of said horizontal plunger.

35. The apparatus of claim 34 wherein said means for opening said back gates includes a plurality of hydraulic cylinders coupled to said back gates for displacing said back gates between closed and opened positions.

36. The apparatus of claim 35 wherein said plurality of hydraulic cylinders include a first pair of extension cylinders each coupled to a respective back gate and a second pair of swing cylinders also each coupled to a respective back gate, wherein said extension cylinders move said gates between retracted and extended positions and said swing cylinders move said gates between closed and open positions.

37. The apparatus of claim 36 further comprising control means for first extending said extension cylinders in moving said gates to the extended position and then extending of said swing cylinders in moving said gates to the open position in opening said back gates, and for reversing the operating sequence of said extension and swing cylinders in closing said back gates.

38. The apparatus of claim 37 further comprising releasable latch means for locking said back gates in the closed position.

39. The apparatus of claim 38 wherein said discharge means further includes a pivoting floor disposed in a lower aft portion of said apparatus for lowering a bundle of hay bales to a support surface as the bundle is removed from the apparatus.

40. The apparatus of claim 39 wherein said discharge means further includes a hydraulic cylinder coupled to said pivoting floor for lowering said pivoting floor to permit removal of a bundle of hay bales from the apparatus and for raising the pivoting floor following removal of the bundle.

41. The apparatus of claim 40 wherein said horizontal plunger further compresses the stacks of hay bales in a horizontal direction by urging the stacks of hay bales against said back gates when said back gates are closed.

42. The apparatus of claim 41 further comprising control means for controlling the force of compression applied to the stacks of bay bales by said horizontal plunger.

43. The apparatus of claim 42 wherein said control means includes a manually adjustable pressure relief valve coupled to said first hydraulic cylinders coupled to said back gates.

44. The apparatus of claim 43 further comprising latch means for engaging and maintaining said pivoting floor in a fully upraised position for supporting a bundle of hay bales prior to discharge of said bundle from the apparatus.

45. The apparatus of claim 19 wherein said compression means further includes first and second upper compression members and first and second lower compression members respectively aligned with said first and second vertical compression members and said first and second strap guides for maintaining the upper and lower pairs of banding zones in the bundle of hay bales as the hay bales are moved rearwardly by said horizontal plunger.

46. The apparatus of claim 45 wherein each band is disposed between and in contact with a hay bale and its associated upper or lower compression member and is maintained in contact with its associated compression member by a hay bale with which it is in contact.

47. The apparatus of claim 46 wherein a stack of hay bales is disposed on and supported by said first and second strap guides as said stack of hay bales is lowered by said vertical plunger.

48. The apparatus of claim 47 wherein said first and second strap guides position first and second bands respectively on said first and second lower compression members.

49. The apparatus of claim 48 wherein said first and second strap guides connect said first and second bands respectively to said banding means.

50. The apparatus of claim 49 wherein each of said first and second strap guides includes a respective strap guide hinge coupled to an end of a strap guide and engaging a respective band supported by its associated strap guide for providing clearance of the band from a hay bale disposed on said strap guide during vertical displacement of said strap guide.

51. The apparatus of claim 45 wherein said banding means wraps first and second bands around a stack of hay bales as said stack is formed by said vertical plunger and wraps said first and second bands around a bundle of stacked hay bales as said bundle is formed by said horizontal plunger.

52. The apparatus of claim 51 wherein each of said first and second lower compression members includes a respective trough for receiving and allowing a band to move freely within a compression zone during banding of a bundle of hay bales as said horizontal plunger moves forward and aft in a reciprocating manner.

53. The apparatus of claim 52 wherein said banding means includes first and second dispensers for letting out said first and second bands as hay bale stacks and a bundle of hay bales are formed.

54. The apparatus of claim 53 wherein said banding means further includes first and second splicing and severing means for securing said first and second bands tightly about a bundle of hay bales and severing said bands.

55. The apparatus of claim 1 further comprising a computer for controlling the operation of said intake, stacking, compression, bundling, banding and discharge means.

56. The apparatus of claim 55 further comprising an operator controlled manual reset for allowing an operator to interrupt and re-initiate operation of the apparatus.

57. The apparatus of claim 56 further comprising first detection means for detecting a hay bale in said intake means.

58. The apparatus of claim 57 wherein said first detection means includes a first photo sensor.

59. The apparatus of claim 58 further comprising a vertical elevator for receiving a hay bale from said intake means and second detection means for detecting a hay bale in said vertical elevator.

60. The apparatus of claim 59 wherein said second detection means includes a second photo sensor.

61. The apparatus of claim 60 wherein said stacking means includes a third photo sensor for determining the number of hay bales in a vertical stack of hay bales.

62. The apparatus of claim 61 wherein said third photo sensor further determines the number of vertical stacks of hay bales in a bundle of hay bales.

63. The apparatus of claim 62 wherein said banding means includes means for curving opposed edges of said bands for avoiding cutting and shredding of the hay bales by said bands.

64. The apparatus of claim 63 wherein said means for curving the opposed edges of said bands includes, in combination, a roller and a die, and wherein said die includes a bevelled edge for bending the edges of said bands when drawn between said roller and die.

65. The apparatus of claim 1 further comprising a horizontal plunger and vertical panels, wherein said horizontal plunger includes first and second coupled hydraulic cylinders connected to said vertical panels, wherein said first cylinder displaces the stacks of hay bales rearwardly in said apparatus and said first and second cylinders compress the stacks of hay bales forming the bundle of hay bales.

66. The apparatus of claim 65 further comprising a pressure supply line and control valve means coupled to said first and second hydraulic cylinders for providing hydraulic fluid under pressure to said first cylinder for extending said first cylinder in displacing the stacks of hay bales rearwardly in said apparatus, wherein said first cylinder extends said second cylinder, whereupon said pressure supply line and said control valve means provide hydraulic fluid under pressure to said first and second cylinders for extending said cylinders together for compressing the stacks of hay bales in forming a compressed bundle of hay bales.

67. The apparatus of claim 66 wherein said control valve means directs hydraulic fluid to a piston side of said second cylinder as said first cylinder extends said second cylinder.

68. The apparatus of claim 67 wherein said first and second cylinders are retracted by said control valve means providing hydraulic fluid under pressure to a rod side of said first cylinder following compression of the bundle of hay bales, and wherein a first larger portion of hydraulic fluid flows from a piston side of said first and second cylinders to a rod side of said second cylinder during retraction of said first cylinder, and wherein a second smaller portion of said hydraulic fluid returns to a hydraulic reservoir during retraction of said first hydraulic cylinder.

* * * * *

UNITED STATES PATENT AND TRADEMARK OFFICE
CERTIFICATE OF CORRECTION

PATENT NO. : 6,182,563 B1  Page 1 of 1
DATED : February 6, 2001
INVENTOR(S) : Owen J. Brown, Jr.

It is certified that error appears in the above-identified patent and that said Letters Patent is hereby corrected as shown below:

<u>Column 18, claim 1,</u>
Line 29, after "of" and before "bales" delete "bay" insert -- hay --.

Signed and Sealed this

Eighteenth Day of December, 2001

Attest:

JAMES E. ROGAN
*Attesting Officer*  *Director of the United States Patent and Trademark Office*